(12) United States Patent
Donsbach et al.

(10) Patent No.: US 9,836,819 B1
(45) Date of Patent: Dec. 5, 2017

(54) SYSTEMS AND METHODS FOR SELECTIVE RETENTION AND EDITING OF IMAGES CAPTURED BY MOBILE IMAGE CAPTURE DEVICE

(71) Applicant: Google Inc., Mountain View, CA (US)

(72) Inventors: Aaron Michael Donsbach, Seattle, WA (US); Benjamin Vanik, Seattle, WA (US); Jon Gabriel Clapper, Seattle, WA (US); Alison Lentz, Seattle, WA (US); Joshua Denali Lovejoy, Seattle, WA (US); Robert Douglas Fritz, III, Seattle, WA (US); Krzysztof Duleba, Seattle, WA (US); Li Zhang, Seattle, WA (US); Juston Payne, San Mateo, CA (US); Emily Anne Fortuna, Seattle, WA (US); Iwona Bialynicka-Birula, Redmond, WA (US); Blaise Aguera-Arcas, Seattle, WA (US); Daniel Ramage, Seattle, WA (US); Hugh Brendan McMahan, Seattle, WA (US); Oliver Fritz Lange, Seattle, WA (US); Jess Holbrook, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/984,628

(22) Filed: Dec. 30, 2015

(51) Int. Cl.
*G06K 9/00* (2006.01)
*G06T 3/40* (2006.01)
(Continued)

(52) U.S. Cl.
CPC ........ *G06T 3/4046* (2013.01); *G06K 9/00221* (2013.01); *G06K 9/00664* (2013.01);
(Continued)

(58) Field of Classification Search
CPC combination set(s) only.
See application file for complete search history.

(56) References Cited

U.S. PATENT DOCUMENTS

| 5,164,831 A | 11/1992 | Kuchta et al. |
| 5,227,835 A | 7/1993 | Anagnostopoulos |

(Continued)

FOREIGN PATENT DOCUMENTS

| WO | WO 2005/065283 | 12/2003 |
| WO | WO 2011/116309 | 9/2011 |
| WO | WO 2015/142719 | 9/2015 |

OTHER PUBLICATIONS

Bagnall, "Author Identification Using Multi-Headed Recurrent Neural Networks", Notebook for the PAN@CLEF Authori Identification Challenge, Jun. 16, 2015, 9 pages.
(Continued)

*Primary Examiner* — Alex Liew
(74) *Attorney, Agent, or Firm* — Dority & Manning, P.A.

(57) ABSTRACT

The present disclosure provides an image capture, curation, and editing system that includes a resource-efficient mobile image capture device that continuously captures images. The mobile image capture device is operable to input an image into at least one neural network and to receive at least one descriptor of the desirability of a scene depicted by the image as an output of the at least one neural network. The mobile image capture device is operable to determine, based at least in part on the at least one descriptor of the desirability of the scene of the image, whether to store a second copy of such image and/or one or more contemporaneously captured images in a non-volatile memory of the mobile image capture device or to discard a first copy of such image from a temporary image buffer without storing the second copy of such image in the non-volatile memory.

20 Claims, 22 Drawing Sheets

(51) Int. Cl.
*G06T 11/60* (2006.01)
*H04N 5/232* (2006.01)

(52) U.S. Cl.
CPC ......... *G06T 11/60* (2013.01); *H04N 5/23216* (2013.01); *G06T 2207/20084* (2013.01)

(56) References Cited

U.S. PATENT DOCUMENTS

| | | | |
|---|---|---|---|
| 5,267,332 A * | 11/1993 | Walch | G06K 9/4638 |
| | | | 382/198 |
| 5,546,145 A | 8/1996 | Bernardi et al. | |
| 5,812,193 A | 9/1998 | Tomitaka et al. | |
| 6,005,611 A | 12/1999 | Gullichsen et al. | |
| 6,014,183 A | 1/2000 | Hoang | |
| 6,301,440 B1 | 10/2001 | Bolle et al. | |
| 6,448,956 B1 | 9/2002 | Berman et al. | |
| 6,509,915 B2 | 1/2003 | Berman et al. | |
| 6,516,154 B1 | 2/2003 | Parulski et al. | |
| 6,563,532 B1 | 5/2003 | Strub et al. | |
| 6,614,408 B1 | 9/2003 | Mann | |
| 6,671,405 B1 | 12/2003 | Savakis et al. | |
| 6,680,748 B1 | 1/2004 | Monti | |
| 6,757,027 B1 | 6/2004 | Edwards et al. | |
| 6,870,532 B2 | 3/2005 | Travers et al. | |
| 6,930,718 B2 | 8/2005 | Parulski et al. | |
| 6,940,545 B1 | 9/2005 | Ray et al. | |
| 7,006,881 B1 | 2/2006 | Hoffberg et al. | |
| 7,031,555 B2 * | 4/2006 | Troyanker | G06F 17/30256 |
| | | | 358/403 |
| 7,076,102 B2 | 7/2006 | Lin et al. | |
| 7,233,684 B2 | 6/2007 | Fedorovskaya et al. | |
| 7,352,918 B2 | 4/2008 | Tannhof et al. | |
| 7,430,369 B2 | 9/2008 | Fukui | |
| 7,511,838 B2 | 3/2009 | Hunter | |
| 7,532,234 B2 | 5/2009 | Sadovsky et al. | |
| 7,551,754 B2 | 6/2009 | Steinberg et al. | |
| 7,616,233 B2 | 11/2009 | Steinberg et al. | |
| 7,616,248 B2 | 11/2009 | Parulski et al. | |
| 7,676,145 B2 | 3/2010 | Kuberka et al. | |
| 7,714,898 B2 | 5/2010 | Pilu | |
| 7,729,532 B2 | 6/2010 | Tedesco et al. | |
| 7,729,602 B2 | 6/2010 | Janson, Jr. et al. | |
| 7,742,625 B2 | 6/2010 | Pilu | |
| 7,751,683 B1 | 7/2010 | Belknap | |
| 7,761,812 B2 | 7/2010 | Ostojic et al. | |
| 7,792,335 B2 | 9/2010 | Steinberg et al. | |
| 7,804,983 B2 | 9/2010 | Steinberg et al. | |
| 7,809,162 B2 | 10/2010 | Steinberg et al. | |
| 7,817,914 B2 | 10/2010 | Kuberka et al. | |
| 7,826,092 B2 | 11/2010 | Ejima et al. | |
| 7,924,323 B2 | 4/2011 | Walker et al. | |
| 7,953,690 B2 | 5/2011 | Luo et al. | |
| 8,005,268 B2 | 8/2011 | Steinberg et al. | |
| 8,041,076 B1 | 10/2011 | Bourdev | |
| 8,072,495 B2 | 12/2011 | Pai et al. | |
| 8,132,096 B1 | 3/2012 | Widdowson et al. | |
| 8,180,106 B2 | 5/2012 | Matsugu et al. | |
| 8,180,112 B2 | 5/2012 | Kurtz et al. | |
| 8,200,019 B2 | 6/2012 | Zhang et al. | |
| 8,200,025 B2 * | 6/2012 | Woodbeck | G06F 17/30256 |
| | | | 382/159 |
| 8,208,697 B2 * | 6/2012 | Schaffer | G06K 9/6217 |
| | | | 382/128 |
| 8,224,122 B2 | 7/2012 | Cohen et al. | |
| 8,238,695 B1 | 8/2012 | Davey et al. | |
| 8,265,348 B2 | 9/2012 | Steinberg et al. | |
| 8,311,364 B2 | 11/2012 | Cerosaletti et al. | |
| 8,427,538 B2 | 4/2013 | Ahiska | |
| 8,442,268 B2 | 5/2013 | Isogai et al. | |
| 8,466,987 B2 | 6/2013 | Walker et al. | |
| 8,475,396 B2 | 7/2013 | Jones et al. | |
| 8,478,053 B2 | 7/2013 | Ishiga | |
| 8,514,315 B2 | 8/2013 | Lee et al. | |
| 8,520,116 B2 | 8/2013 | Kang | |
| 8,666,225 B2 | 3/2014 | Ogura et al. | |
| 8,677,257 B2 | 3/2014 | Doepke et al. | |
| 8,677,283 B2 | 3/2014 | Fong | |
| 8,700,392 B1 | 4/2014 | Hart et al. | |
| 8,708,903 B2 | 4/2014 | Tran | |
| 8,723,951 B2 | 5/2014 | Ahiska et al. | |
| 8,775,971 B2 | 7/2014 | Hoover | |
| 8,886,298 B2 | 11/2014 | Williams et al. | |
| 8,897,485 B2 | 11/2014 | Fedorovskaya et al. | |
| 8,902,198 B1 | 12/2014 | Karakotsios et al. | |
| 8,924,886 B2 | 12/2014 | Matsue et al. | |
| 8,938,124 B2 | 1/2015 | Eilat et al. | |
| 9,024,842 B1 | 5/2015 | Prada Gomez et al. | |
| 9,030,446 B2 | 5/2015 | Mistry et al. | |
| 9,060,127 B2 | 6/2015 | Wexler et al. | |
| 9,086,756 B2 | 7/2015 | Schön et al. | |
| 9,288,375 B2 | 3/2016 | Walker et al. | |
| 9,288,376 B2 | 3/2016 | Walker et al. | |
| 9,418,375 B1 | 8/2016 | Cunico et al. | |
| 2001/0020837 A1 | 9/2001 | Yamashita et al. | |
| 2003/0058340 A1 | 3/2003 | Lin et al. | |
| 2003/0146938 A1 | 8/2003 | Geiger | |
| 2004/0005915 A1 | 1/2004 | Hunter | |
| 2004/0012508 A1 | 1/2004 | Wolfson et al. | |
| 2004/0075743 A1 | 4/2004 | Chatani et al. | |
| 2004/0080618 A1 | 4/2004 | Norris et al. | |
| 2004/0114176 A1 | 6/2004 | Bodin et al. | |
| 2004/0125088 A1 | 7/2004 | Zimmerman et al. | |
| 2004/0162647 A1 | 8/2004 | Koshizen et al. | |
| 2004/0212637 A1 | 10/2004 | Varghese | |
| 2005/0030387 A1 | 2/2005 | Pilu | |
| 2005/0192808 A1 | 9/2005 | Sngiyama | |
| 2005/0200486 A1 | 9/2005 | Greer | |
| 2005/0231589 A1 | 10/2005 | Chiang | |
| 2006/0115185 A1 | 6/2006 | Iida et al. | |
| 2006/0187305 A1 | 8/2006 | Trivedi et al. | |
| 2006/0268121 A1 | 11/2006 | Watanabe | |
| 2007/0124783 A1 | 5/2007 | Ahiska et al. | |
| 2007/0201694 A1 | 8/2007 | Bolle et al. | |
| 2008/0144968 A1 | 6/2008 | Cohen et al. | |
| 2008/0192129 A1 | 8/2008 | Walker et al. | |
| 2008/0229235 A1 | 9/2008 | Vau et al. | |
| 2009/0141969 A1 * | 6/2009 | Yu | G06N 3/08 |
| | | | 382/157 |
| 2009/0219411 A1 | 9/2009 | Marman et al. | |
| 2009/0324010 A1 | 12/2009 | Hou | |
| 2009/0324098 A1 | 12/2009 | Nilsson | |
| 2010/0031186 A1 | 2/2010 | Tseng et al. | |
| 2010/0058240 A1 | 3/2010 | Bull et al. | |
| 2010/0199232 A1 | 8/2010 | Mistry et al. | |
| 2010/0231730 A1 | 9/2010 | Ichikawa et al. | |
| 2011/0043631 A1 | 2/2011 | Marman et al. | |
| 2011/0128414 A1 | 6/2011 | Walker et al. | |
| 2011/0159921 A1 | 6/2011 | Davis et al. | |
| 2011/0211040 A1 | 9/2011 | Lindemann et al. | |
| 2012/0054670 A1 | 3/2012 | Rainisto | |
| 2012/0106848 A1 | 5/2012 | Greig et al. | |
| 2012/0147220 A1 | 6/2012 | Lee | |
| 2012/0174005 A1 | 7/2012 | Deutsch et al. | |
| 2012/0242844 A1 | 9/2012 | Walker et al. | |
| 2012/0257071 A1 | 10/2012 | Prentice et al. | |
| 2012/0294514 A1 * | 11/2012 | Saunders | H04N 1/00196 |
| | | | 382/159 |
| 2013/0077820 A1 | 3/2013 | Marais et al. | |
| 2013/0088520 A1 | 4/2013 | Mak | |
| 2013/0104080 A1 | 4/2013 | Bosworth et al. | |
| 2013/0169536 A1 | 7/2013 | Wexler et al. | |
| 2013/0169682 A1 | 7/2013 | Novak et al. | |
| 2013/0201344 A1 | 8/2013 | Sweet, III et al. | |
| 2013/0201359 A1 | 8/2013 | Wu et al. | |
| 2013/0245396 A1 | 9/2013 | Berman et al. | |
| 2013/0314566 A1 | 11/2013 | Walker et al. | |
| 2014/0002580 A1 | 1/2014 | Bear et al. | |
| 2014/0002588 A1 | 1/2014 | Ahiska | |
| 2014/0021828 A1 | 1/2014 | Despesse | |
| 2014/0022196 A1 | 1/2014 | Henry et al. | |
| 2014/0043517 A1 | 2/2014 | Yim et al. | |
| 2014/0104424 A1 | 4/2014 | Zhang et al. | |
| 2014/0160316 A1 | 6/2014 | Hwang et al. | |

(56) References Cited

U.S. PATENT DOCUMENTS

| | | |
|---|---|---|
| 2014/0184849 A1 | 7/2014 | Kim |
| 2014/0218283 A1 | 8/2014 | Choi et al. |
| 2014/0241616 A1* | 8/2014 | Medvedovsky ......... G06K 9/46 382/156 |
| 2014/0242560 A1 | 8/2014 | Movellan et al. |
| 2014/0253791 A1 | 9/2014 | Koskinen et al. |
| 2014/0270707 A1 | 9/2014 | Fathi et al. |
| 2014/0375761 A1 | 12/2014 | Ahiska et al. |
| 2015/0029349 A1 | 1/2015 | Ben |
| 2015/0058944 A1 | 2/2015 | Schachtel et al. |
| 2015/0074532 A1 | 3/2015 | Lapidot et al. |
| 2015/0086109 A1 | 3/2015 | Paris et al. |
| 2015/0117760 A1 | 4/2015 | Wang et al. |
| 2015/0146026 A1 | 5/2015 | Walker et al. |
| 2015/0350504 A1 | 12/2015 | Corcoran et al. |
| 2016/0173782 A1 | 6/2016 | Dimson et al. |
| 2016/0203386 A1 | 7/2016 | Porecki et al. |
| 2016/0321427 A1 | 11/2016 | Bogoni et al. |
| 2016/0321784 A1 | 11/2016 | Annapureddy et al. |
| 2016/0328643 A1 | 11/2016 | Liu et al. |

OTHER PUBLICATIONS

Berry et al., "The Use of a Wearable Camera, SenseCam, as a Pictorial Diary to Improve Autobiographical Memory in a Patient with Limbic Encephalitis: A Preliminary Report", Neuropsychological Rehabilitation, vol. 17, Issue 4/5, Aug.-Oct. 2007, pp. 582-601.

Blighe et al., "Identifying Different Settings in a Visual Diary", Ninth International Workshop on Image Analysis for Multimedia Interactive Services, Klagenfurt, Austria, May 7-9, 2008, pp. 24-27.

Byrne et al., "Everyday Concept Detection in Visual Lifelogs: Validation, Relationships and Trends", Multimedia Tools and Applications, vol. 49, No. 1, Aug. 2010, pp. 119-144.

Charara, "How Machine Learning Will Take Wearable Data to the Next Level", wareable.com/wearable-tech/machine-learning-wearable-data-sensors-2015, retrieved on Sep. 17, 2015, 6 pages.

Davis et al., "From Context to Content: Leveraging Context to Infer Media Metadata", Proceedings of the ACM International Conference on Multimedia, New York, New York, Oct. 10-16, 2004, pp. 188-195.

Doherty et al., "Automatically Augmenting Lifelog Events Using Pervasively Generated Content from Millions of People", Sensors, vol. 10, Issue 3, Feb. 26, 2010, pp. 1423-1446.

Doherty et al., "Combining Image Descriptors to Effectively Retrieve Events from Visual Lifelogs", ACM International Conference on Multimedia Information Retrieval, Vancouver, Canada, Oct. 30-31, 2008, pp. 10-17.

Harris, "Why Machine Learning Might be a Wearable Camera's Best Friend", gigaom.com/2013/09/13/why-machine-learning-might-be-a-wearable-cameras-best-friend/, retrieved on Sep. 17, 2015—4 pages.

Higginbotham, "How Facebook is Teaching Computers to See", fortune.com/2015/06/15/facebook-ai-moments/, retrieved on Sep. 17, 2015, 5 pages.

Hodges et al., "SenseCam: A Wearable Camera Which Stimulates and Rehabilitates Autobiographical Memory", Memory, vol. 19, Issue 7, Oct. 2011, pp. 685-696.

Jones et al., "Automated Annotation of Landmark Images Using Community Contributed Datasets and Web Resources", International Conference on Semantic and Digital Media Technologies, Saarbrucken, Germany, Dec. 1-3, 2010, 16 pages.

Lomas, "Neurence's Cloud Platform Gives Wearables Eyes that Can See and Ears that Can Hear", http://techcrunch.com/2014/12/18/neurence-sense-launch/, retrieved on Sep. 17, 2015, 12 pages.

Lu et al., "Story-Driven Summarization for Egocentric Video", Proceedings of the IEEE Conference on Computer Vision and Pattern Recognition, Portland, Oregon, Jun. 23-28, 2013, pp. 2714-2721.

Mnih et al., "Recurrent Models of Visual Attention", Advances in Neural Information Processing Systems, Montreal, Canada, Dec. 8-13, 2014, pp. 2201-2212.

Movidius: Myriad 2 Vision Processor Product Brief, 2014, movidius.com/solutions/vision-processing-unit, retrieved on Sep. 17, 2015, 2 pages.

Starner et al., "The Gesture Pendant: A Self-Illuminating, Wearable, Infrared Computer Vision System for Home Automation Control and Medical Monitoring", Proceedings of the 4$^{th}$ IEEE International Symposium on Wearable Computers, Atlanta, Georgia, Oct. 16-17, 2000, 8 pages.

Tang et al., "Learning Generative Models with Visual Attention", Advances in Neural Information Processing Systems, Montreal, Canada, Dec. 8-13, 2014, pp. 1808-1816.

Van Laerhoven et al., "Real-Time Analysis of Data from Many Sensors with Neural Networks", Proceedings of the 5$^{th}$ IEEE International Symposium on Wearable Computers, Zurich, Switzerland, Oct. 8-9, 2001, 8 pages.

Wingfield, "A New Action Camera, Born From a Cycling Crash", bits.blogs.nytimes.com/2015/08/05/a-new-action-camera-born-from-a-cycling-crash/?_r=0, retrieved on Oct. 6, 2015, 2 pages.

International Search Report & Written Opinion for PCT/US2016/045681 dated Sep. 26, 2016, 11 pages.

* cited by examiner

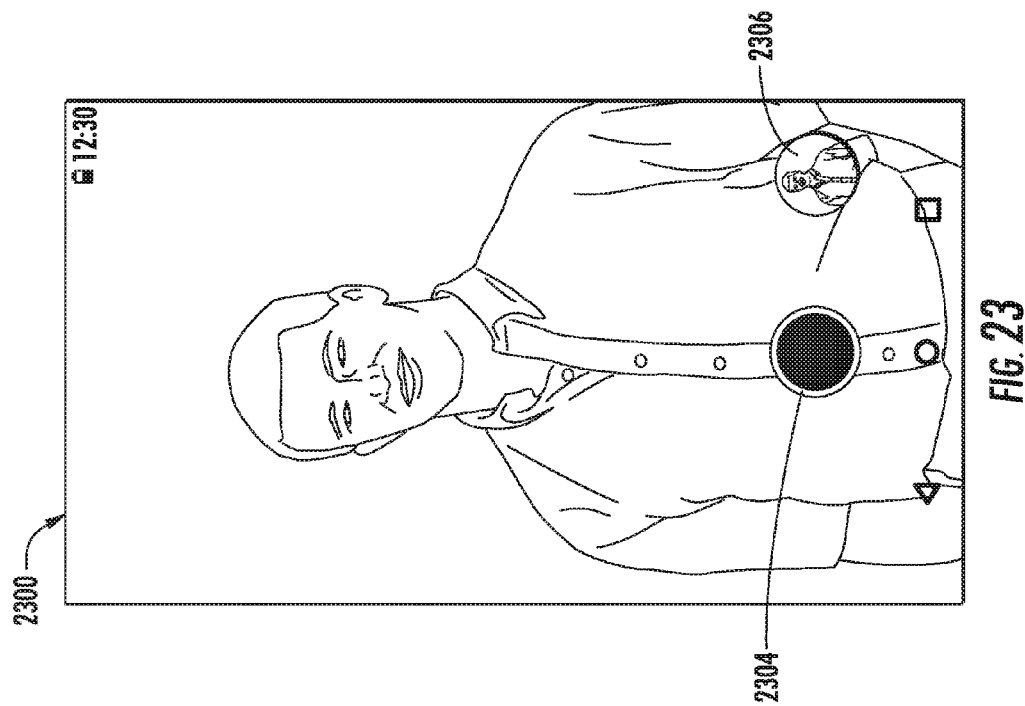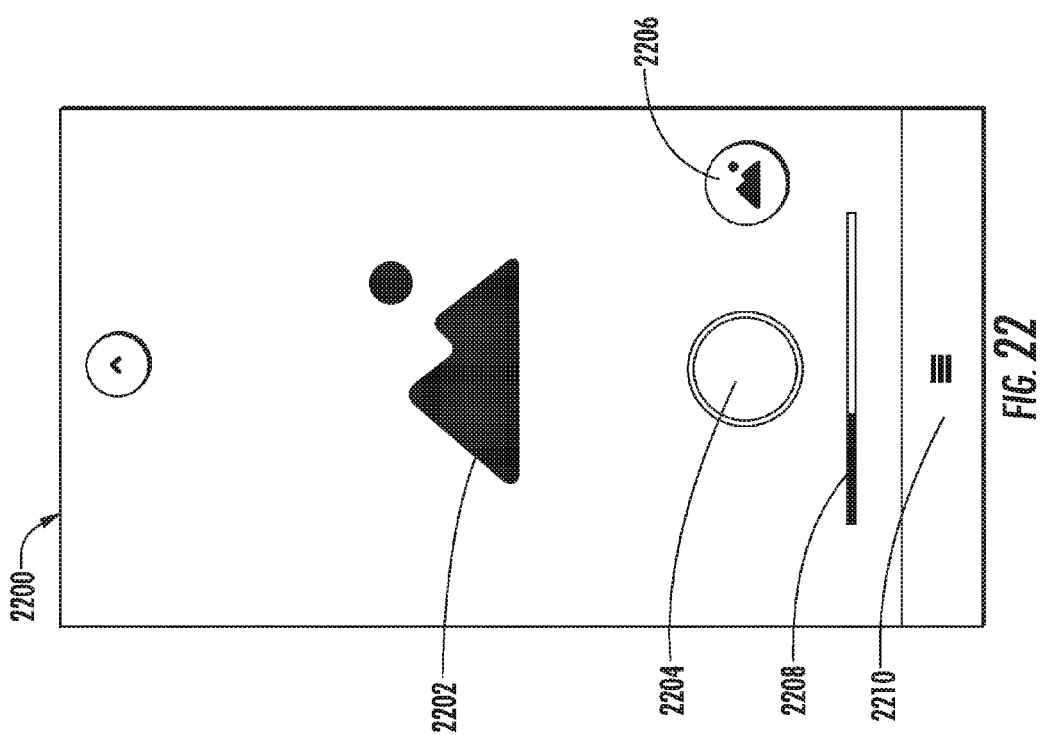

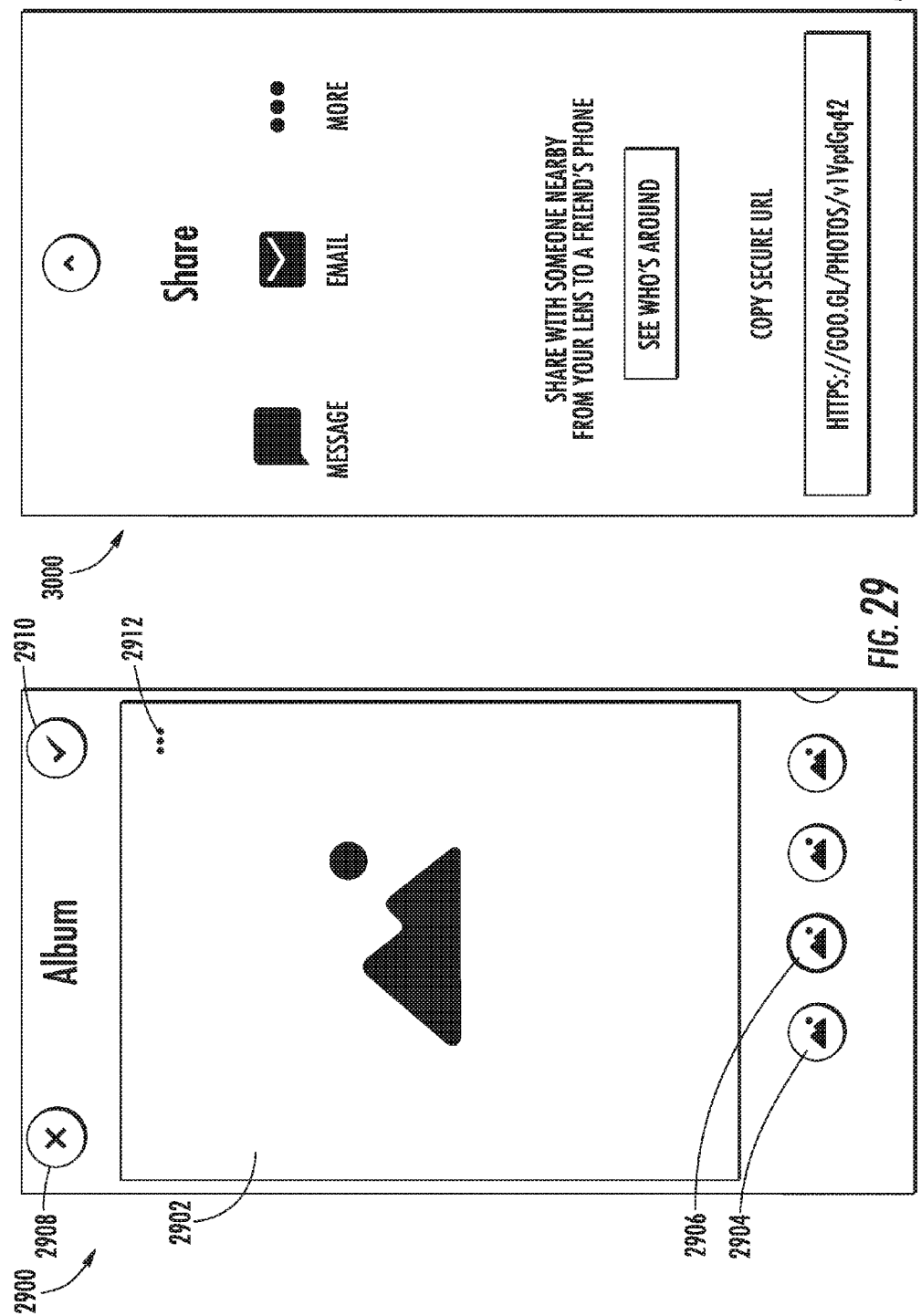

SYSTEMS AND METHODS FOR SELECTIVE RETENTION AND EDITING OF IMAGES CAPTURED BY MOBILE IMAGE CAPTURE DEVICE

FIELD

The present disclosure relates generally to an image capture, curation, and editing system and, more particularly, to a system that includes a resource-efficient mobile image capture device that continuously captures images.

BACKGROUND

An image capture device can capture images from various perspectives, which may be useful for various objectives. As one example application, a mobile image capture device can be used to perform life logging, in which images are captured by the mobile image capture device over a period of time to document various events that occur during the user's daily life. Life logging can be performed to assist in memory retention in the elderly, to share the user's perspective or experience with other persons, or to simply document the various events that the user experiences so that the user can revisit such events in the future and enjoy their recollection. For example, a parent may enjoy reviewing images of their child blowing out candles on a birthday cake.

Thus, a mobile image capture device can be used to capture particular events in a person's life in much the same manner as the person would use a traditional camera to record such events. However, a mobile image capture device may provide the further benefit that the user does not have to actively operate a camera during the event to capture imagery of the event. Instead, the user is able to fully engage in and enjoy the event while the mobile image capture device captures imagery of the event. For example, the parent can enjoy and participate in their child blowing out candles on the birthday cake without the distraction of operating a camera, while still obtaining imagery of the scene to enjoy at a later time.

Furthermore, a mobile image capture device may be relatively more adept at capturing and curating imagery of candid moments versus a traditional camera. In particular, people commonly pose or otherwise unnaturally change their expression when a camera is used to take a photograph. In this sense, a mobile image capture device may be able to capture images which more accurately reflect true user experiences, such as laughter during conversation or a genuine but fleeting smile, while traditional cameras are more limited to the images in which the subjects adopt a common pose or "say cheese".

As another example application, mobile image capture devices may be particularly advantageous where capturing a record of the user's perspective or associated events is a matter of public safety or has legal significance. For example, mobile image capture devices may be particularly advantageous in situations such as recording the perspective of a law enforcement officer when interacting with a member of the public.

However, a primary challenge faced by the design and use of mobile image capture devices is the resource-limited environment in which they operate. In particular, the design and use of mobile image capture devices is typically subject to the following constraints: a limited amount of memory to be used for image storage over a significant period of time; a limited amount of processing power or capability to continuously process imagery; a limited amount of energy available to operate over an extended period of time; and/or a limited amount of thermal power that can be dissipated (i.e., a device temperature that should not be exceeded so as to prevent overheating of the device or discomfort for the user, who may in some instances wear the mobile image capture device).

More particularly, mobile image capture devices typically store captured imagery at a local memory for at least an initial period of time until such imagery can be transferred or transmitted to another device. However, due to memory component cost, size, or other factors, the mobile image capture device typically will have only limited memory resources to dedicate toward storage of captured imagery. In the scenario in which the mobile image capture device is worn and operated for hours at a time (if not longer), the limited memory resources results in the device being unable to simply store a continuous stream of hours' worth of high resolution images. Furthermore, even if the mobile image capture device had sufficient memory resources to store such continuous stream of hours' worth of images, this would present an additional problem of requiring the user to cull a massive amount of images to try and pick the best or most desirable ones.

As another example, mobile image capture devices are typically powered by a battery. Thus, in the most common use cases, the limited power budget provided by a battery must be spread across hours of device operation, if not longer. Therefore, operations performed by the mobile image capture device which require or otherwise draw significant amounts of power must be limited or otherwise not continuously or commonly performed. As examples, the compression, storage, and transmission of images are the portions of a typical image processing cycle which consume the most significant amounts of power. Thus, in addition to a memory consumption problem, the compression and storage of massive amounts of imagery is an infeasible device design for the typical power budget provided by an on-board battery.

Similarly, despite advances in the size and ability of image processing chips, mobile image devices will still typically have a limited amount of computational power which can be employed at any given moment in time.

Further, the resource constraints described above are typically highly interrelated. For example, even given an unlimited power, computation, and memory budget, continuous performance of high power processing operations would cause the mobile image capture device to dissipate heat at a level that would cause discomfort for the user.

Thus, the memory, processing, power, and thermal constraints associated with a mobile image capture device collectively represent one of the most challenging limitations to the design and operation of a mobile image capture device.

As such, resource-efficient mobile image capture devices are desirable. In particular, mobile image capture devices that continuously capture imagery while providing additional advanced features in a resource-efficient manner are needed.

SUMMARY

Aspects and advantages of the present disclosure will be set forth in part in the following description, or may be obvious from the description, or may be learned through practice of embodiments of the present disclosure.

One example aspect of the present disclosure is directed to a system for selective retention and editing of images. The system includes a continuous capture mobile image capture device designed for resource efficiency. The mobile image capture device includes a network interface, a power source, an image sensor, at least one processor, and a memory that stores at least one neural network usable to determine a desirability of a scene depicted by an image. The memory includes at least a temporary image buffer and a non-volatile memory. The mobile image capture device is operable to capture a first image that depicts a scene. The mobile image capture device is operable to maintain a first copy of the first image in the temporary image buffer. The mobile image capture device is operable to input the first image into the at least one neural network. The mobile image capture device is operable to receive at least one descriptor of the desirability of the scene depicted by the first image as an output of the at least one neural network. The mobile image capture device is operable to determine, based at least in part on the at least one descriptor of the desirability of the scene of the first image, whether to store a second copy of the first image in the non-volatile memory of the mobile image capture device or to discard the first copy of the first image from the temporary image buffer without storing a second copy of the first image in the non-volatile memory. The mobile image capture device is operable to transmit at least one of a plurality of images stored in the non-volatile memory to a user computing device.

Another example aspect of the present disclosure is directed to a system for selective retention and editing of images. The system includes a continuous capture mobile image capture device designed for resource efficiency. The mobile image capture device includes a network interface, a power source, an image sensor, at least one processor, a memory that includes at least a temporary image buffer and a non-volatile memory, and a scene analyzer. The mobile image capture device is operable to capture a plurality of images that respectively depict a plurality of scenes. The mobile image capture device is operable to maintain a first copy of each of the plurality of images in the temporary image buffer. The mobile image capture device is operable to determine, by the scene analyzer, at least one descriptor of the desirability of the scene depicted by each image. The mobile image capture device is operable to determine, based at least in part on the at least one descriptor of the desirability of the scene of each image, whether to store a second copy of such image in the non-volatile memory of the mobile image capture device or to discard the first copy of such image from the temporary image buffer without storing a second copy of such image in the non-volatile memory. The system includes a user computing device. The user computing device includes at least one processor, a memory, and a transfer controller. The user computing device is operable to selectively communicatively connect to the mobile image capture device. The user computing device is operable to determine, by the transfer controller based at least in part on the at least one descriptor of the desirability of the scene depicted by each image stored in the non-volatile memory of the mobile image capture device, whether to request transfer of such image from the mobile image capture device. The user computing device is operable to receive one or more images requested for transfer from the mobile image capture device.

Another example aspect of the present disclosure is directed to a method to selectively retain and transfer images. The method includes capturing, by a mobile image capture device, a first image that depicts a scene. The method includes maintaining, by the mobile image capture device, a first copy of the first image in a temporary image buffer of the mobile image capture device. The method includes inputting, by the mobile image capture device, the first image into at least one neural network to determine a desirability of the scene depicted by the first image. The at least one neural network is stored in a memory of the mobile image capture device. The method includes receiving, by the mobile image capture device, at least one descriptor of the desirability of the scene depicted by the first image as an output of the neural network. The method includes determining, by the mobile image capture device based at least in part on the at least one descriptor of the desirability of the scene, whether to store a second copy of the first image in the non-volatile memory of the mobile image capture device or to discard the first copy of the first image from the temporary image buffer without storing a second copy of the first image in the non-volatile memory. The method includes transferring, by the mobile image capture device, one or more of a plurality of images stored in the non-volatile memory of the mobile image capture device to a user computing device.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which:

FIG. 22 depicts an example user interface to enable editing of captured imagery according to an example embodiment of the present disclosure;

FIG. 23 depicts an example user interface to enable editing of captured imagery according to an example embodiment of the present disclosure;

FIG. 29 depicts an example user interface to edit a reflection at the moment-level according to an example embodiment of the present disclosure;

FIG. 30 depicts an example user interface to enable sharing of images according to an example embodiment of the present disclosure.

DETAILED DESCRIPTION

Figure 1:
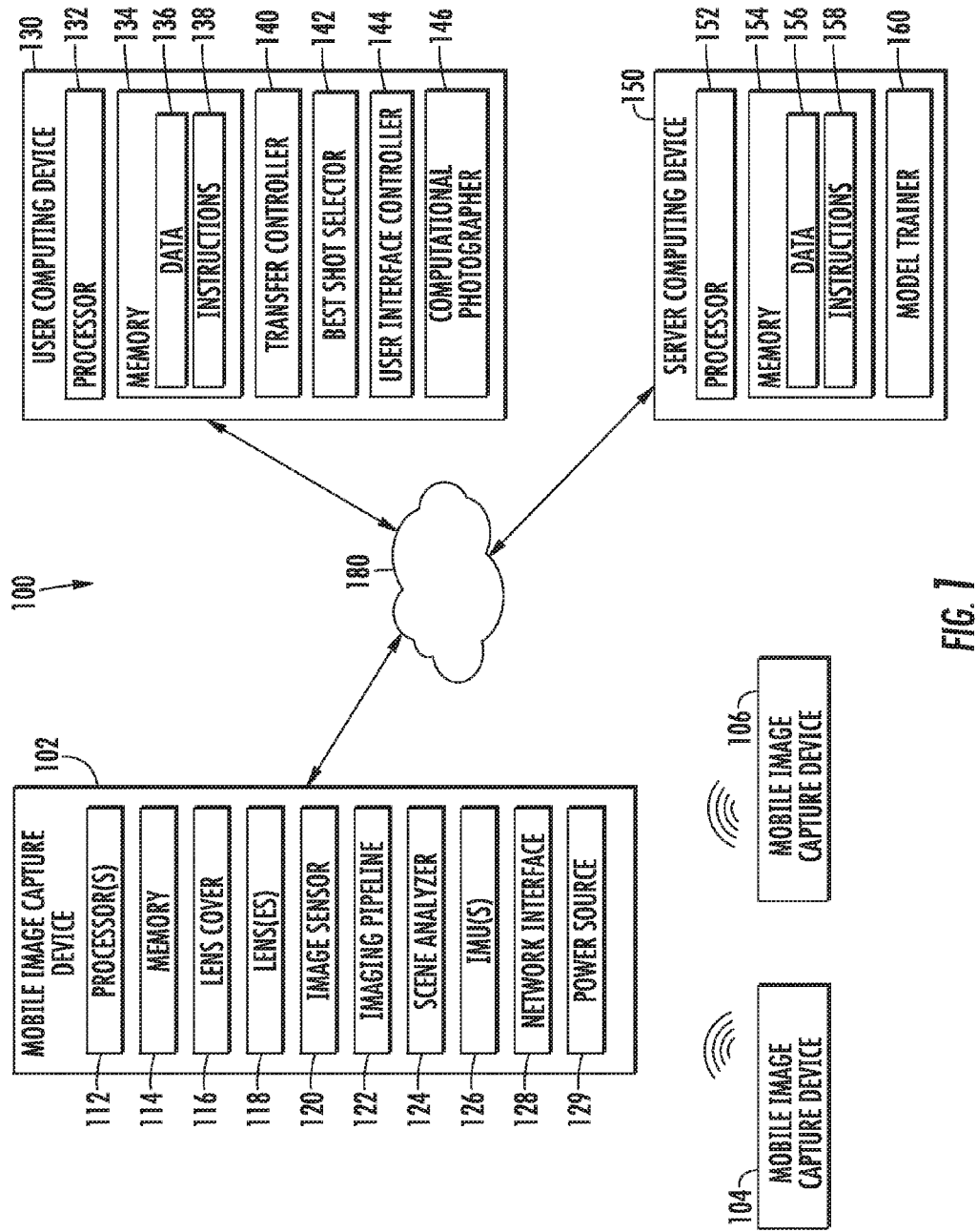
FIG. 1 depicts an example image capture, curation, and editing system according to an example embodiment of the present disclosure.

The present disclosure provides systems and methods for selective retention and editing of images captured by a mobile image capture device. In particular, an example system of the present disclosure includes a resource-efficient mobile image capture device that is selectively communicatively coupleable with a user computing device such as a smartphone, laptop, or tablet. When operative, the mobile image capture device can continuously capture frames of imagery and can selectively retain certain of such frames of imagery. The user computing device can perform image curation, editing, storage, sharing, and other tasks. The system can be used for life logging or other immersive image capture experiences or objectives.

More particularly, according to an aspect of the present disclosure, the mobile image capture device includes on-device intelligence that assists in selecting only certain of the captured images for compression and storage. As an example, the mobile image capture device can include a scene analyzer that analyzes a scene depicted by an image to assess a desirability of such scene and, based at least in part on such desirability, determines whether to store such image and/or one or more other contemporaneous images or to discard such image and/or other images without further storage. In some implementations, the scene analyzer includes one or more neural networks, such as deep neural networks or other multi-layer non-linear models which output descriptors of the desirability of the scene of an input image. As compression, storage, and transmission of images are the stages of the image processing cycle which require the largest energy expenditure, the selective retention of imagery as guided by the on-device intelligence drastically reduces the power consumption of the mobile image capture device and enables superior performance given limited energy resources (e.g., a battery) and device temperature constraints. Likewise, the selective retention of imagery as guided by the on-device intelligence also drastically reduces the memory consumption of the mobile image capture device over time.

Furthermore, the mobile image capture device can operate according to a number of different capture modes. For example, the different capture modes can correspond to various combinations of different image resolutions and frame rates. Further, the different capture modes may have different energy consumption characteristics or profiles. For example, a capture mode with a larger image resolution and/or frame rate will typically require larger energy expenditure by the device.

Thus, according to another aspect of the present disclosure, the on-device intelligence of the mobile image capture device (e.g., the scene analyzer), can also make control decisions regarding the capture mode of the image capture device. For example, if the scene analyzer determines that a recently captured image depicts a scene that is highly desirable, the scene analyzer can transition the image capture device into a capture mode that has a larger image resolution and/or frame rate, thereby capturing more high resolution images of the desirable scene. In such fashion, the mobile image capture device can reserve operation in capture modes that consume relatively larger amounts of energy for periods of time in which relatively more interesting or desirable scenes are available for image capture, while operating in energy-conserving capture modes during periods of time in which the scenery available for capture is relatively less interesting or desirable.

In some implementations, in addition to frame rate and resolution, the on-device intelligence (e.g., the scene analyzer) of the mobile image capture device can adjust one or more of exposure time, gain, region of interest or crop, binning mode, or other parameters of the image capture device based on an analysis of captured imagery. For example, control signals can be provided to an image sensor of the mobile image capture device to control the above described parameters. In some implementations, the above noted parameters can be adjusted without changing between capture modes of the image capture device. However, different capture modes of the image capture device may respectively correspond to different settings for the above noted parameters.

Furthermore, as will be discussed further below, the mobile image capture device can have a low power framework that has different configurations and/or workflows respectively for the number of different capture modes. Thus, the advanced scene analysis and control features of the mobile image device enable operation of the mobile image capture device for significant periods of time despite having power source, memory availability, computational power, and device temperature constraints.

According to another aspect of the present disclosure, the user computing device can perform image curation and enable user editing of the images. In particular, in some implementations, when connected to the mobile image capture device (e.g., after a capture session has been completed), the user computing device can select a certain set of the images stored at the image capture device for transfer to the user computing device. For example, such selection can be guided by various image attributes as reflected in various metadata annotations provided by the mobile image capture device respectively for the stored images during the real-time operation. Generally, the most desirable images will be selected for transfer, while maintaining a diversity of imagery. The user computing device can also provide a user interface that enables the user to selectively edit the transferred images. In particular, the user interface can enable various advanced image editing techniques such as computational photography, camera repositioning, etc.

Collectively, the user interface and associated editing tools empower the user to compose the photograph the user would have taken, had she been able to freeze time, explore the nuances of a moment, take out her camera or phone without forcing persons around her to alter their behavior, open a camera application, figure out the best way to hold the camera, and then capture the image. Ultimately, the systems and methods of the present disclosure provide superior results while saving time, effort, and management anxiety. In particular, in some implementations of the present disclosure, the mobile image capture device has a low power framework that leverages one or more machine learned models to control image storage and capture mode based on image desirability, thereby eliminating the energy consumption associated with storage and capture of less desirable images.

In some implementations, the mobile image capture device includes a lens cover; one or more lenses (e.g., a wide angle lens); an image sensor; an imaging pipeline that contains one or more image processing components; the scene analyzer; one or more inertial motion units (IMUs); a network interface; and a power source such as a battery. The mobile image capture device can also include one or more processors and one or more memory units, including, for example, volatile memory (e.g., DRAM) and non-volatile memory (e.g., flash memory).

In some implementations, at least during some modes of operation, the mobile image capture device continuously captures the plurality of images (e.g., continuously captures images at a frame rate of at least one frame per second). However, as noted above, the mobile image capture device may ultimately store only certain selected ones of the continuously captured images.

In one example implementation, the lens cover of the mobile image capture device can be manually adjustable between a position that optically blocks the lens and image sensor and a position that does not optically block the lens and image sensor. When the lens cover is placed into the position that optically blocks the lens and image sensor, the mobile image capture device responds by operating in an ultra-low power mode in which images are not actively captured. However, when the lens cover is removed or otherwise placed into a position that does not optically block the lens and image sensor, the mobile image capture device can operate to continuously capture and process the plurality of images, as described above.

In particular, according to an aspect of the present disclosure, in some modes of operation, the mobile image capture device can be operable to capture a plurality of images that respectively depict a plurality of scenes; maintain a first copy of each of the plurality of images in a temporary image buffer; determine at least one descriptor of the desirability of the scene depicted by at least one of the images; and determine, based at least in part on the at least one descriptor of the desirability of the scene of the at least one image, whether to store a second copy of such image and/or one or more of the other images in a non-volatile memory of the mobile image capture device or to discard the first copy of such image(s) from the temporary image buffer without storing a second copy of such image(s) in the non-volatile memory. In other modes of operation, which will be discussed further below, imagery can be stored in the non-volatile memory without scene analysis.

More particularly, as noted above, the mobile image capture device can include a scene analyzer which, at least in some modes of operation, is implemented to analyze a desirability of the scene of an image to determine whether to store such image and/or one or more other contemporaneous images. For example, in one example implementation, the mobile image capture device captures (and buffers) a sequence of frames close to each other in time (e.g. a three second "video" at fifteen frames per second). The scene analyzer can analyze only a subset of the frames (e.g. three of the forty-five frames included in the "video") to determine the desirability of the scene depicted by the frames. Based on such analysis, the scene analyzer can determine whether to save all or part of the sequence of frames. The scene analyzer may also adjust the capture mode of the camera or other capture parameters such as frame rate, resolution, exposure, gain, region of interest, crop, and binning mode based on the analysis of the captured image(s). In addition, in some implementations, the scene analyzer can analyze raw, unprocessed imagery and make or assist in making decisions about processing the imagery with an imaging pipeline.

As an example, in some implementations, the scene analyzer of the mobile image capture device includes at least one neural network and uses such neural network to obtain the at least one descriptor of the desirability of the scene of each analyzed image, as described above. In particular, the scene analyzer can input the image to the at least one neural network and receive the at least one descriptor as an output from that at least one neural network.

As a further example, in some implementations, the at least one neural network of the scene analyzer includes at least one convolutional neural network. As yet another example, in some implementations, the scene analyzer includes a plurality of deep neural networks or other multi-layer non-linear models that respectively analyze a plurality of different characteristics of each input image. Each of the deep neural networks can output at least one descriptor for each image that is input into such deep neural network. As an example, each neural network can provide as output an annotation that describes a characteristic of the scene of an input image. The image can be annotated with the annotation(s).

As examples, the deep neural networks can include one or more of the following: a face detection deep neural network that detects a presence and/or location of one or more faces in the scene of each input image; a face recognition deep neural network that matches one or more faces in the scene of each input image to one or more other faces; a face attributes deep neural network that detects various facial characteristics of one or more faces in the scene of each input image; a face photogenic model that outputs a score which represents a level of photogenicness of a face pose and expression; a facial landmark detection deep neural network that detects one or more facial landmarks such as a position of eyes, a position of nose, or other facial landmarks; an image content deep neural network that outputs one or more semantic labels that describe the scene of each input image; and a photo quality deep neural network that outputs a photo score that describes various photographic quality characteristics of each input image. Various other neural networks which analyze various other characteristics of the input image can be implemented or employed as well. The neural networks can be non-recurrent, recurrent, or a combination thereof. Furthermore, in some implementations, certain neural networks described above (e.g., the face detection neural network) can include or be implemented as a cascade of multiple neural network rather than a single neural network.

In some implementations, the scene analyzer includes at least one multi-headed deep neural network that receives a single set of inputs and provides a plurality of outputs. The plurality of outputs can respectively include a plurality of descriptors of the desirability of the scene of each input image. As one example, two or more of the above described neural networks can be combined to form a multi-headed deep neural network. For example, the face recognition deep neural network can be combined with the face attributes deep neural network to form a multi-headed neural network. In particular, as one example, image portions selected based on the outputs from the face detection deep neural network (e.g., a crop of the image which contains a face detected by the face detection deep neural network) can serve as inputs to a multi-headed neural network which represents a combination of the face recognition deep neural network and the face attributes deep neural network. The multi-headed combination of the face recognition deep neural network and the face attributes deep neural network can output both face recognition output (e.g., a face embedding) and face attribute information rather than having two separate networks for the two purposes.

In some implementations, the output from various portions of the scene analyzer can be used to make better decisions inside an imaging pipeline that processes the images. For example, the output of the face detection deep neural network can be used to set or adjust the exposure in the imaging pipeline in such a way that faces are well-exposed.

According to another aspect of the present disclosure, in some implementations in which the scene analyzer includes a plurality of models such as neural networks, the scene analyzer can also include a model selector that controls which models (if any) an image is input for scene analysis. The model selector can select which models to employ depending on a number of criteria including computational consumption considerations, energy consumption considerations, and/or the results of an initial analysis of the scene of the image. As one example, the model selector can simply implement a predefined schedule or can implement some defined logic regarding an ordering or configuration of models to employ. As another example, the model selector may itself be a model (e.g., neural network), such as a multi-layer non-linear model (e.g., deep neural network).

In some implementations, the model selector includes an attention model that analyzes only a portion of an input image. The attention model can output an indication of whether each input image should be input into at least one of the downstream models for further scene analysis. Thus, the attention model can operate as a prefilter to the other deep neural networks included in the scene analyzer. As one example, the attention model can be a recurrent deep neural network that tracks a face through a succession of images and outputs a probability that each analyzed image depicts the face experiencing joy. The attention model can also output a description of which portion of the next input image the attention model should analyze. In addition, in some implementations, the attention model can also output how much time should pass before capturing and analyzing a second image.

Use of an attention model in this fashion can greatly reduce the energy consumption of the mobile image capture device since the attention model, which limits its capture and/or analysis to only a portion of the images, guards certain downstream models which may analyze the image in its entirety and/or require larger computational expenditure. Further, delaying the period of time recommended by the attention model before again capturing and analyzing imagery can result in power savings. In other implementations, the attention model can be used in place of the other models to guide image storage and/or capture mode decisions. In yet further implementations, one or more of the various deep neural networks discussed above can be replaced with an attention model version of such network.

Thus, the scene analyzer can include a number of models which analyze the scene depicted by an input image and output various descriptors (e.g., annotations) that describe a desirability of the scene of the input image (e.g., describe various image characteristics which impact the desirability of the scene). As noted, the scene analyzer can make intelligent decisions regarding image storage and/or capture mode on the basis of such descriptors. In particular, the scene analyzer can include a save controller, a transfer controller, and/or a mode controller. The save controller can take as input all of the annotations from the models and use such annotations to decide whether or not to process, compress, and/or store the image. The transfer controller can take as input all of the annotations from the models and use such annotations to decide whether or not to send the image. In other implementations, the transfer controller is included in a user computing device rather than the image capture device. The mode controller can determine whether to change the capture mode of the mobile image capture device on the basis of such annotations. The save controller, the transfer controller, and the mode controller can be separate components or can be combined into a single component.

According to yet another aspect of the present disclosure, in some implementations, the mobile image capture device is further operable to receive data that describes a set of entities having an elevated importance to a user of the mobile image capture device. For example, the set of entities may include one or more faces or semantic entities (e.g., "mountains," "playground," or "Eiffel tower"). As one example, the mobile image capture device is operable to perform face recognition with respect to one or more of the captured images to recognize one or more faces depicted in the plurality of images. Thereafter, the user computing device can enable the user to select one or more of the recognized faces as having a heightened importance to the user.

Such set of entities having an elevated importance to the user of the mobile image capture device can be communicated back and forth between the user computing device and the mobile image capture device and can impact both capture and editing decisions. As one example, the mobile image capture device can increase a probability of storing captured images which depict the one or more selected faces. For example, the scene analyzer can include a face recognition model which compares embeddings of the set of selected faces to embeddings of faces detected within captured images and outputs a probability of match, where images that include matches are more likely to be selected for compression and storage. As another example, during editing, faces that do not correspond to faces included in the set of faces having heightened importance can be automatically blurred or otherwise defocused. Systems of the present disclosure can perform many other intelligent operations given knowledge of the set of entities that have elevated importance to the user.

According to another aspect of the present disclosure, each mobile image capture device may be operable to communicate with other mobile image capture devices that are located within the same general area. As one example, the mobile image capture device may be operable to transmit an excitement signal that is wirelessly receivable by one or more other mobile image capture devices that are located proximate to the mobile image capture device. The excitement signal indicates that the scene depicted by one of the plurality of images recently captured by the mobile image capture device has a relatively large desirability. Thus, the mobile image capture device may send wireless signals (e.g., Bluetooth Low Energy broadcasts) to alert nearby devices that an interesting scene is available for capture.

Furthermore, in some implementations, in response to receipt of the excitement signal, the one or more other mobile image capture devices perform at least one of the following: increase a probability that the other mobile image capture device will store a non-temporary copy of a recently captured image; attempt to identify a match for one or more embeddings included in the excitement signal within the recently captured image; and adjust one or more of a frame rate, a gain, an exposure time, a region of interest, a crop, a binning mode, and a resolution of an image sensor of the other mobile image capture device.

According to yet another aspect of the present disclosure, in some implementations, the mobile image capture device is operable to periodically provide a capture visualization to the user computing device for display by the user computing device. In particular, display of the capture visualization by the user computing device is indicative of present operation of the mobile image capture device. Typically, the capture visualization will be some representation of recently captured imagery (e.g., a histogram, icon, etc.) without being the captured imagery itself. Thus, the capture visualization may be based at least in part on one or more recently captured images of the plurality of images. Use of capture visualizations in such fashion enables the user to understand that the mobile image capture device is operating and capturing imagery, but prevents distracting the user from actually enjoying the captured moment by showing detailed imagery for review.

According to another aspect of the present disclosure, the mobile image capture device can include a low power framework for processing imagery. One example low power framework of the present disclosure includes an image sensor that provides raw image data; an imaging pipeline that streams the raw image data from the image sensor and processes the raw image data to generate one or more first images; a temporary image buffer that temporarily stores the first image(s); and the scene analyzer, as described above. The low power framework can further include a compression component that compresses the first image(s) only when the scene analyzer analyzes at least one of the one or more first images and determines that the first image(s) should be non-temporarily stored. The low power framework can further include a non-volatile memory to which the first image(s) is/are written after compression.

As noted above, the mobile image capture device can be operable in a number of different image capture modes. The scene analyzer can control the capture mode of the mobile image capture device depending upon its analysis of the scenes of recently captured images. More particularly, in some implementations, the image sensor of the mobile image capture device is operable to receive an image sensor control signal and to adjust, based at least in part on the control signal, of a frame rate and/or a resolution at which the image sensor captures imagery. Thus, depending upon its analysis of the scenes of recently captured images, the scene analyzer can cause the image sensor control signal to be provided to the image sensor to adjust the frame rate and/or the resolution of the image sensor.

As one example, in some implementations, when the scene analyzer determines that the scene depicted by the first image is desirable, the scene analyzer increases at least one of a frame rate or a resolution at which the image sensor provides the raw image data. Likewise, when the scene analyzer determines that the scene depicted by the first image is not desirable, the scene analyzer decreases at least one of a frame rate or a resolution at which the image sensor provides the raw image data.

As another example, in some implementations, the image capture device is operable in at least a low resolution capture mode, a high resolution capture mode, and a burst capture mode. During regular operation, the image capture device periodically transitions between the low resolution capture mode and the high resolution capture mode. When the scene analyzer determines that a particular scene depicted by a particular image is desirable, the scene analyzer causes the image capture device to transition to the burst capture mode or otherwise increase the frame rate and/or the resolution. In some implementations, the image capture device may be further operable in a hyper-lapse capture mode.

In addition, the low power framework may have varying workflows or configurations depending upon the capture mode of mobile image capture device. In particular, the scene analyzer of the image capture device can perform different roles of varying importance depending upon the current capture mode of the image capture device. Thus, control of image capture mode based on scene analysis can have energy consumption benefits, as tasks which require larger energy expenditure (e.g., processing, compression, and storage of high resolution imagery) can be limited to situations in which the scene analyzer has determined that a desirable scene is currently available for image capture.

In some implementations, in the low resolution capture mode, the image sensor performs binning to provide low resolution raw image data; the imaging pipeline streams the low resolution raw image data from the image sensor and processes the low resolution raw image data to generate a low resolution version of each of the one or more first images; the temporary image buffer temporarily stores the low resolution version(s) of the first image(s); and the scene analyzer analyzes the low resolution version of at least one of the first image(s) to determine whether to non-temporarily store the low resolution version(s) of the first image(s) (e.g., in a non-volatile memory) or to discard the low resolution version(s) of the first image(s) (e.g., without storing it in the non-volatile memory).

Likewise, in some implementations, in the high resolution capture mode, the image sensor provides high resolution raw image data (e.g., does not perform binning at the sensor); the image capture device further comprises a temporary raw data buffer that temporarily stores the high resolution raw image data; the image capture device further comprises a down sampler that streams the high resolution raw image data from the image sensor and down samples the high resolution raw image data to output low resolution raw image data; the imaging pipeline streams the low resolution raw image data from the down sampler and processes the low resolution raw image data to generate a low resolution version of each of the one or more first images; the temporary image buffer temporarily stores the low resolution version(s) of the first image(s); and the scene analyzer analyzes the low resolution version of at least one of the first image(s) to determine whether to non-temporarily store the first image(s) or to discard the first image(s). The down sampler can be positioned at the beginning of the imaging pipeline or positioned at the end of the imaging pipeline. Placing the down sampler at the beginning of the imaging pipeline provides increased power/energy savings but will typically requires a trade off in image quality.

Furthermore, in some implementations, in the high resolution capture mode, when the scene analyzer determines that the first image(s) should be non-temporarily stored, the imaging pipeline receives the high resolution raw image data from the temporary raw data buffer and processes the high resolution raw image data to generate high resolution version(s) of the first image(s). The compression component compresses the high resolution version(s) of the first image(s) for storage at the non-volatile memory.

More generally, in some implementations, in the high resolution capture mode, the mobile image capture device is operable to: maintain data sufficient to generate a high resolution temporary copy of each of the plurality of images; input a low resolution copy of at least one of the plurality of images into the at least one neural network; and determine, based at least in part on the at least one descriptor of the desirability of the scene of the at least one image, whether to store a high resolution non-temporary copy of such image and/or one or more contemporaneous images in the memory of the mobile image capture device or to discard the high resolution temporary copy of such image and/or one or more other images without storing a non-temporary copy of such images.

In some implementations, in the burst capture mode, the image capture device captures high resolution images at a high frame rate and performs imaging pipeline operations, compression, and storage at the non-volatile memory for all of the captured high resolution images, with little to no scene analysis. As one particular example, in the burst capture mode, the imaging pipeline can stream the raw image data from the image sensor and process the raw image data to generate a second image. The second image can bypass the scene analyzer and be provided to the compression component for compression and then storage at the non-volatile memory. Thus, during the burst capture mode, the image capture device can dedicate its limited resources to compression and storage of high resolution imagery, rather than scene analysis (or at least the most resource consuming portions thereof).

In some implementations, the image capture device can perform scene analysis on images without processing or prior to processing the image using the imaging pipeline. For example, in some implementations, the scene analysis models can be trained to operate on raw images rather than processed images which have passed through the imaging pipeline. In particular, raw images can be used as training examples for the models. Thus, the "full" imaging pipeline can be dependent on a scene analysis result. In such configuration, resources can be saved by not running the imaging pipeline on images which are not desirable.

According to another aspect of the present disclosure, the systems of the present disclosure include a user computing device that is communicatively connectable to the mobile image capture device. In particular, the user computing device can perform image curation and enable user editing of the images. The user computing device can also enable storage, sharing, and other image management features.

In some implementations, the user computing device and the mobile image capture device are operable to perform visual pairing. In one example, the user computing device is operable to visually display a pattern. The mobile image capture device is operable to capture imagery of the pattern and, in response to capturing the imagery of the pattern, communicatively connect to the user computing device. For example, the pattern can be a visual encoding of a key or other information sufficient to enable communicative connection. In other implementations, the user computing device and the mobile image capture device may have other pairing techniques.

According to another aspect of the present disclosure, when connected to the mobile image capture device (e.g., after a capture session has been completed), the user computing device can select certain of the stored images for transfer to the user computing device. For example, such selection can be guided by various image attributes as reflected in various metadata annotations provided by the mobile image capture device respectively for the stored images.

As an example, the user computing device can include a transfer controller that determines, based at least in part on at least one descriptor of the desirability of the scene depicted by each image stored in the memory of the mobile image capture device, whether to request transfer of such image and/or one or more other contemporaneously captured images from the mobile image capture device to the user computing device. In particular, in some implementations, the transfer controller can perform an optimization algorithm to select which of the images stored in the memory of the mobile image capture device to request for transfer. The optimization algorithm can have a plurality of associated objectives which include, for example, at least a diversity of settings and a diversity of depicted persons, while still requesting transfer of the most desirable images. In some implementations, the transfer controller can implement a submodular function to select which images to request for transfer.

Furthermore, the images captured by the mobile image capture device can be organized into one or more reflections. A reflection can generally include all images captured during a particular session of usage of the mobile image capture device. For example, images captured during a day hike may be grouped within a single reflection. A reflection can include one or more moments. A moment includes a series of images that are temporally proximate to each other. For example, a moment can include a series of images that were captured over a two to five second time span.

In one aspect of the present disclosure, the user computing device can select one or more highlight images for each moment included in a reflection. For example, selection of highlight images may be performed based on the annotations or other metadata included for each of the images. In some implementations, each image in a moment is normalized relative to its peer images within such moment prior to performing highlight selection. Thus, selection of a highlight image for each moment can be based at least in part on a comparison of the annotations of each image included in such moment relative to the annotations of at least one other image included in such moment.

According to yet another aspect of the present disclosure, the user computing device can also provide a user interface that enables the user to selectively edit the transferred images. In particular, the user interface can enable two modalities of gesture control in service of photographic "re-composition": temporal and spatial. More particularly, as will be discussed further below, the user can navigate through a sequence of images using a first gesture or set of gestures. The user can also select and then spatially explore a particular image using a second gesture or set of gestures. In particular, the user interface can enable the user to control a virtual camera to photograph a scene after-the-fact, with access to controls for ISO, depth of field, stabilization, camera orientation, camera movement, camera orbit, and other parameters. The user interface can also enable various advanced image editing and exploration techniques by leveraging computational photography, camera repositioning via view synthesis, and other advanced image editing techniques.

In one example feature of the user interface, a user can select a particular reflection for review. The reflection may contain multiple moments, which each consist of a series of images. In response to the user selection, the user computing device can provide a user interface which allows the user to navigate between the moments included in the reflection or to scroll between images contained within a particular moment. For example, a user can navigate between moments by quickly dragging (e.g., swiping) left or right on a touch interface, while the user can scroll between images contained in the particular moment by slowing dragging left or right on the touch interface. Such functionality may be viewed as a shuttle or scrub control.

More particularly, in some implementations, the user computing device can either navigate between moments or images within a moment depending on a speed of a drag gesture performed by the user. As one example, the user computing device can receive data that describes a drag gesture performed by a user and determine whether a speed of the drag exceeds a threshold value. When it is determined that the speed of the drag exceeds the threshold value, the user computing device can transition from a presently displayed moment to another moment included in the reflection. However, when it is determined that the speed of the drag does not exceed the threshold value, the user computing device can visually scroll through the plurality of images included in the presently displayed moment. In some implementations, visual scrolling of images included in a moment can be triggered by a tap gesture from the user in addition or alternatively to a drag gesture.

In some implementations, visually scrolling through the plurality of images included in a moment can include cinematically scrolling, by the user computing device, the plurality of images included in the presently displayed moment by sequentially displaying the plurality of images included in the presently displayed moment without translating the plurality of images included in the presently displayed moment relative to the display. Thus, the series of images included in a moment can be displayed in the style of a "flip book" such that at least a portion of the moment is presented cinematically.

However, in some implementations, to provide a contrast to the cinematic presentation of images contained within a moment, when the user computing device transitions between moments, the user computing device can translate one of the images included in the presently displayed moment off of the display while translating one of the images included in the other moment onto the display. This has the effect of visually announcing the transition between moments, similar to the frame by frame presentation of a comic book.

According to another aspect of the present disclosure, the user computing device can visually scroll a series of images contained in a moment in a fashion which provides enhanced presentation of the at least one highlight image selected for such moment. As one example, when scrolling through images contained in a moment, the user computing device can reduce a velocity at which the plurality of images are visually scrolled when the at least one highlight image is provided on the display. Stated differently, the visual scrolling can pause on the at least one highlight image or the at least one highlight image can have a display duration that is greater than its peer images. As another example, the user computing device can incrementally reduce the velocity at which the plurality of images are visually scrolled as the at least one highlight image is approaching display. For example, the visual scrolling can slow and then stop upon the highlight image.

In some implementations of the present disclosure, the user computing device can determine a plurality of tension values respectively for the plurality of images based at least in part on the plurality of annotations respectively associated with the plurality of images. Thereafter, the user computing device can visually scroll the plurality of images at the velocity which is non-constant and which is inversely proportional to the tension value of a currently displayed image. Thus, images with relatively larger tension values will be displayed for a greater duration than images with relatively smaller tension values, where the magnitude of an image's tension value is indicative of the desirability of the scene depicted by such image.

In some implementations, the user computing device is further operable to determine a recommended composition for each of the plurality of images included in a reflection. For example, the recommended composition for each image can be based at least in part on the at least one annotation associated with such image. In addition, the recommended composition for each image can include a recommended portion of such image. In such implementations, visually scrolling the plurality of images on the display can include visually scrolling only the respective recommended portions of the images on the display. Furthermore, in some implementations, the plurality of images transferred from the mobile image capture device are wide angle images. In such implementations, the recommended composition for each image can include an unwarped portion of such image.

According to another aspect of the present disclosure, the user computing device can enable the user to perform a number of advanced editing features on the transferred images. For example, as noted above, the mobile image capture device can include a wide angle lens, which can result in capture and storage of wide angle images by the mobile image capture device. Thus, as a feature of the editing process, the user computing device can dewarp the wide angle images and output a selected dewarped portion as a narrow angle image. In particular, the user computing device can enable a user to re-position the camera and/or non-destructively crop a certain portion of an image.

As an example, in some implementations, the user computing device is operable to: receive at least a first wide angle image captured by the mobile image capture device; project the first wide angle image onto a curved surface; provide a user interface that enables a user to manipulate a perspective of a virtual camera to view different portions of the first wide angle image as projected onto the curved surface; receive a user input selecting a current perspective of the virtual camera; and in response to the user input, output a first narrow angle image that corresponds to the current perspective of the virtual camera when the user input was received. In some implementations, the curved surface onto which the wide angle image is projected is a hemisphere. The virtual camera can be positionable to view different portions of the concave surface of the hemisphere.

Thus, the user computing device can provide an interactive tool that permits a user to reposition and/or reorient a virtual camera to gain a different perspective of a wide angle image projected onto a curved surface. In particular, controls can be provided for camera orientation, camera position (and movement thereof); and camera orbit. The virtual camera can be controlled according to any suitable control scheme, including, for example, according to various multi-touch gestures.

After the perspective of the camera has been adjusted, a new image that corresponds to the selected perspective can be output by recalculating one or more camera parameters (e.g., focus, lens distortions, lighting, etc.) that would result from the new perspective. In addition, in some implementations of the present disclosure, advanced image processing techniques such as superresolution, hyper-lapse, texture mapping, depth mapping, view synthesis, etc. can also be applied to output synthetic or computed images that are generated from a combination of the transferred images. Likewise, controls may be provided for ISO, depth of field, stabilization, and other image parameters or characteristics.

In particular, the user computing device can receive user input that selects the current perspective of the virtual camera. In one example, the user input can be a press and release (i.e., tap) of a record button included in the user interface or a press and hold of a record button included in the user interface. When the user input is a press and release of the record button, the user computing device can output a still image that corresponds to the current perspective of the virtual camera, as described above. When the user input is a press and hold of the record button, the user computing device can output a video that includes a series of images from the moment, as viewed from the current perspective of the virtual camera. Each image in the video can have edited or otherwise adjusted camera parameters (e.g., focus, lens distortions, lighting, etc.) that would result from the current perspective of the virtual camera, as described above.

According to another aspect of the present disclosure, in some implementations, the user computing device is further operable to determine a recommended composition for one or more (e.g., all) of the transferred images. In some implementations, the recommended composition includes only a portion of a wide angle image (e.g., a dewarped portion). The user computing device can determine the recommended composition based at least in part on the annotations or other metadata associated with the image. For example, the recommended composition may correspond to a portion of the wide angle image that includes only faces that correspond to entities included in the set of entities that have elevated importance to the user.

Furthermore, the user computing device can initialize the virtual camera within the editing user interface such that an initial perspective of the virtual camera corresponds to the recommended composition. For example, the initial presentation of the image within the user interface can display only the portion that corresponds to the recommended composition. However, the user is able to reposition and/or reorient the virtual camera away from the recommended composition.

Thus, the user interface can enable the user to "re-take" one or more photographs and/or videos from the images included in a moment. Once created by the user, the user computing device can store the one or more photographs and/or videos at various locations. As one example, the user can elect to have photographs and/or videos created via the editing interface stored directly to the camera roll of the user computing device. The camera roll can also include photographs captured by a camera of the user computing device. Thus, by outputting images generated according to the present disclosure directly to the camera roll, the generated images can be treated as if they were captured by the user computing device. Further, the user is given the sensation that they have "captured" new images through the editing process.

In another feature, the user computing device can automatically generate an album for a reflection without requiring user-guided editing. For example, the automatically generated album can include at least one highlight image selected from each moment of the reflection, for example, according to the technique discussed above. The highlight images can also be non-destructively cropped according to the recommended compositions determined for such images.

The user computing device can also enable sharing and/or storage of images. Such may be accomplished, in some instances, through communication with a server computing device. In particular, the server computing device can retain a data store of captured images and can facilitate sharing with other persons and/or devices. In some implementations, sharing of data can include sharing the raw images that form a reflection, so that additional users can optionally "re-take" "new" images for themselves from the same data, according to the editing interface discussed above.

In some implementations of the present disclosure, to ensure privacy of the user and those persons depicted in images captured by the mobile image capture device, the user computing device uploads to the server computing device only images that are requested for upload to the server computing device during or as a result of a user-controlled editing session. Thus, no images are uploaded to the server computing device absent uploading instructions from the user. Therefore, all personal data is maintained under control of the user at his or her personal device.

According to another aspect of the present disclosure, the user computing device can infer person-based sharing intents from recognition within a reflection. As one example, in some implementations, the mobile image capture device is operable to perform face recognition with respect to each of a plurality of images included in a reflection to recognize one or more faces depicted in the plurality of images. Further, the user computing device can be operable to: enable the user to share the one or more images received from the mobile image capture device with one or more contacts; determine one or more relationships between the one or more contacts with whom the one or more images are shared and the one or more faces depicted in the shared images; and suggest, with respect to subsequent images received from the mobile image capture device in which the one or more faces are recognized, that the user share such subsequent images with particular ones of the one or more contacts based at least in part on the one or more relationships.

According to another aspect, in some implementations, the mobile image capture device may periodically receive one or more updated versions of one or more models included in its scene analyzer from the user computing device and/or the server computing device. In particular, the one or more updated versions of the one or more models may have been trained (e.g., by a model trainer at the server computing device) on additional data. For example, the additional data can be images that the user created through the editing interface. Thus, in some implementations, the models of the image capture device can be trained on personalized data sets to better infer, capture, and store images which satisfy the particular visual tastes of the user and then can be updated on the image capture device itself.

In some implementations, in order to obtain the benefits of the techniques described herein, the user may be required to allow the collection and analysis of images, location information, a set of entities that have elevated importance to the user, and/or other data associated with the user or the user's mobile computing device(s). Therefore, in some implementations, users may be provided with an opportunity to adjust settings that control whether and how much the systems of the present disclosure collect and/or analyze such information. However, if the user does not allow collection and use of such information, then the user may not receive the benefits of the techniques described herein. In addition, in some embodiments, certain information or data can be treated in one or more ways before or after it is used, so that personally identifiable information is removed or not stored permanently.

With reference now to the Figures, example embodiments of the present disclosure will be discussed in further detail.

FIG. 1 depicts an example image capture, curation, and editing system 100 according to an example embodiment of the present disclosure. The system 100 includes at least one mobile image capture device 102 and a user computing device 130. The system 100 may also include one or more additional mobile image capture devices 104 and 106 and/or a server computing device 150.

The mobile image capture device includes one or more processors 112 and a memory 114. The one or more processors 112 can be any suitable processing device and can be one processor or a plurality of processors that are operatively connected. In some implementations, the processor 112 includes a dedicated vision processing platform that delivers high-performance machine vision and visual awareness in a power-constrained environment. For example, the processor 112 can be a system-on-a-chip (SoC) designed for high-performance, low-power computational imaging. In some implementations, the processor 112 includes hardware, software, and/or firmware that is selectively usable to perform a complete image processing pipeline on-chip. In some implementations, the processor 112 includes multiple vector processors optimized for vision processing workloads.

The memory 114 can include one or more non-transitory computer-readable mediums, such as RAM, ROM, EEPROM, EPROM, flash memory devices, magnetic disks, etc., and combinations thereof. In some example implementations, the memory 114 includes at least a first DRAM memory and a second non-volatile memory. For example, the first DRAM memory can be used for temporary storage of various types of image data, while the second non-volatile memory can be used for non-temporary storage of various types of image data. In some implementations, the non-volatile memory includes a flash memory card. In some implementations, the flash memory card is a Secure Digital (SD) card.

The mobile image capture device 102 also includes a lens cover 116, one or more lenses 118, and an image sensor 120. The image sensor 120 can be a sensor that detects incoming light or other electromagnetic radiation and outputs data sufficient to generate an image of a scene. For example, the image sensor 120 can be a CMOS sensor or a CCD sensor. In some implementations, the one or more lenses 118 can include a wide angle lens such that images resulting from data output by the image sensor 120 are wide angle images.

In some implementations, the lens cover 116 of the mobile image capture device 102 can be manually adjustable between a position that optically blocks the lens 118 and image sensor 120 and a position that does not optically block the lens 118 and image sensor 120. When the lens cover 116 is placed into the position that optically blocks the lens 118 and image sensor 120, the mobile image capture 102 device responds by operating in an ultra-low power mode in which images are not actively captured. However, when the lens cover 116 is removed or otherwise placed into a position that does not optically block the lens 118 and image sensor 120, the mobile image capture device can operate to continuously capture and process the plurality of images.

In some implementations, the lens cover 116 can have a visually distinctive exterior-facing surface. In such fashion, when the lens cover 116 is covering the lens 118 it is readily apparent to persons within the visible range of the image capture device 102 that the mobile image capture device 102 is not actively capturing imagery. For example, the lens cover 116 can have a brightly colored and/or patterned design which provides a glanceable indication regarding the current capture status of the mobile image capture device 102.

In some implementations, the user can adjust the lens cover 116 to provide input control signals for the mobile image capture device 102. As one example, in some implementations, if the user opens and closes the lens cover 116 according to a certain pattern (e.g., three consecutive closings and then openings), the mobile image capture device 102 can respond by deleting a certain period of recently captured imagery (e.g., the last five minutes). Such may enable a quick and easy control input for the user to cause deletion of imagery that depicts undesired scenery. Other operations can be performed according to certain other patterns of lens cover manipulation as well.

In some implementations, the user can also provide control signals for the mobile image capture device 102 by making certain recognizable gestures (e.g., hand gestures) within a field of view of the mobile image capture device 102. As an example, the user can use one or both hands (e.g., index finger and thumb) to form one or two corners of a "frame" for a particular scene. The mobile image capture device 102 can recognize such gesture and capture imagery that includes the "framed" scene. Various other gestures can be used as control inputs, as well, including, for example, a gesture to delete recently captured imagery, as described above.

As noted above, the image sensor 120 can output data sufficient to generate images of a scene viewed by the image sensor 120. The mobile image capture device 102 can include various additional components for processing such data from the image sensor 120 to generate such images. As one example, the mobile image capture device can include an imaging pipeline 122. The imaging pipeline 122 can include one or more image processing components that are operable to process the raw data from the image sensor 122 generate images. Example imaging pipelines 122 according to the present disclosure will be discussed below with further reference to FIGS. 9 and 10.

According to another aspect of the present disclosure, the mobile image capture device 102 further includes a scene analyzer 124. In some implementations, the scene analyzer 124 is operable to analyze a scene depicted by an image captured by the mobile image capture device 102 to assess a desirability of such scene and, based at least in part on such desirability, determine whether to store such image and/or one or more other contemporaneously captured images or to discard such image and/or one or more other images without further storage. In some implementations, the scene analyzer 124 includes one or more neural networks, such as deep neural networks or other multi-layer non-linear models which output descriptors of the desirability of the scene of an input image. In addition, in some implementations, the scene analyzer 124 can also make control decisions regarding the capture mode of the mobile image capture device 102 (e.g., based on the desirability of a depicted scene). Example scene analyzers 124 according to the present disclosure will be discussed below with further reference to FIGS. 11 and 12.

The mobile image capture device 102 can further include one or more inertial measurement units (IMUs) 126. The inertial measurement units 126 can be electronic devices that measure and report one or more of a velocity, and orientation, and gravitational forces applied to or otherwise associated with the mobile image capture device 102. For example, the inertial measurement units 126 can include one or more accelerometers, gyroscopes, and/or magnetometers. In some implementations, data from the one or more inertial measurement units 126 can be appended to an image captured around the time such data was generated by the inertial measurement units 126. Thus, for example, an image captured by the mobile image capture device 122 can have as associated metadata the information provided by the inertial measurement units 126 at the time of capture. Such information can be usable by downstream processes, for example, in selecting (or rejecting) particular images due to blur, motion, or other undesirable attributes attributable to unintended movement, jostling, or other physical disturbance of the mobile image capture device (e.g., physical disturbance resultant from a user's gait). Thus, image capture timing can be based on data from IMUs 126.

In some implementations, the mobile image capture device 102 can use the data output by the inertial measurement units 126 to determine if the current movement pattern would result in a desirable hyper-lapse capture. For example, inertial data that indicates a walking pattern can trigger the capture of a hyper-lapse. In some implementations, the mobile image capture device 102 can analyze the data from the inertial measurement units 126 to assist in decisions regarding selecting and/or retaining frames for composing the hyper-lapse. For example, frames which are well-aligned with each other can be selected for composing the hyper-lapse.

In some implementations, the data output by the inertial measurement units 126 can be monitored to detect inertial measurement data indicative of a user tapping the mobile image capture device 102. More particularly, in some implementations, if the mobile image capture device 102 detects that the user has tapped the mobile image capture device 102 (e.g., according to a certain pattern, such as, for example, three consecutive taps), then the mobile image capture device 102 can respond to such tapping by increasing a probability of image storage, performing image capture and storage without scene analysis for a brief period, transitioning the mobile image capture device 102 into a different capture mode (e.g., a burst capture mode), and/or deleting recently captured imagery. Various touch inputs can be mapped to various touch outputs. In other implementations, the mobile image capture device 102 can include other touch-sensitive components to detect the user tapping alternatively or in addition to monitoring the data output by the inertial measurement units 126.

The mobile image capture device 102 further includes a network interface 128. The network interface 128 can include any number of components to provide networked communications (e.g., transceivers, antennas, controllers, cards, etc.). In some implementations, the mobile image capture device 102 includes a first network interface operable to communicate using a short-range wireless protocol, such as, for example, Bluetooth and/or Bluetooth Low Energy, and also a second network interface operable to communicate using other wireless network protocols, such as, for example, Wi-Fi. In one example, the mobile image capture devices 102, 104, and 106 are operable to communicate with each other using a short-range wireless protocol, such as Bluetooth Low Energy. Further, the image capture device 102 can be operable to communicate with the user computing device 130 using either the short-range wireless protocol (e.g., to transmit capture visualizations) or Wi-Fi or other more robust networking protocols (e.g., for the transfer of captured images).

The mobile image capture device 102 can further include a power source 129. Typically, the power source 129 will be an on-board battery, such as an on-board lithium-ion battery. The mobile image capture device 102 can also be electrically connectable (e.g., via a micro USB port or other electrical and/or data connection port) to a wall outlet or other source of utility power or other appropriately rated power. Plugging the mobile image capture device 102 into a wall outlet can recharge the on-board battery. In some implementations, the mobile image capture device 102 is configured to transfer images to the user computing device 130 over network 180 or perform other highly energy consumptive tasks only when the mobile image capture device 102 is connected to an external power source, such as a wall outlet.

In some implementations, the mobile image capture device 102 can be a wearable image capture device. As an example, the mobile image capture device 102 can be medallion-shaped. For example, the mobile image capture device 102 can have a housing with a circular perimeter. The lens 118 and image sensor 120 of the mobile image capture device 102 can be located at an off-center location of the housing (e.g., not at a concentric center of the circular housing). The housing can be beveled at the outer perimeter. Further, in some implementations, the mobile image capture device 102 can be worn around a user's neck suspended from a lanyard. In other implementations, the mobile image capture device 102 can include a clip that permits the user to clip the mobile image capture device 102 to an article of clothing or other personal items.

According to another aspect of the present disclosure, the mobile image capture device 102 may be operable to communicate with other mobile image capture devices that are located within the same general area (e.g., devices 104 and 106). As one example, the mobile image capture device 102 may be operable to transmit an excitement signal that is wirelessly receivable by one or more other mobile image capture devices that are located proximate to the mobile image capture device (e.g., devices 104 and 106), and vice versa. The excitement signal indicates that the scene depicted by one of the plurality of images recently captured by the mobile image capture device 102 has a relatively large desirability. Thus, the mobile image capture device 102 may send wireless signals (e.g., Bluetooth Low Energy broadcasts) to alert nearby devices (e.g., devices 104 and 106) that an exciting, interesting, or otherwise desirable scene is available for capture.

Furthermore, in some implementations, in response to receipt of an excitement signal (e.g., from one of devices 104 or 106), the mobile image capture device 102 performs at least one of the following: increases a probability that the mobile image capture device 102 will store a non-temporary copy of a recently captured image; attempts to identify a match for one or more embeddings included in the excitement signal within the recently captured image; and increases one or more of a frame rate or a resolution of the image sensor 120 of the mobile image capture device 102.

As one example, in some implementations, receipt of an excitement signal from another device may cause the scene analyzer 124 of the receiving image capture device 102 to be more lenient in its storage decisions (e.g., by reducing various thresholds implemented by a save controller portion of the scene analyzer 124 and/or providing the excitement signal as an input to one or more models included in the scene analyzer 124).

As another example, in some implementations, the excitement signals can include information that enables the receiving image capture device 102 to determine whether an image depicts the same scene or portion thereof that excited the transmitting image capture device. Thus, the receiving image capture device 102 can compare abstractions of its presently viewed scene to the received abstractions to determine whether it is viewing the same scene. If the receiving image capture device 102 determines that it is viewing the same scene, then it can implement enhanced capture and storage of such scene.

Excitement signals can be used for capture synchronization as well. In particular, multiple image capture device owners at the same event may obtain some benefit out of capturing imagery with their mobile image capture device simultaneously. For example, if users share their reflections from the event later on, there will be a higher likelihood of desirable scenes being captured and a greater potential for creating special artifacts because more pictures of the same scene from different angles will have been taken by the set of multiple image capture devices. Excitement signals may also act as a booster for computer vision signals like facial expression and gaze path to inform the mobile image capture device about moments of importance.

However, to ensure the privacy of all parties involved, the information included in the excitement signals will not be sufficient for the receiving image capture device to identify or recreate the specific scene viewed by the transmitting image capture device. Instead, the information included in the excitement signal will typically be an abstraction or other low-dimensional representation of the scene that provides only enough information for the receiving capture device to determine (within some probability range) whether it is presently viewing the same scene or portion thereof. For example, such abstractions may include a histogram of various image characteristics (e.g., color, etc.) or may be embeddings retrieved from one or more hidden layers of one or more of models included in the scene analyzer of the transmitting image capture device.

Referring again to FIG. 1, the system 100 further includes the user computing device 130 and the server computing device 150. In some implementations, the mobile image capture device 102 communicatively connects to the user computing device 130 over a local area network portion of network 180, while the user computing device 130 communicatively connects to the server computing device 150 over a wide area network portion of the network 180. In other implementations, the mobile image capture device 102 communicatively connects to the server computing device 150 directly over the wide area network.

The user computing device 130 can perform image curation and enable user editing of the images. In particular, in some implementations, when connected to the mobile image capture device 102 (e.g., after a capture session has been completed), the user computing device 130 can select certain of the images stored at the image capture device for transfer to the user computing device 130. The user computing device 130 can also provide a user interface that enables the user to selectively edit the transferred images. In particular, the user interface can enable various advanced image editing techniques such as computational photography, camera repositioning, etc.

User computing device 130 can be, for example, a computing device having a processor 132 and a memory 134, such as a wireless mobile device, a personal digital assistant (PDA), smartphone, tablet, laptop, desktop computer, computing-enabled watch, computing-enabled eyeglasses, or other such devices/systems. In short, user computing device 130 can be any computer, device, or system that can interact with the mobile image capture device 102 and (e.g., by sending and receiving data) to implement the present disclosure.

Processor 132 of user computing device 130 can be any suitable processing device and can be one processor or a plurality of processors that are operatively connected. Memory 134 can include any number of computer-readable instructions 138 or other stored data 136. In particular, the instructions 138 stored in memory 134 can include one or more applications. When implemented by processor 132, the one or more applications can respectively cause or instruct processor 132 to perform operations consistent with the present disclosure, such as, for example, executing an image storage, curation, editing, and sharing application. Memory 134 can also store any number of images captured by the mobile image capture device 102 and/or the user computing device 130.

User computing device 130 can further include a display. The display can be any one of many different technologies for displaying information to a user, including touch-sensitive display technologies.

The user computing device 130 also includes a transfer controller 140. In particular, in some implementations, when connected to the mobile image capture device 102 (e.g., after a capture session has been completed), the transfer controller 140 can select certain of the images stored at the image capture device 102 for transfer to the user computing device 130. For example, such selection can be guided by various image attributes as reflected in various metadata annotations provided by the mobile image capture device 102 respectively for the stored images. Generally, the most desirable images will be selected for transfer, while maintaining a diversity of imagery.

In some implementations, the transfer controller 140 can perform an optimization algorithm to select which of the images stored in the memory 114 of the mobile image capture device 102 to request for transfer. The optimization algorithm can have a plurality of associated objectives which include, for example, at least a diversity of settings and a diversity of depicted persons, while still requesting transfer of the most desirable images. In some implementations, the transfer controller 140 can implement a submodular function to select which images to request for transfer.

In some implementations, the user computing device 130 further includes a best shot selector 142. The best shot selector 142 can be implemented to select at least one highlight image from a group of images (e.g., at least one highlight image for each moment within a reflection). For example, the best shot selector 142 can select the highlight images based on the annotations or other metadata included for each of the images. In some implementations, the best shot selector 142 normalizes each image in a moment relative to its peer images within such moment prior to performing highlight selection. Thus, selection of a highlight image for each moment can be based at least in part on a comparison of the annotations of each image included in such moment relative to the annotations of at least one other image included in such moment.

In some implementations, the best shot selector 142 can also be implemented to determine a recommended composition for one or more images. For example, the recommended composition may correspond to only a portion of an image (e.g., a dewarped portion of a wide angle image). The recommended composition may also correspond to a certain perspective of a virtual camera relative to the image. The best shot selector 142 can determine the recommended composition based at least in part on the annotations or other metadata associated with the image. For example, the recommended composition may correspond to a dewarped portion of a wide angle image that includes only faces that correspond to entities included in the set of entities that have elevated importance to the user.

In some implementations, a gaze angle of a subject depicted by an image can be used to determine the recommended composition for such image. As an example, the human subject's extremity of angle of the face (e.g., up/down, left/right) can be used to assist in determining how much of the surrounding area should be included in a crop (e.g., in the recommended composition). In some implementations, determining the recommended composition can include selecting the most salient, well lit, and/or compositionally interesting portions within a frame.

In further implementations, the best shot selector 142 and/or other components of the user computing device 130 can perform semantic scene segmentation (e.g., at a pixel-level rather than according to bounding boxes). The semantic scene segmentation can be used for composition, blurring, or selective application of other editing techniques to certain portions of an image.

The user computing device 130 also includes a user interface controller 144. The user interface controller 144 can be implemented to provide a user interface that enables the user to temporally and/or spatially explore images within a reflection. In particular, the user interface controller 144 can be implemented to detect and respond to certain user input with appropriate user interface interactions.

The user computing device 130 also includes a computational photographer 146. The computational photographer 146 can be implemented to perform various image editing or image synthesis techniques with respect to images included in a reflection. As one example, after the user has adjusted the perspective of the camera, the computational photographer 146 can synthesize a new image that corresponds to the selected perspective by recalculating one or more camera parameters (e.g., focus, lens distortions, lighting, etc.) that would result from the new perspective. As other examples, the computational photographer 146 can be implemented to perform advanced image processing techniques such as superresolution, hyper-lapse, texture mapping, depth mapping, view synthesis, etc. Likewise, the computational photographer 146 can be implemented to provide adjustable controls for ISO, depth of field, stabilization, and other image parameters or characteristics.

Each of the transfer controller 140, the best shot selector 142, the user interface controller 144, and the computational photographer 146 can include computer logic utilized to provide desired functionality. Thus, each of the transfer controller 140, the best shot selector 142, the user interface controller 144, and the computational photographer 146 can be implemented in hardware, firmware and/or software controlling a general purpose processor. In some implementations, each of the transfer controller 140, the best shot selector 142, the user interface controller 144, and the computational photographer 146 includes program code files stored on the storage device, loaded into memory 134 and executed by processor 132 or can be provided from computer program products, for example, computer executable instructions 138 that are stored in a tangible computer-readable storage medium such as, for example, a RAM disk or card or other computer-readable optical or magnetic media.

Server computing device 150 can be implemented using one or more server computing devices and can include a processor 152 and a memory 154. In the instance that server computing device 150 consists of multiple server devices, such server devices can operate according to any computing architecture, including a parallel computing architecture, a distributed computing architecture, or combinations thereof.

Processor 152 can be any suitable processing device and can be one processor or a plurality of processors which are operatively connected. Memory 154 can store instructions 158 that cause processor 152 to perform operations to implement the present disclosure.

Server computing device 150 can also include a model trainer 160. Server computing device 150 can implement the model trainer 160 to train and/or re-train one or more models (e.g., neural networks) such as multi-layer non-linear models (e.g., deep neural networks). As examples, the model trainer 160 can perform back propagation techniques such as batch gradient descent or stochastic gradient descent to train the models. The model trainer 160 can also leverage dropout techniques to combat model overfitting. The model trainer 160 can train models using processed images and/or unprocessed images as training images.

Thus, in some implementations, the server computing device 150 can implement model trainer 160 to train new models or update versions on existing models on additional image data. As an example, the model trainer 160 can use images hand-labeled as being desirable to train one or more models to provide outputs regarding the desirability of an input image. In particular, in some implementations, the additional training data can be images that the user created through the editing interface. Thus, updated versions of the models of the image capture device 102 can be trained by model trainer 160 on personalized data sets to better infer, capture, and store images which satisfy the particular visual tastes of the user. In other instances, the additional training data can be anonymized, aggregated user feedback.

The server computing device 150 can periodically provide the mobile image capture device 102 with one or more updated versions of one or more models included in the scene analyzer 124. The updated models can be transmitted via the user computing device 130 or directly to the mobile image capture device 102 via network 180. In other implementations, the user computing device 130 can also include a model trainer that performs personalized model training as described above for a particular mobile image capture device 102.

The model trainer 160 can include computer logic utilized to provide desired functionality. Thus, the model trainer 160 can be implemented in hardware, firmware and/or software controlling a general purpose processor. In some implementations, the model trainer 160 includes program code files stored on the storage device, loaded into memory 154 and executed by processor 152 or can be provided from computer program products, for example, computer executable instructions that are stored in a tangible computer-readable storage medium such as RAM hard disk or card or other computer-readable optical or magnetic media.

Network 180 can be any type of communications network, such as a local area network (e.g., intranet), wide area network (e.g., Internet), or some combination thereof and can include any number of wired or wireless links. In general, communication between the server computing device 150 and the user computing device 130 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). Server computing device 150 can communicate with user computing device 130 over network 180 by sending and receiving data.

Further, any of the processes, operations, programs, applications, or instructions described as being stored at or performed by the server computing device 150 can instead be stored at or performed by the user computing device 130 in whole or in part, and vice versa. In particular, in some implementations, the mobile image capture device 102 can directly communicatively connect to the server computing device 150 and the server computing device 150 can perform the image curation, editing, storage, and sharing functions attributed to the user computing device 130 elsewhere in the present disclosure (e.g., via a web application). Likewise, any of the processes, operations, programs, applications, or instructions described as being stored at or performed by the mobile image capture device 102 can instead be stored at or performed by the user computing device 130 in whole or in part, and vice versa. For example, in some implementations, the transfer controller 140 can be located at the mobile image capture device 102 rather than the user computing device 130.

Figure 2:
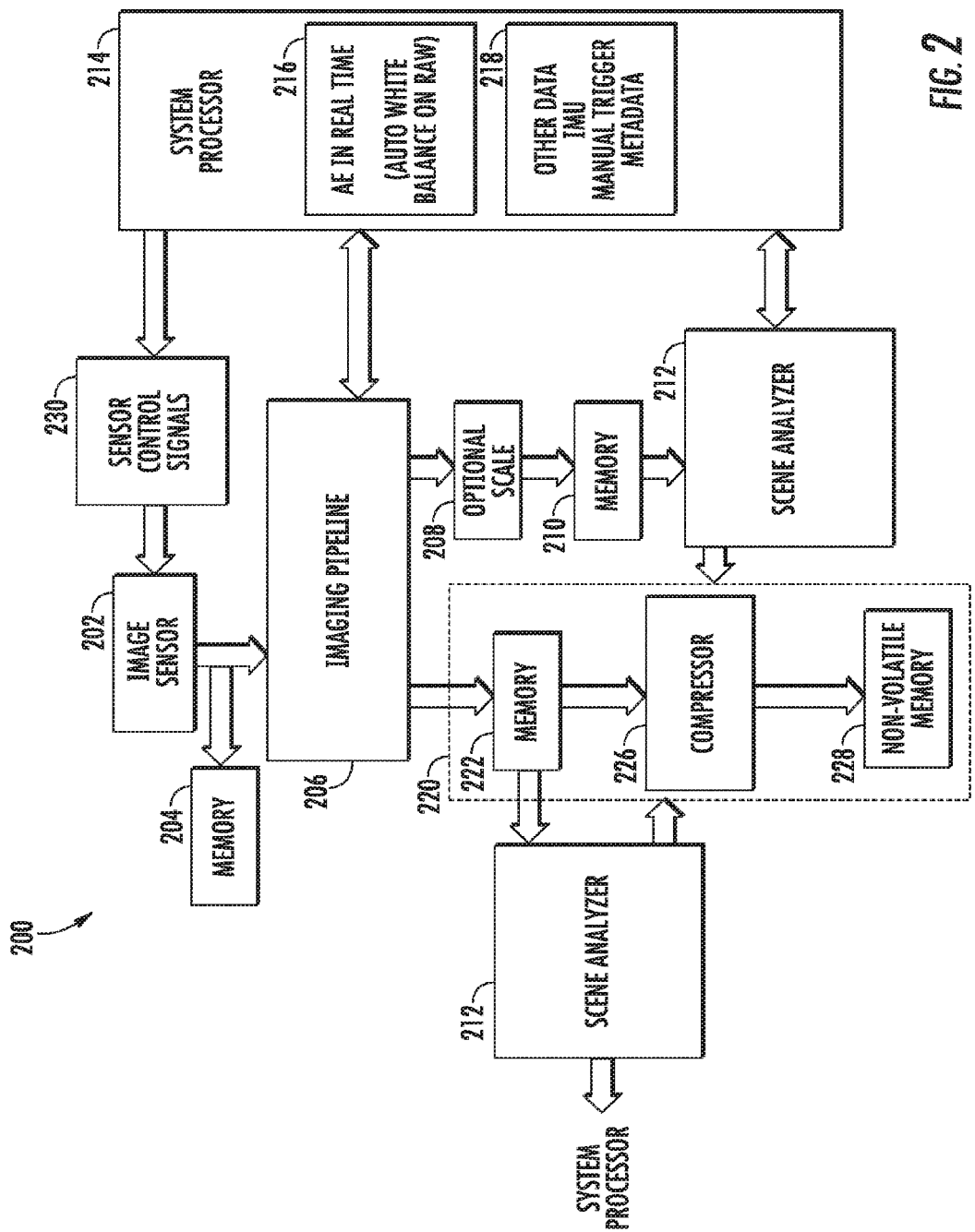
FIG. 2 depicts a schematic of an example image processing framework according to an example embodiment of the present disclosure.

FIG. 2 depicts a schematic of an example image processing framework 200 according to an example embodiment of the present disclosure. In particular, the schematic depicted in FIG. 2 illustrates relationships between components which permit multiple potential data paths or work flows through the framework 200. The image processing framework 200 can be included in the mobile image capture device.

The image processing framework 200 includes an image sensor 202 which outputs raw image data. For example, the raw image data can be a Bayer RAW image. The raw image data can be communicated to a first memory 204 and/or an imaging pipeline 206. As one example, the first memory 204 which stores the raw image data output by the image sensor 202 can be denominated as a raw temporary data buffer and can be, for example, DRAM memory. In some implementations, the imaging pipeline 206 streams the raw image data directly from the image sensor 202. In such scenario, the temporary data buffer may optionally store processed images instead of the raw image data.

The imaging pipeline 206 takes the raw image data received from the image sensor 202 and processes such raw image data to generate an image. For example, the processed image can be a RGB image, a YUV image, a YCbCr image, or images according to other color spaces. In addition, the imaging pipeline 206 can be operatively connected to a system processor 214. The system processor 214 can include hardware blocks 216 that assist the imaging pipeline 206 in performing Debayer filtering, RAW filtering, LSC filtering, or other image processing operations. The RAW filter stage can provide image statistics 216 for auto exposure in real time and/or auto white balance operations. Software filters may be employed as well. Additional discussion of an example imaging pipeline is provided with respect to FIGS. 9 and 10.

Depending on the capture mode of the mobile image capture device and/or other parameters, the imaging pipeline 206 can provide the image to an optional scaler 208 or a second memory 222, which will be discussed further below. The scaler 208 can down sample the received image to output a lower resolution version of the image. Thus, in some implementations, the scaler 208 can be denominated as a down sampler.

The scaler 208 provides the image to a third memory 210. The third memory 210 may be the same memory or a different memory than the second memory 222. The second memory 222 and/or the third memory 210 can store temporary copies of the image. Thus, the second memory 222 and/or the third memory 210 can be denominated as temporary image buffers. In some implementations, the second memory 222 and/or the third memory 210 are DRAM. In addition, in some implementations, downsampling can be performed at the beginning of the imaging pipeline such that the imaging pipeline is enabled to run at a lower resolution and conserve power to a greater degree.

The second memory 222 and/or the third memory 210 can provide the image information to a scene analyzer 212. In some implementations, the scene analyzer 212 is operable to analyze a scene depicted by the image to assess a desirability of such scene and, based at least in part on such desirability, determine whether to store a non-temporary copy of such image or to discard the temporary copy of such image without further storage. The scene analyzer 212 can also access various data 218 stored at the system processor 214.

If the scene analyzer 212 determines that a non-temporary copy of the image should be stored, then the scene analyzer 212 can provide the image to a compression component 226. In other implementations, the compression component 226 can receive the image from the second memory 222 and/or the third memory 210. In yet other implementations, if the scene analyzer determines that a non-temporary copy of the image should be stored, then the raw image data stored in the first memory 204 will be retrieved and processed by the imaging pipeline 206 and the resulting processed image will be provided to the compression component 226.

The compression component 226 compresses the received image. The compression component 226 can be a hardware component or image compression software implemented on a processor (e.g., the system processor 214). After compression, a non-temporary copy of the image is written to a non-volatile memory 228. For example, the non-volatile memory 228 can be an SD card.

It should be noted that, in some implementations, the image compression path 220 marked in a dotted box may not be active when an image is not chosen for compression and storage. Thus, in some implementations, the output of the scene analyzer 212 can be used to either turn on the image compression path 220 or control the image sensor 202. In particular, the scene analyzer 212 (e.g., in partnership with the system processor 214) can provide sensor control signals 230 to control the image sensor 202, as will be discussed further below. Further, in some implementations, the output of the scene analyzer 212 can be used to either turn on or off the imaging pipeline path as well. In addition, in some implementations and/or capture modes, portions of the scene analysis can be performed with respect to low-resolution images whereas other portions of the scene analysis can be performed on crops of high-resolution images (e.g., facial expression analysis may require crops of high resolution images).

In some implementations, the output from the image sensor 202 can control most of the timing through the imaging pipeline 206. For example, image processing at the imaging pipeline 206 can be roughly frame-synced to transfer at the image sensor receiver (e.g., an MIPI receiver). Each of the stages of image processing 206 can have some delay which causes the output to be a few image sensor rows behind the input. This delay amount can be constant given the amount of processing that happens in the pipeline 206.

The scene analyzer 212 can start shortly after the imaging pipeline 206 has written all the lines of one image to memory. In other implementations, the scene analyzer 212 starts even before the imaging pipeline 206 has written all the lines of one image to memory. For example, certain models included in the scene analyzer (e.g., a face detector model) can operate on subsets of the image at a time and therefore do not require that all of the lines of the image are written to memory. Compression can be performed after the scene analyzer determines that the image is worth saving and compressing. One example representation of data flow versus time is provided below with reference to FIG. 8. In other implementations, instead of analyzing images that have been fully processed by the image processing pipeline 206, the scene analyzer 212 can analyze Bayer raw images or images that have only been lightly processed by the imaging pipeline.

Figure 3:
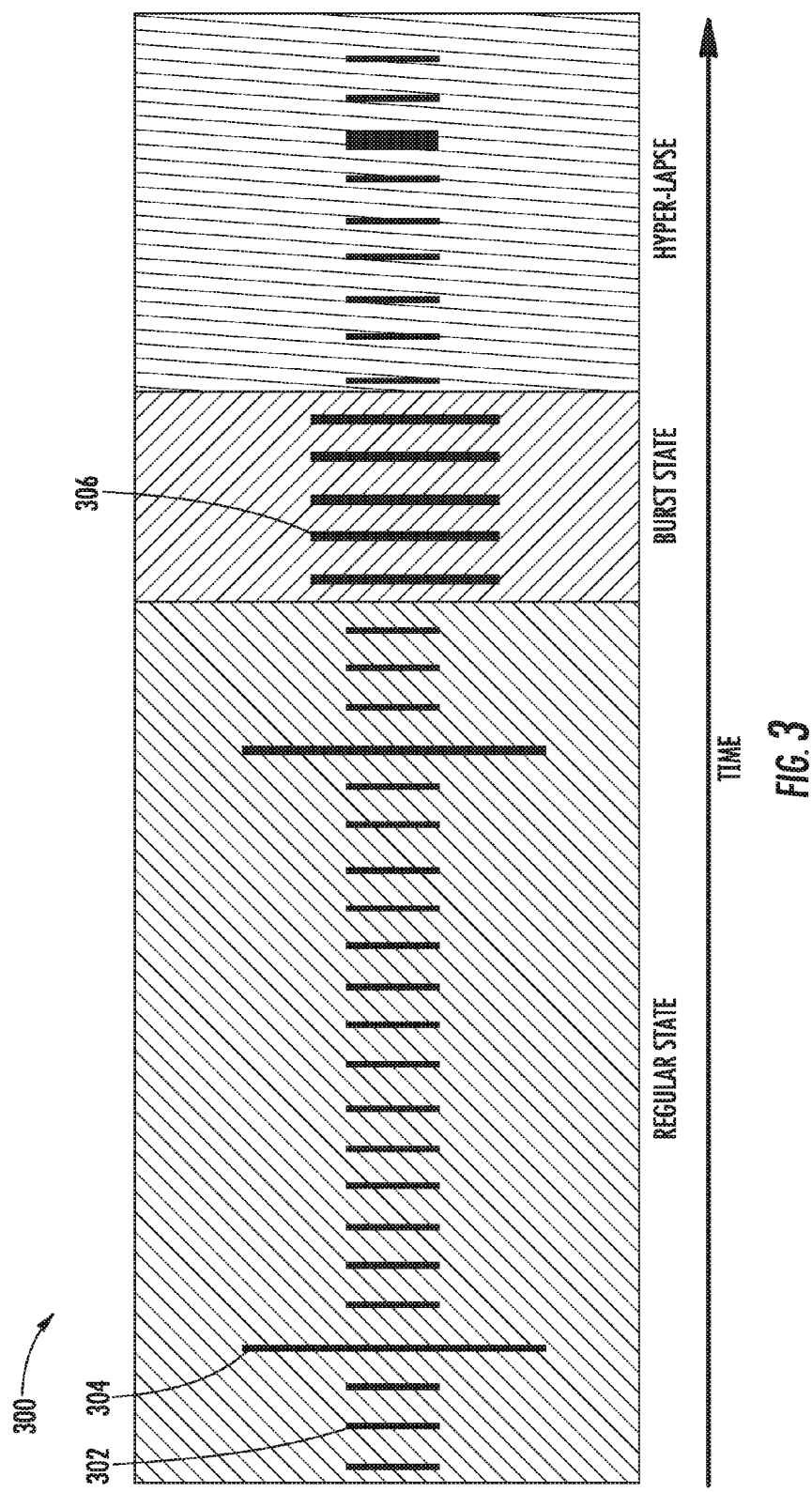
FIG. 3 depicts a visual representation of example capture modes of an example mobile image capture device according to an example embodiment of the present disclosure.

FIG. 3 depicts a visual representation 300 of example capture modes of an example mobile image capture device according to an example embodiment of the present disclosure. In the visual representation 300, vertical bars are representative of captured images, with the vertical length of the bar representative of the resolution of the captured images. In particular, shorter bars (e.g., bar 302) denote low-resolution images while longer bars (e.g., bar 304) denote high or full resolution images. Horizontally thicker bars denote images that are selected for compression and storage.

Unlike conventional digital cameras and mobile imagers, the mobile image capture devices of the present disclosure can change capture frame rate and resolution on the fly. Particular example capture modes are illustrated in FIG. 3. However, other the mobile image capture device can operate according to other capture modes as well.

On the left hand side of visual representation 300 is a visual representation of a regular or sustained capture state. During the regular capture state of the mobile image capture device, the image capture device will periodically transition between a low resolution image capture mode and a high resolution image capture mode. In such fashion, high resolution or full resolution frames can be captured relatively infrequently (e.g., at an average of 0.1 to 5 frames per second (fps)), while low resolution frames are captured more frequently (e.g., at an average of 5 to 20 fps). "Captured" here means at the image sensor level. However, note that while an image is "captured" by the image sensor, only a few percentage of them (e.g., around 5 percent) may be selected for compression and storage.

In some implementations, high or full resolution frames can be 12 megapixel (MP) images. The high resolution frames can be an entire frame at a maximum resolution of the image sensor. These high resolution frames can be the strongest candidates for ultimate compression and storage. The frame rate for full resolution images can be increased in different capture modes, which will be discussed further below.

In some implementations, low resolution frames can be 1.33 MP images. The low resolution frames can be used for scene analysis, and may be even further scaled down (e.g., to 500×375) if desired. The low resolution frames can also be used for various other purposes such as: allowing users to preview an image through a display in the user computing device (e.g. capture visualizations based on a thumbnail (e.g. 100×75) of the image); generating hyper-lapse (computer vision) artifacts; and/or performing superresolution techniques in which the resolution of portions of a low resolution image are enhanced based on full-resolution frames that are closely related in time.

Further, in some implementations, in addition to high resolution images and low resolution images, the image sensor may be further operable to provide mid resolution images that are, for example, 3 MP. In some implementations, mid resolution images can be captured at up to 30 fps during a burst capture mode. Mid resolution images may be useful for scenarios including low-light binning. In particular, in order to reduce the amount of noise, it may be desirable to perform binning in the sensor such that temporal noise in the sensor is reduced. While this does sacrifice the spatial resolution, it may be desirable to perform such operation when exposure time may not be increased even further. In some instances, the mobile image capture device's exposure time may be relatively short in order to reduce the amount of motion blur. Two by two binning reduces the image noise by a factor of two in terms of standard deviation.

The mobile image capture device can also operate in a burst capture mode or burst state, which is shown after the regular sustained state in FIG. 3. The mobile image capture device can transition to the burst state based on signals from the scene analyzer or in response to a manual trigger from the user. Thus, burst capture mode is typically performed when a highly desirable scene has been recognized and the device attempts to maximize an amount of imagery captured of such scene. Therefore, during burst capture mode, the mobile image capture device can capture mid or high resolution images at a relatively higher frame rate (e.g., 15 fps for high resolution or 30 fps for mid resolution). Alternatively, low resolution images can be captured at a high frame rate and the low resolution images can go through super-resolution to obtain final high resolution data.

In some implementations, all of the images captured during burst mode are compressed and stored at the non-volatile memory, with little to no scene analysis being performed. In particular, by performing little to no scene analysis, the limited resources of the mobile image captured device can be freely dedicated to compression and storage of the high or mid resolution imagery. For example, writing to non-volatile memory can be performed on the order of 20 to 25 MB per second. However, more resources may be dedicated to scene analysis when burst captures include low resolution images which may later go through super-resolution. Burst capture mode can be sustained for a period of time after which the mobile image capture device reverts to the regular state.

In some implementations, the mobile image capture device may also be able to operate in a hyper-lapse capture mode, which is shown at the right hand side of FIG. 3. In the hyper-lapse capture mode, which is geared towards capture of imagery usable to generate a hyper-lapse stabilized video, the mobile image capture device can capture low or mid resolution imagery for a sustained period of time.

In particular, in the hyper-lapse capture state, one emphasis is in a smooth transition between shots. Low or mid resolution images are captured at a relatively high frame rate (e.g., 15 fps). Not all of the frames are processed, compressed, and saved. For example, analysis for hyper-lapse capture can select frames such that the output is roughly 1 frame saved per second. In particular, frames captured with jerky motion can be discarded. Thus, motion analysis can be a central component of hyper-lapse frame selection. As such, the scene analysis performed during hyper-lapse capture state can have different objectives versus the regular capture state or may generally be more lightweight. Further, in some implementations, high resolution images can be interspersed with low or mid resolution images in hyper-lapse capture mode.

Figure 4:
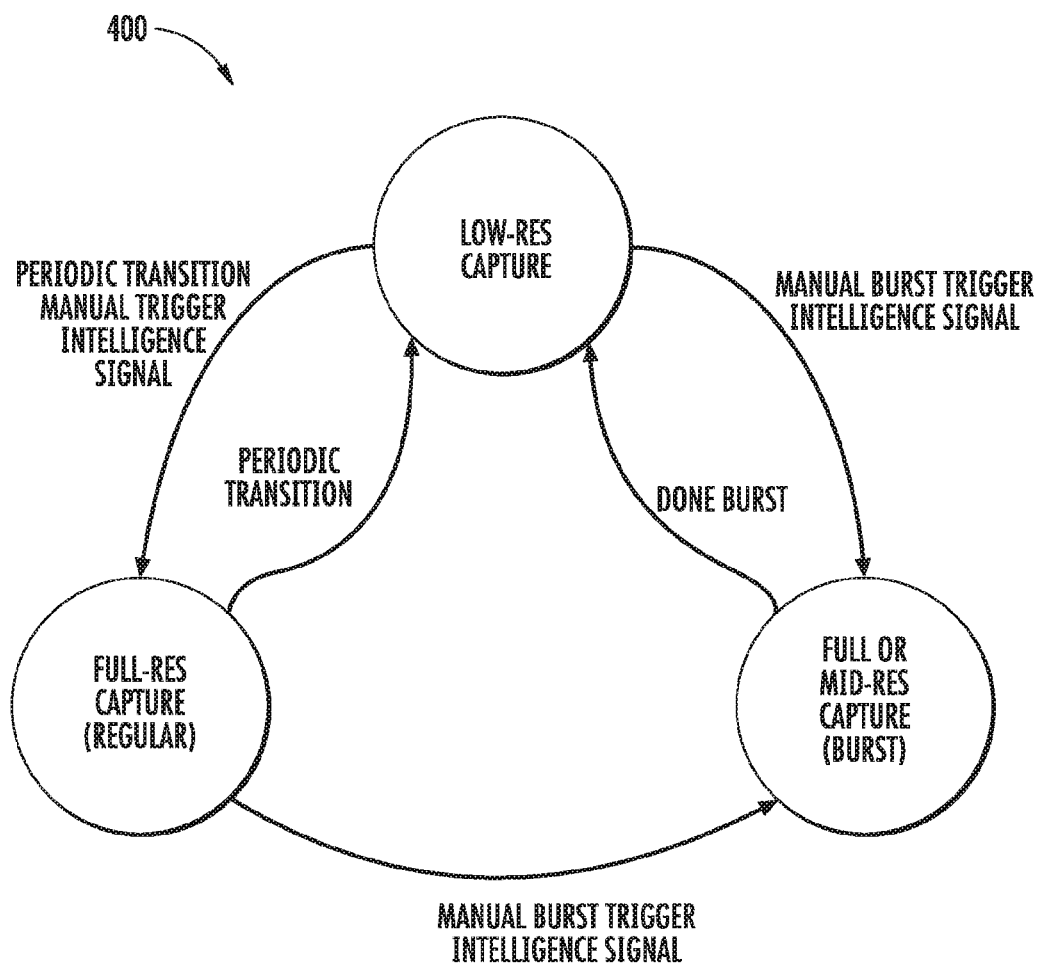
FIG. 4 depicts a visual representation of example relationships between capture modes of an example mobile image capture device according to an example embodiment of the present disclosure.

FIG. 4 depicts a visual representation 400 of example relationships between capture modes of an example mobile image capture device according to an example embodiment of the present disclosure. In particular, visual representation 400 describes example transitions between capture states.

Figure 5:
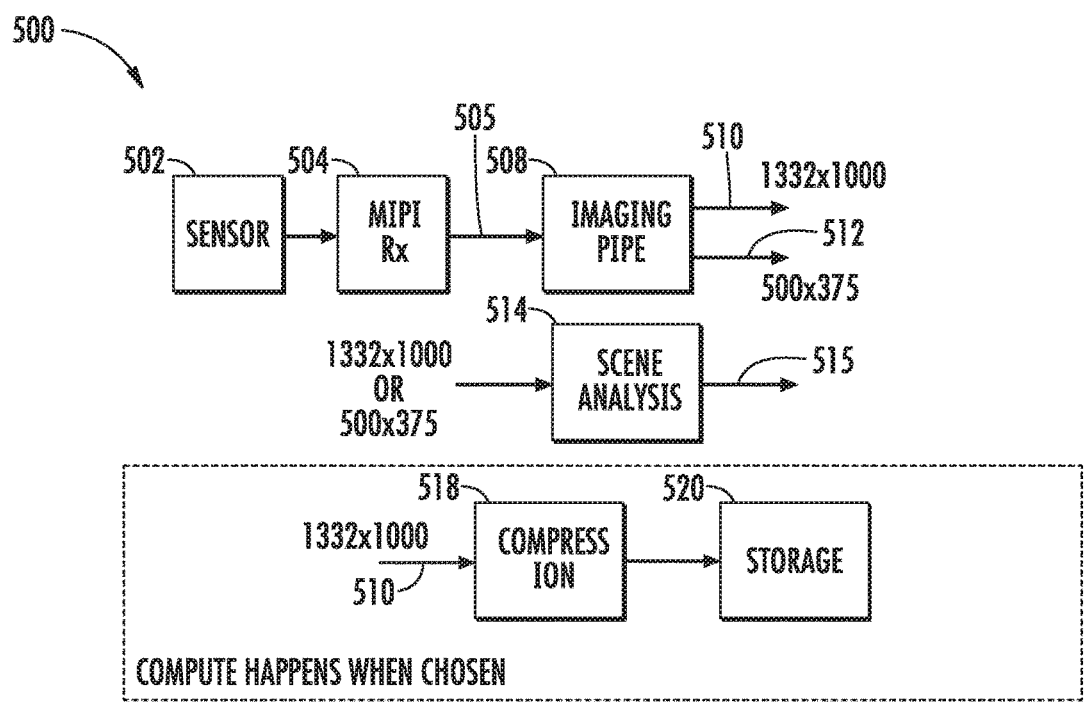
FIG. 5 depicts an example image processing framework according to an example embodiment of the present disclosure.

FIG. 5 depicts an example image processing framework 500 according to an example embodiment of the present disclosure. In particular, the image processing framework 500 can be employed when the mobile image capture device is operating in a low resolution capture mode.

The image processing framework 500 includes an image sensor 502, an image sensor receiver 504, and an imaging pipeline 508. In particular, in the low resolution capture mode, the image sensor 502 can provide low resolution raw image data 506.

In some implementations, the image sensor 502 performs binning and/or downsampling to result in output of low resolution raw image data 506. For example, the image sensor 502 can operate according to one or more of the following binning/sub sampling modes: 2H×2V binning; 3H×3V downsample (3×3 bin); 3H×3V downsample (bin plus skip); 2H×4V downsample; 3H×9V downsample (bin and skip); 3H×17V downsample (bin and skip). Thus, in one example, assuming a sensor array size of 4000×3000, the image sensor 502 can perform 3×3 downsampling (with binning and skipping) to output low resolution raw image data 506 which is sufficient to generate a low resolution image of 1.33 MP (1332×1000). The image sensor 502 can perform even further downsampling to provide lower resolution thumbnails for scene analysis or other objectives. Further, for sensor binning/skipping modes that have different scaling ratios between horizontal and vertical directions, the imaging pipeline 508 can perform anamorphic scaling.

The imaging pipeline 508 can stream the low resolution raw image data 506 from the image sensor receiver 504 (e.g., without the data taking a trip to memory). The imaging pipeline 508 can process the raw image data 506 to generate a low resolution image 510 (e.g., a 1.33 MP image). Alternatively or additionally, the imaging pipeline 508 can process the raw image data 506 to generate an ultra-low resolution image 512 (e.g., a 0.18 MP image).

Either or both of the image 510 and the image 512 can be provided to a scene analyzer 514. For example, in the interests of balancing analysis intelligence versus computational consumption, certain portions of the scene analyzer may analyze the image 510 while other portions analyze the image 512.

The scene analyzer 514 can analyze the inputted images and, based on such analysis, output one or more control signals 516. In particular, the control signals 516 can control whether the image 510 is compressed and stored or whether the image 510 is discarded without storage. Further, in some implementations, the control signals 516 can control the capture mode of the image capture device, or can simply increase or decrease frame rate or resolution with formally changing the capture mode. In some implementations, the scene analyzer 514 can be implemented in one or more shave cores of a system processor.

If the scene analyzer 514 indicates that the image 510 should be stored, then the image 510 is provided to an image compression component 518, where the image compression component 518 compresses the image 510. The compressed image 510 is then written to storage 520. For example, storage 520 can be a non-volatile memory.

Figure 8:
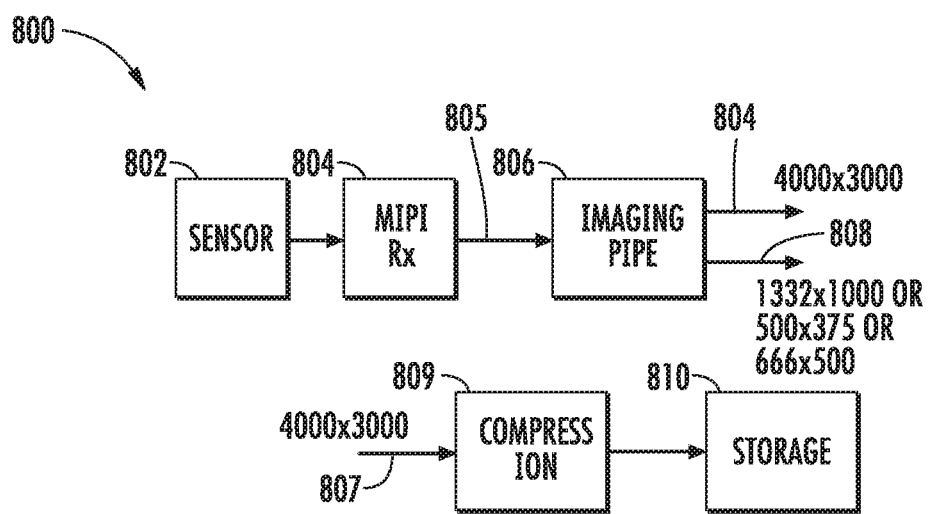
FIG. 8 depicts an example image processing framework according to an example embodiment of the present disclosure.

Given that the low resolution mode has a smaller number of pixels to read out and process, the power consumption in this mode is much lower. Therefore, low resolution frames can typically be run at a higher frame rate than the full resolution frames since the power consumption can be lower by performing such operations. FIG. 8 illustrates an example data flow over time in the low resolution capture mode.

Figure 6:
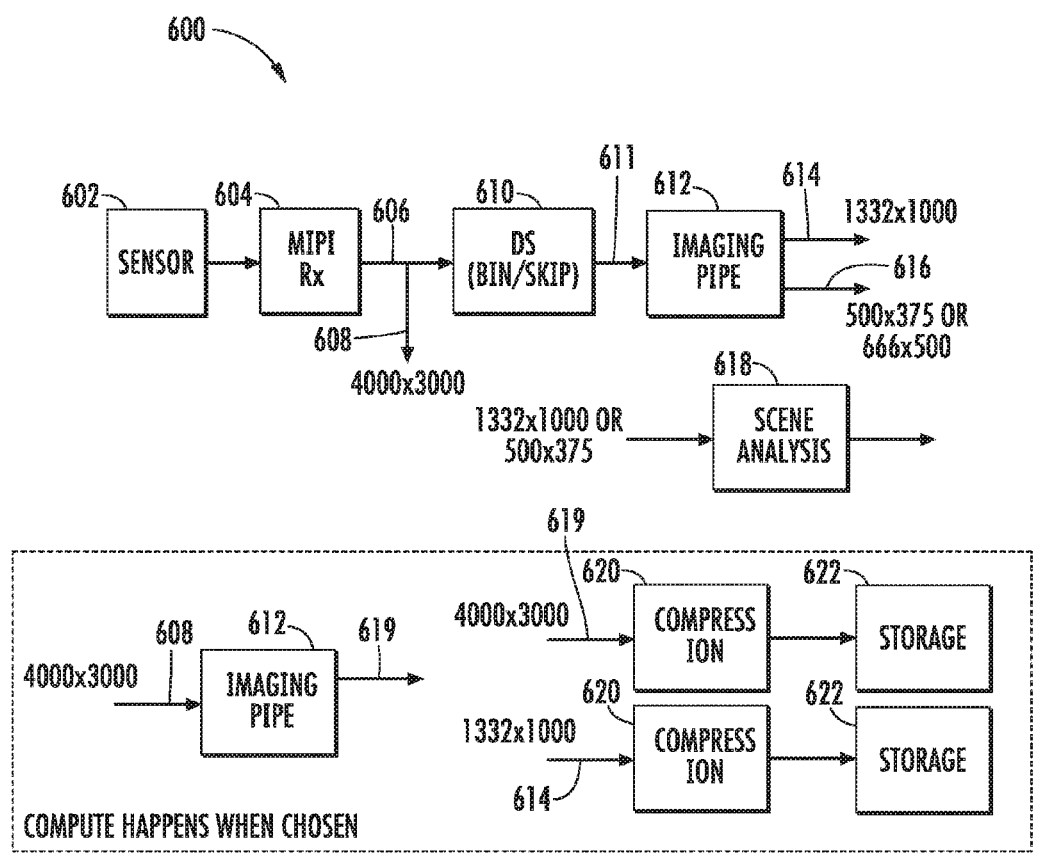
FIG. 6 depicts an example image processing framework according to an example embodiment of the present disclosure.

FIG. 6 depicts an example image processing framework 600 according to an example embodiment of the present disclosure. In particular, the image processing framework 600 can be employed when the mobile image capture device is operating in a high resolution capture mode.

The image processing framework 600 includes an image sensor 602, an image sensor receiver 604, a down sampler 610, and an imaging pipeline 612. In particular, in the high resolution capture mode, the image sensor 602 can provide high resolution raw image data 606. For example, the high resolution raw image data 606 can be data sufficient to generate a high resolution image of, for example, 12 MP. A copy 608 of the high resolution raw image data 606 can be temporarily stored in memory (e.g., in a temporary raw image data buffer).

The down sampler 610 can stream the high resolution raw image data 606 from the image sensor receiver 604 and can down sample the high resolution raw image data 606 to output low resolution raw image data 611. For example, the down sampler 610 can perform binning and/or skipping. The low resolution raw image data 611 can be, for example, raw image data sufficient to generate a low resolution image, such as, for example, a 1.33 MP image. The down sampler 610 can be implemented in hardware or software controlling a processor.

The imaging pipeline 612 can stream the low resolution raw image data 611 from the down sampler 610. The imaging pipeline 612 can process the low resolution raw image data 611 to generate a low resolution image 614 (e.g., a 1.33 MP image). Alternatively or additionally, the imaging pipeline 612 can process the raw image data 606 to generate one or more ultra-low resolution images 616 (e.g., a 0.18 MP image or a 0.33 MP image). One or more of the images 614 and 616 can be provided to a scene analyzer 618.

The scene analyzer 618 can analyze the inputted images and, based on such analysis, output one or more control signals. In particular, the control signals can control whether an image is generated from the high resolution raw image data 606 and then compressed and stored or whether the high resolution raw image data 606 and the images 614 and 616 are discarded without further storage. Further, in some implementations, the control signals 616 can control the capture mode of the image capture device.

If the scene analyzer 614 indicates that the image should be stored, then the temporarily stored copy 608 of the high resolution raw image data 606 is provided to the imaging pipeline 612. For example, the copy 608 of the high resolution raw image data 606 can be retrieved from a temporary raw image data buffer and processed in a memory to memory fashion. The imaging pipeline 612 can process the high resolution raw image data 606 to generate a high resolution image 619. For example, the high resolution image 619 can be a 12 MP image.

The high resolution image 619 is then provided to an image compression component 620, where the image compression component 620 compresses the image 619. The compressed image 619 is then written to storage 622. For example, storage 622 can be a non-volatile memory.

In some implementations, the low resolution image 614 can also be provided to the image compression component 620, where the image compression component 620 compresses the image 619. The compressed image 614 is then written to storage 622. For example, storage 622 can be a non-volatile memory.

Figure 7:
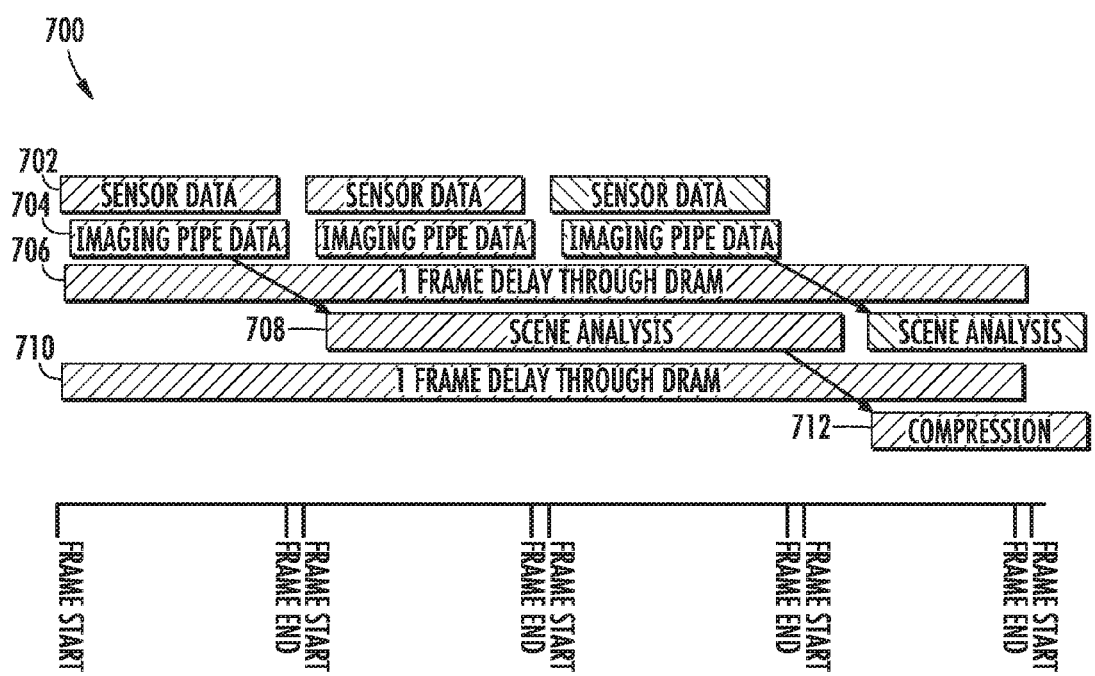
FIG. 7 depicts a visual representation of data flow versus time in an example image processing framework according to an example embodiment of the present disclosure.

FIG. 7 depicts a visual representation 700 of data flow versus time in an example image processing framework according to an example embodiment of the present disclosure. In particular, FIG. 7 depicts one example timing of data flow when the image capture framework is operating in the low resolution capture mode.

At 702, the image sensor outputs low resolution raw image data. At 704, the imaging pipeline streams the low resolution raw image data from the image sensor. As illustrated, the imaging pipeline can process the sensor data in-stream. At 706, the output of the imaging pipeline is written to DRAM. In some implementations, the delay between the sensor capture and image data written to DRAM is only a few lines.

At 708, scene analysis of the image is performed. In particular, scene analysis can start shortly after the imaging pipeline has written all the lines of one image to the DRAM. In other implementations, the scene analysis starts even before the imaging pipeline has written all the lines of one image to memory. For example, certain models included in the scene analysis (e.g., a face detector model) can operate on subsets of the image at a time and therefore do not require that all of the lines of the image are written to memory. The results of the scene analysis (e.g., annotations to the image or other data) can be added to the image in DRAM at 710. In some implementations, the scene analysis of an image can take longer than the frame time for certain tasks.

Once the scene analyzer determines that the image has interesting scene content, then at 712 the image is compressed. Compression can occur in a memory to memory fashion. However, in other implementations, compression can be run in-stream.

As illustrated, the above described operations can occur in a cascading and/or overlapping manner. For example, capture and processing of the next image can occur while the first image is still undergoing scene analysis, and so on.

Further, the illustrated data flow is for keep/discard decisions made during the regular capture state. During the burst mode of operation, for example, the still image compression may not wait for the decision by the scene analysis, or scene analysis may simply be bypassed.

FIG. 8 depicts an example image processing framework 800 according to an example embodiment of the present disclosure. In particular, the image processing framework 800 can be employed when the mobile image capture device is operating in a burst capture mode.

The image processing framework 800 includes an image sensor 802, an image sensor receiver 804, and an imaging pipeline 806. In particular, in the high resolution capture mode, the image sensor 802 can provide high resolution raw image data 805.

The imaging pipeline 806 can stream the high resolution raw image data 805 from the image sensor receiver 804 (e.g., without the data taking a trip to memory). The imaging pipeline 806 can process the raw image data 805 to generate a high resolution image 807 (e.g., a 12 MP image). Alternatively or additionally, the imaging pipeline 806 can process the raw image data 805 to generate a various lower resolution images 808.

The image 807 is then provided to an image compression component 809, where the image compression component 809 compresses the image 807. The compressed image 807 is then written to storage 810. For example, storage 810 can be a non-volatile memory. In some implementations, compression is performed in-stream, which eliminates the power requirements of temporarily writing to memory.

Unlike frameworks 500 and 600, the framework 800 of the burst capture mode may not provide the image 807 to a scene analyzer to make keep/discard decisions. Instead, the image 807 (and optionally any number of images 808) is simply compressed and stored. In particular, since burst capture is typically performed after the device has detected (e.g., from previous frames) that an interesting scene is available, intensive image analysis may not be necessary to perform. This allows the device to devote most of the energy and computing power to performing the imaging pipeline and compression.

However, in some implementations, the mobile image capture device may have sufficient resources to perform scene analysis during burst capture mode for the purpose of keep/discard decisions. This may also be enabled by lowering the resolution and/or frame rate requirements/parameter values of the burst image capture.

Figure 9:
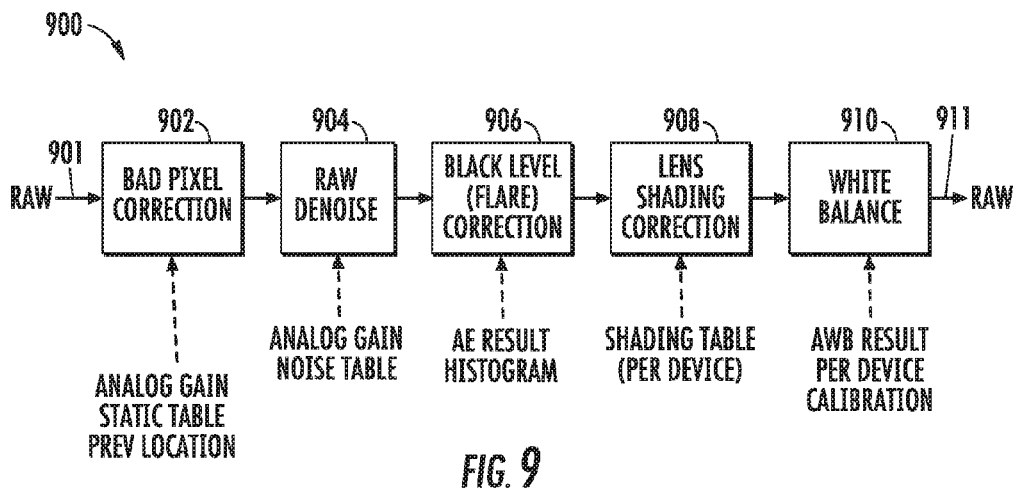
FIGS. 9 and 10 depict an example imaging pipeline according to an example embodiment of the present disclosure.
Figure 10:
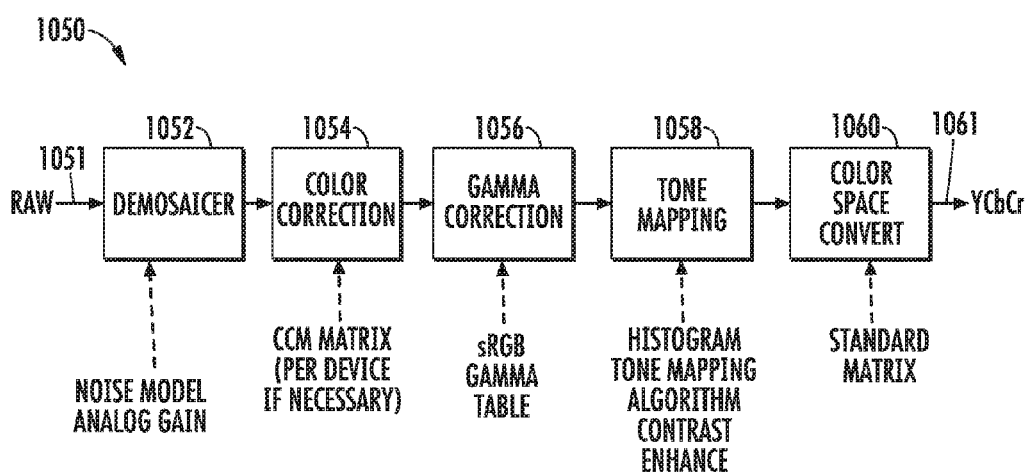

FIGS. 9 and 10 depict example imaging pipeline(s) 900 and 1050 according to an example embodiment of the present disclosure. The pipelines 900 and 1050 can be separate pipelines or can be combined to form a single pipeline.

The imaging pipeline included in the mobile image capture device impacts the quality of images generated by the mobile image capture device. The imaging pipeline can take raw image data from an image sensor and performs the necessary processing to reduce image defects and non-idealities of the image sensor and optics in the imaging system, thereby producing high quality images that are pleasing to view. Given that the power consumption of the mobile image capture device is typically constrained, many of the computations of the imaging pipeline can be performed in hardware blocks, which are more efficient that software implementations.

Referring first to FIG. 9, imaging pipeline 900 depicts one example imaging pipeline that performs a raw-to-raw Bayer pipeline. RAW Bayer image data 901 is either streamed directly from the image sensor, or is read from memory. Streaming directly from the sensor is desirable in order to save power consumption and reduce memory bandwidth. A first step is to remove the bad pixels at block 902. This requires knowledge of analog gain applied in the sensor and a static defect table. Previous x-y coordinates of bad pixels are optional and may help the bad pixel correction.

Next, at block 904, raw pixel may be denoised lightly. One benefit of such a raw-denoise block 904 is to remove some noise such that it does not crease maze-like artifacts during a demosaicing state. Again, analog gain applied to the sensor and noise table that has been calibrated for the sensor is useful for improved performance.

At block 906, black level (pedestal) can be removed. A histogram of pixel intensities is useful to remove the black level. Optionally, flare correction may be performed at a separate block after white balancing at the expense of additional processing.

Lens shading correction can be performed at block 908. Lens shading correction can be applied by obtaining a calibrated per-device shading table. This table can be obtained during calibration. At block 910, white balance gains can be applied using the AWB result. In addition, per device calibration results of small color ratios can be applied if applicable.

With reference now to FIG. 10, pipeline 1050 is an RGB/YCbCr pipeline. RAW Bayer image data 1051 is passed onto a demosaicer block 1052 which is then used to perform interpolation on missing color components. For example, on an "R" pixel, the demosaicing block 1052 computes optimal "G" and "B" pixels such that a very good sharpness can be maintained without unnatural sharpening artifacts. This goes through a series of transformations (e.g., blocks 1054 and 1056) such that the pixel values are in sRGB space (or any other color space).

Optional tone mapping can be performed at block 1058 such that contrast in enhanced or dynamic range is compressed such that it may be rendered on lower bit-depth displays. Next, color space conversion can be performed at block 1060 such that the pixel values 1061 are in YCbCr pixel domain.

Once the pixel values 1061 are in YCbCr domain, it may be passed onto a still image (e.g., JPEG or other formats) compression block. Note that denoising and sharpening can be performed on the luminance channel. In addition, chrominance noise can be significantly suppressed especially for low-light images. Additional blocks such as special effects can be optionally applied, as well.

Figure 11:
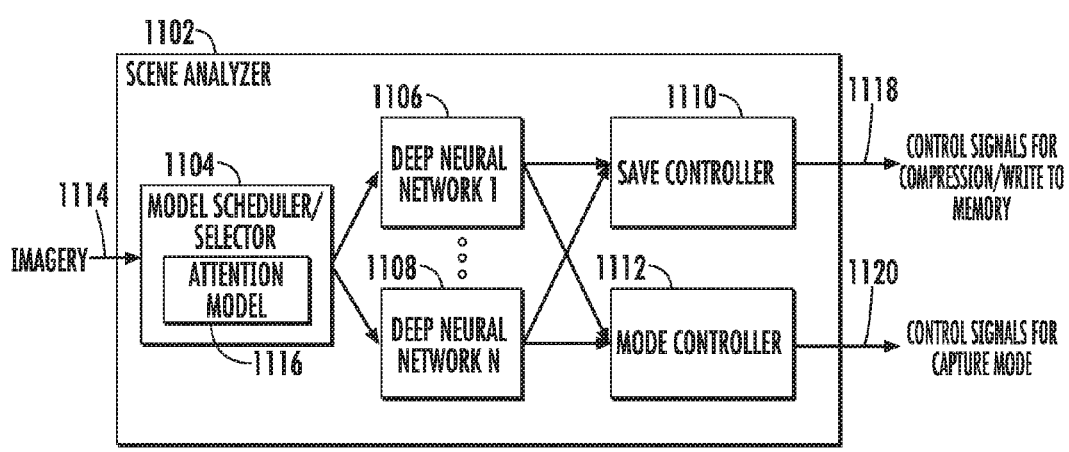
FIG. 11 depicts an example scene analyzer according to an example embodiment of the present disclosure.

FIG. 11 depicts an example scene analyzer 1102 according to an example embodiment of the present disclosure. The scene analyzer 1102 includes a model scheduler/selector 1104; a plurality of models that analyze characteristics of input images; a save controller 1110; and a mode controller 1112. In some implementations, the plurality of models are a plurality of deep neural networks (e.g., deep neural networks 1106 and 1108), or other multi-layer non-linear models. In some implementations, save controller 1110 and mode controller 1112 can be implemented as the same component (e.g., a "save and mode controller").

The scene analyzer 1102 can receive one or more images 1114. The scene analyzer 1114 can analyze each receive image 1114 and, based at least in part on such analysis, output one or more control signals 1118 and 1120. In particular, the control signals 1118 can control whether the one or more images 1114 are compressed and written to memory (e.g., a non-volatile memory). The control signals 1120 can control the capture mode of the image sensor or mobile image capture device as a whole.

The received imagery 1114 can include high resolution images and/or low resolution images. In some implementations, certain portions of scene analyzer 1102 can analyze low resolution versions of an image 1114 while other portions (e.g., portions which analyze facial features) analyze cropped portions of high resolution versions of the image 1114.

The model scheduler 1104 can control which models (if any) an image is input for scene analysis. The model selector 1104 can select which models to employ depending on a number of criteria including computational consumption considerations, energy consumption considerations, and/or the results of an initial analysis of the scene of the image. As one example, the model selector 1104 can simply implement a predefined schedule or can implement some defined logic regarding an ordering or configuration of models to employ.

As another example, the model selector 1104 may itself be a model (e.g., neural network), such as a multi-layer non-linear model (e.g., deep neural network).

In some implementations, the model selector 1104 includes an attention model 1116 that analyzes only a portion of an input image. The attention model 1116 can output an indication of whether each input image should be input into at least one of the downstream models for further scene analysis. Thus, the attention model 1116 can operate as a prefilter to the downstream models (e.g., deep neural networks 1106 and 1108) included in the scene analyzer 1102.

As one example, the attention model 1116 can be a recurrent deep neural network that tracks a face through a succession of images 1114 and outputs a probability that each analyzed image depicts the face experiencing joy. The attention model 1116 can also output a description of which portion of the next input image the attention model 1116 should analyze. In some implementations, a supervised objective function informs the attention model 1116 what is valuable to pay attention to.

Use of an attention model 1116 in this fashion can greatly reduce the energy consumption of the mobile image capture device since the attention model 1116, which limits its analysis to only a portion of the images, guards certain downstream models (e.g., deep neural networks 1106 and 1108) which may analyze the image in its entirety and/or require larger computational expenditure.

In other implementations, the attention model 1116 can be used in place of the other models (e.g., models 1106 and 1108) to guide image storage and/or capture mode decisions.

In yet further implementations, one or more of the various deep neural networks (e.g., 1106 and 1108) can be replaced with an attention model version of such network.

The scene analyzer 1102 can further include any number of models (e.g., deep neural networks 1106 and 1108) which analyze the scene depicted by an input image 1114 and output various descriptors (e.g., annotations) that describe a desirability of the scene of the input image 1114 (e.g., describe various image characteristics which impact the desirability of the scene). The scene analyzer 1102 can make intelligent decisions regarding image storage and/or capture mode on the basis of such descriptors. The neural networks can be convolutional neural networks, recurrent neural networks, feed forward neural networks, or combinations thereof.

In particular, the save controller 1110 can take as input all of the annotations from the models and use such annotations to decide whether or not to compress and store the image. Likewise, the mode controller 1112 can determine whether to change the capture mode of the mobile image capture device on the basis of such annotations.

In some implementations, the save controller 1110 and/or the mode controller 1112 can include one or more decision trees, models, and/or algorithms that apply some hand-crafted logic. Each of the save controller 1110 and the mode controller 1112 can include computer logic utilized to provide desired functionality. Thus, each of the save controller 1110 and the mode controller 1112 can be implemented in hardware, firmware and/or software controlling a general purpose processor. In some implementations, each of the save controller 1110 and the mode controller 1112 includes program code files stored on the storage device, loaded into a memory and executed by a processor or can be provided from computer program products, for example, computer executable instructions that are stored in a tangible computer-readable storage medium such as, for example, a RAM disk or card or other computer-readable optical or magnetic media.

In some implementations, the scene analyzer 1102 is implemented asynchronously with the capture of images 1114. Stated differently, in some implementations, the frame rate of image capture is (at least in some instances) different that the frequency at which the scene analyzer 1102 analyzes images 1114.

In some implementations, in addition to receiving imagery 1114 as input, the scene analyzer 1102 can also receive additional lower dimensional data such as capture parameters or IMU data. For example, IMU data can indicate a relative amount of motion there is during image capture. Analysis of walking frequency may allow the mobile image capture device to time the "right" capture instant as the user walks. Capture parameters such as exposure time can also be adjusted accordingly.

Low level analysis can also be performed in order to determine whether to perform multi-frame capture to enhance quality. For example, if the exposure values are very low and high motion blur or high amounts of noise are expected, the mobile image capture device can capture burst for quality enhancement. Multi-frame denoising can then be performed in either the mobile image capture device or the user computing device.

Figure 12:
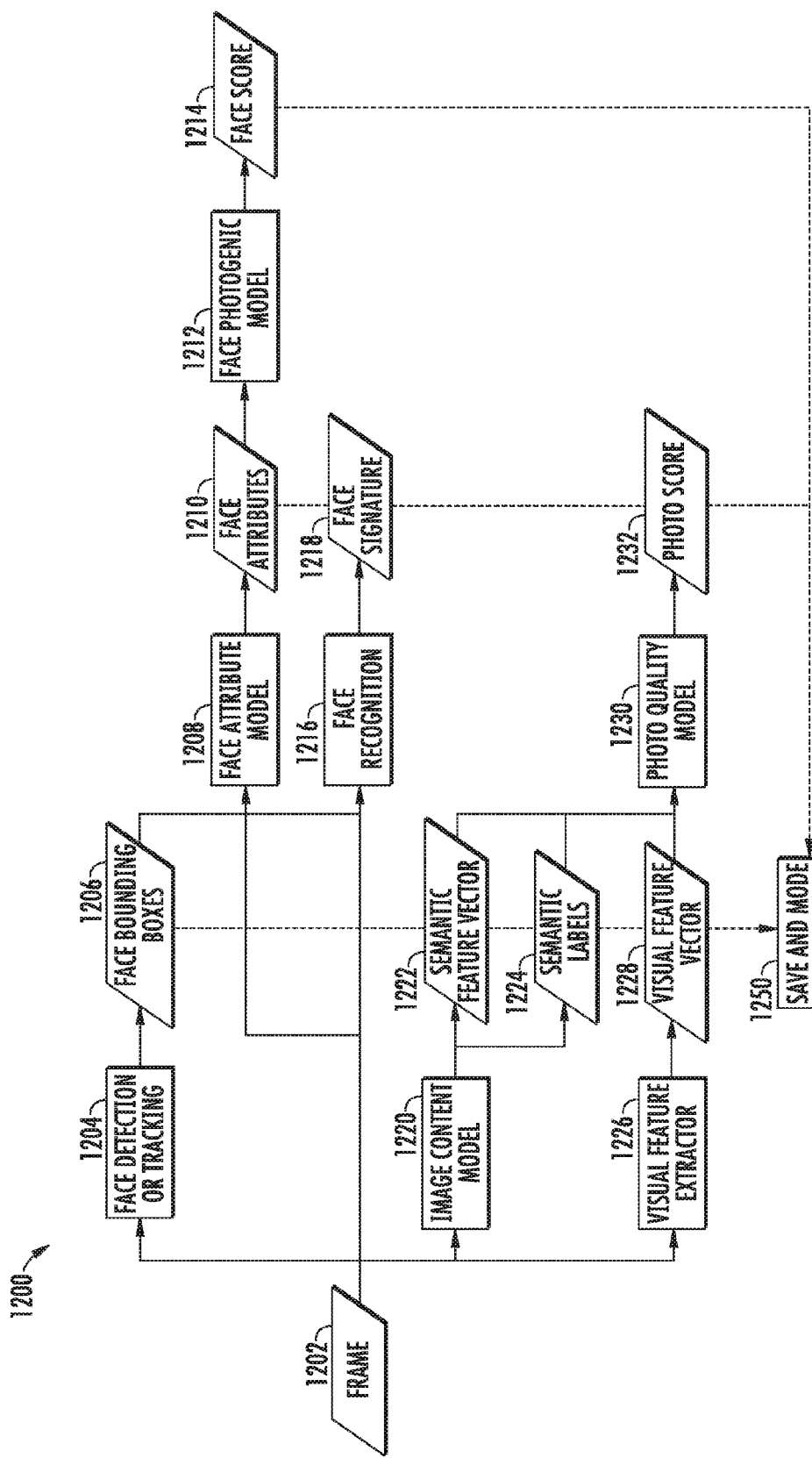
FIG. 12 depicts an example configuration of models in a scene analyzer according to an example embodiment of the present disclosure.

FIG. 12 depicts an example configuration 1200 of models in a scene analyzer according to an example embodiment of the present disclosure. In particular, FIG. 12 depicts different components operating in the scene analyzer and the data flow between them. As illustrated, certain portions of the execution can be parallelized.

In addition, the following discussion with reference to FIG. 12 will refer to various models. In some implementations, one or more (e.g., all) of such models are deep neural networks. Each model can output at least one descriptor that describes a characteristic of the image. The image can be annotated with such descriptor(s). Thus, the outputs of the models will be referred to as annotations. In some implementations, the models provide the annotations to a save and mode controller 1250 which annotates the image with the annotations.

The configuration 1200 receives as input a frame of imagery 1202. For example, the frame 1202 may have been selected by a model scheduler for analysis.

The frame of imagery 1202 is provided to a face detection or tracking model 1204. The face detection or tracking model 1204 detects one or more faces depicted by the frame 1202 and outputs one or more face bounding boxes 1206 that describe the respective locations of the one or more detected faces. The face bounding boxes 1206 can be annotated to the frame 1202 and can also be provided as input alongside the frame 1202 to a face attribute model 1208 and a face recognition model 1216.

In some implementations, the face detection or tracking model 1204 performs face tracking rather than simple face detection. In some implementations, the model 1204 may choose which of detection or tracking to perform. Face tracking is a faster alternative to face detection. Face tracking can take as additional inputs the face detection bounding boxes 1206 from a previous frame of imagery. The face tracking model 1204 updates the position of the bounding boxes 1206, but does not detect new faces.

Importantly, neither face detection nor face tracking attempt to determine or ascertain a human identity of any of the detected faces. Instead, the face detection or tracking model 1204 simply outputs face bounding boxes 1206 that describe the location of faces within the frame of imagery 1202. Thus, the model 1204 performs only raw detection of a face (e.g., recognition of depicted image features that are "face-like"), without any attempt to match the face with an identity.

The face attribute model 1208 can receive as input one or more crops of the frame of imagery 1202 (e.g., relatively higher resolution crops), where the one or more crops correspond to the portion(s) of the frame 1202 defined by the coordinates of the bounding box(es) 1206. The face attribute model 1208 can output an indication (e.g., a probability) that the detected face(s) include certain face attributes 1210. For example, the face attribute model 1208 can output respective probabilities that the detected faces include smiles, open eyes, certain poses, certain expressions, a diversity of expression, or other face attributes 1210.

The face attributes 1210 can be provided as input alongside the frame of imagery 1202 to a face photogenic model 1212. The face photogenic model 1212 can output a single face score 1214 which represents a level of photogenicness of a pose, an expression, and/or other characteristics or attributes of the detected face(s).

Returning to the output of face detection or tracking model 1204, the face recognition model 1216 can receive as input one or more crops of the frame of imagery 1202 (e.g., relatively higher resolution crops), where the one or more crops correspond to the portion(s) of the frame 1202 defined by the coordinates of the bounding box(es) 1206. The face recognition model 1216 can output a face signature for each of the detected faces. The face signature can be an abstraction of the face such as an embedding or template of the face or features of the face.

Importantly, the face recognition model 1216 does not attempt to determine or ascertain a human identity of the detected face(s). Thus, the face recognition model 1216 does not attempt to determine a name for the face or otherwise match the face to public profiles or other such information. Instead, the face recognition model 1216 simply matches an abstraction of the detected face(s) (e.g., an embedding or other low-dimensional representation) to respective other abstractions associated with previously "recognized" faces. As one example, the face recognition model 1216 may provide a probability (e.g., a level of confidence from 0.0 to 1.0) that an abstraction of a face depicted in an input image matches an abstraction of a face depicted in a previously captured image. Thus, the face recognition model 1216 may indicate (e.g., in the face signature 1218) that a face detected in the image 1202 is likely also depicted in a previously captured image, but does not attempt to identify "who" this face belongs to in the human identity contextual sense. Similarly, the face recognition model 1216 may provide a probability that an abstraction of a face depicted in an input image matches an abstraction of a face that has been previously indicated as having a heightened importance to the user of the mobile image capture device. Thus, the face recognition model 1216 may indicate that a face detected in the image 1202 is likely also included in the set of faces that the user has indicated as having heightened performance, but does not attempt to identify "who" this face belongs to in the human identity contextual sense.

The frame of imagery 1202 can also be provided as input to an image content model 1220. The image content model 1220 can output one or more semantic feature vectors 1222 and one or more semantic labels 1224. The semantic feature vectors 1222 can be used for determining that two images contain similar content (e.g., similar to how face embeddings are used to determine that two faces are similar). The semantic labels 1224 can identify one or more semantic features (e.g., "dog," "sunset," "mountains," "Eiffel Tower," etc.) detected within the frame of imagery 1202. The notion of similarity between images can be used to ensure a diversity of captured images.

In some implementations, the image content model 1220 is a version of a deep convolutional neural network trained for image classification. In some implementations, a subset of semantic classes that are particularly important to users of the mobile image capture device (e.g., animals, dogs, cats, sunsets, birthday cakes, etc.) can be established and the image content model 1220 can provide a particular emphasis on detection/classification with respect to such subset of semantic classes having elevated importance.

The frame of imagery 1202 can also be provided as input to a visual feature extractor model 1226. The visual feature extractor model 1226 can output one or more visual feature vectors 1228 that describe one or more visual features (e.g., a color histogram, color combinations, an indication of amount of blur, an indication of lighting quality, etc.) of the frame 1202.

The semantic feature vectors 1222, semantic labels 1224, and the visual feature vectors 1228 can be provided as input alongside the frame 1202 to a photo quality model 1230. The photo quality model 1230 can output a photo quality score 1232 based on the inputs. In general, the photo quality model 1230 will determine the photo quality score 1232 on the basis of an interestingness of the image 1202 (e.g., as indicated by the semantic labels 1224), a technical quality of the image 1202 (e.g., as indicated by visual feature vectors 1228 that describe blur and/or lighting), and/or a composition quality of the image 1202 (e.g., as indicated by the relative locations of semantic entities and visual features).

The save and mode controller 1250 will take as input all of the annotations 1206, 1210, 1214, 1218, 1222, 1224, 1228, and 1232 and make a decision whether or not to save the frame of imagery 1202 or a high resolution version thereof and also whether or not to change a capture mode of the device. In some implementations, the save controller 1250 will try to save frames that the final curation function (e.g., the transfer controller and/or best shot selector) will want to select, and hence can be viewed as an online/real-time approximation to such curation function.

In some implementations, the save and mode controller 1250 includes an in-memory annotation index or other frame buffering so that save and mode decisions regarding frame 1202 can be made relative to peer images. In other implementations, the save and mode controller 1250 makes decisions based only on information about the current frame 1202.

In some implementations, and to provide an example only, the save and mode controller 1250 may be designed so that approximately 5% of captured images are selected for compression and storage. In some implementations, whenever the save and mode controller 1250 triggers storage of an image, some window of imagery around the image which triggered storage will be stored.

In some implementations, various ones of the models can be combined to form a multi-headed model. As one example, the face attribute model 1208, the face recognition model 1216, and/or the face photogenic model 1212 can be merged or otherwise combined to form a multi-headed model that receives a single set of inputs and provides multiple outputs.

Configuration 1200 is provided as one example configuration only. Many other configurations of models that are different than configuration 1200 can be used by the scene analyzer. In particular, in some implementations, a model scheduler/selector of the scene analyzer can dynamically reconfigure the configuration of models to which an image is provided as input.

Figure 13:
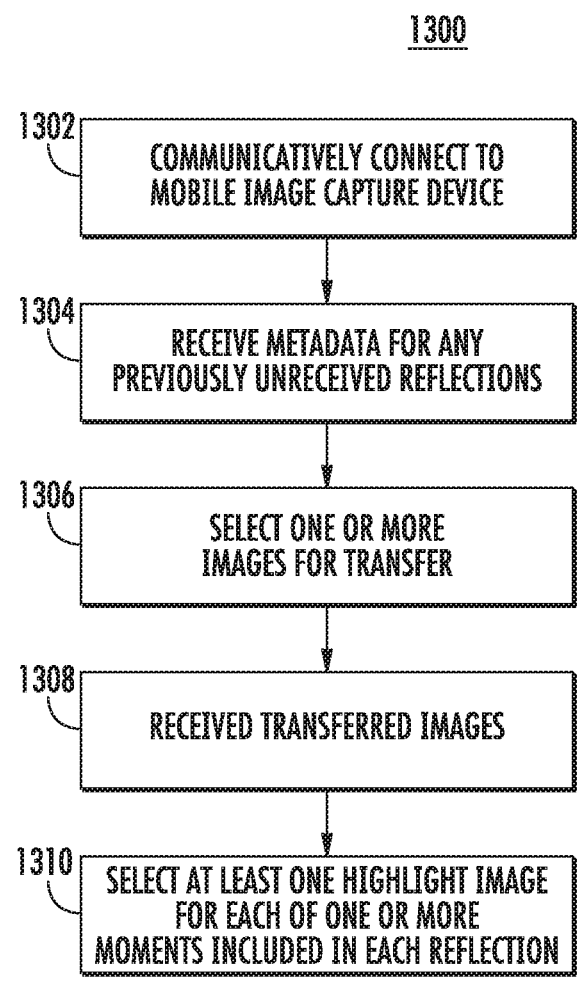
FIG. 13 depicts a flow chart of an example method to curate images captured at a mobile image capture device according to an example embodiment of the present disclosure.

FIG. 13 depicts a flow chart of an example method 1300 to curate images captured at a mobile image capture device according to an example embodiment of the present disclosure. In particular, the example method 1300 can be performed by a user computing device.

At 1302, the user computing device communicatively connects to the mobile image capture device. For example, the user computing device can communicatively connect to the mobile image capture device over a Wi-Fi local area network.

At 1304, the user computing device receives metadata for any reflections or image capture sessions that have not yet been received from the mobile image capture device. For example, the metadata can include the annotations, IMU data, timestamp, and other information (e.g., was this image manually triggered) associated with each image included in the reflection. However, the transferred data will typically not include the images themselves.

At 1306, the user computing device selects one or more of the images for transfer. For example, the user computing device can implement a transfer controller to select one or more of the images for transfer. In particular, the transfer controller can take as input the collection of annotations and other metadata and make the decision about which images to transfer from the image capture device to the user computing device.

In some implementations, the transfer controller performs an optimization algorithm to select which of the images stored in the memory of the mobile image capture device to request for transfer. The optimization algorithm can have a plurality of associated objectives which include, for example, at least a diversity of settings (e.g., locations and times) and a diversity of depicted persons, while still requesting transfer of the most desirable images. Various weights can be assigned to the objectives. In some implementations, the transfer controller can implement a sub-modular function to select which images to request for transfer. In some implementations, all images that were manually triggered will be selected for transfer. In some implementations, at least one image that depicts each frequently-seen person will be selected for transfer.

At 1308, the user computing device receives the transferred images.

At 1310, the user computing device selects at least one highlight image for each of one or more moments included in the reflection. For example, selection of highlight images may be performed based on the annotations or other metadata included for each of the images. In some implementations, each image in a moment is normalized relative to its peer images within such moment prior to performing highlight selection. Thus, selection of a highlight image for each moment can be based at least in part on a comparison of the annotations of each image included in such moment relative to the annotations of at least one other image included in such moment. In some implementations, selecting the at least one highlight image at 1310 can include determining a score for each transferred image, where the image that receives the highest score is considered the highlight image.

FIGS. 14-23 and 27-31 depict example user interfaces that can be used to enable a user to interact with an image curation, editing, storage, and sharing application. The user interfaces are provided as examples only. Many different user interfaces can be used to enable the interactions and functionality described by the present disclosure.

Figure 14:
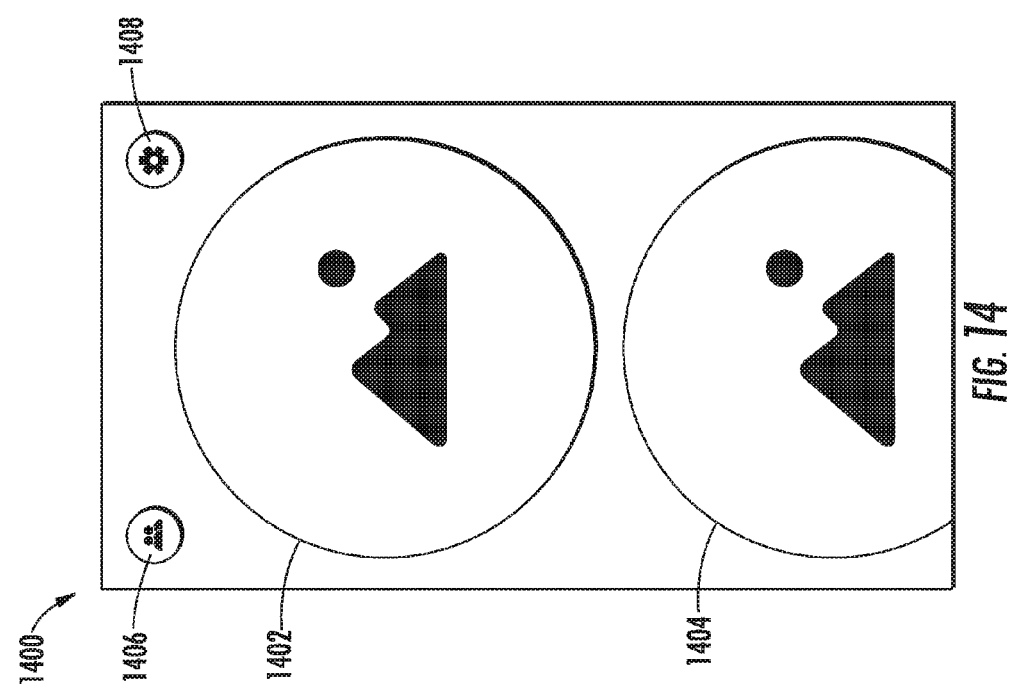
FIG. 14 depicts an example user interface to enable selection of a reflection for editing according to an example embodiment of the present disclosure.

FIG. 14 depicts an example user interface 1400 to enable selection of a reflection for editing according to an example embodiment of the present disclosure. In particular, user interface 1400 can be described as a home screen that is a starting point for the application.

User interface 1400 can provide a scrollable list of reflections in the order they were added. For example, a representative image can be provided for each reflection. For example, a first image 1402 can be representative of a first reflection while a second image 1404 is representative of a second reflection. Touching, tapping, or otherwise selecting one of the images 1402 or 1404 can result in the application opening or accessing the particular reflection for more in depth editing (e.g., access to user interfaces 2200 and 2300 of FIGS. 22 and 23).

Each reflection can be represented by a spherical image, as illustrated. Other forms of representation can be used as well (e.g., textual list). In some implementations, the reflection representation has a number of different visual states that indicate the state of the corresponding reflection. For example, the reflection can have the following states: reflection capture in progress; reflection stored on mobile image capture device but not yet on user computing device; reflection actively being transferred from mobile image capture device to user computing device; reflection ready for editing; loading reflection from backup source; importing reflection from third-party backup source; shared reflection available, but not downloaded; and/or shared reflection ready for editing.

The user interface 1400 can further include a shot list access button 1406 and a settings access button 1408. Touching, tapping, or otherwise selecting the shot list access button 1406 can result in the application providing the user interface 1500 of FIG. 15.

Figure 15:
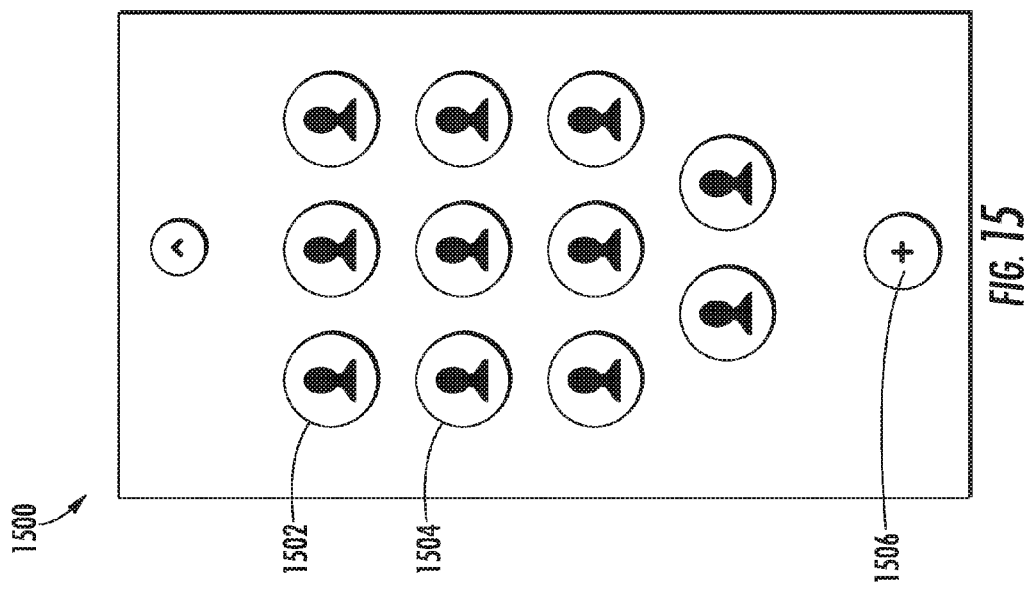
FIG. 15 depicts an example user interface to enable selection of entities that have a heightened importance according to an example embodiment of the present disclosure.

In particular, FIG. 15 depicts an example user interface 1500 to enable management of entities that have a heightened importance according to an example embodiment of the present disclosure in some implementations, the set of entities that have a heightened importance to the user can be referred to as a "shot list".

The user interface 1500 can provide a scrollable list of entities (e.g., entities 1502 and 1504) that the user can manage (e.g., delete, prioritize, etc.). In particular, the user can combine entities, remove entities, manually add an entity, or other actions. In particular, the user can select button 1506 to manually add an entity to the shot list. The entities can be assigned different levels of importance.

In some implementations, the shot list can be manually created or seeded by the user or can be auto populated with entities that are frequently commonly recognized within images captured by the mobile image capture device. In some implementations, a user may optionally elect to have their entire photographic library (e.g., including images not captured by the mobile image capture device) analyzed to seed the shot list.

A representative image can be provided for each entity. Entities in the shot list can include people or other semantic entities.

In some implementations, if the user selects a particular representative image of an entity, the user may be presented with information or statistics regarding images of such entity over time. Alternatively or additionally, the information or statistics can provide a justification as to why such entity was automatically added to the shot list. As another example, if the user presses and holds on a particular representative image of an entity, one or more of the representative images of the entities may be switched into a deletion visualization which enables the user to x-out or otherwise delete particular entities from the shot list.

In some implementations, the shot list is a persistent list that is maintained over time and passed back and forth between and updated by the user computing device and the mobile image capture device. In other implementations, the shot list can be session-specific. In some implementations, one or more visualizations can be provided that show how importance of certain entities has changed over time or demonstrates relative importance of entities versus other entities.

In some implementations, when the shot list is manually updated or tweaked, one or more reflections can be recomposed by the user computing device and/or mobile image capture device to better reflect the updated shot list. As one example, after a reflection has been transferred to a user computing device, a user might navigate to user interface 1500 and delete certain entities that were automatically added to the shot list. For example, the deleted entities may have been bystanders that were frequently captured in images. In response to such shot list adjustments, the user computing device can respond by recomposing the reflection to filter out or blur the bystander from images or wholly eliminate images that depict the bystander.

Figure 16:
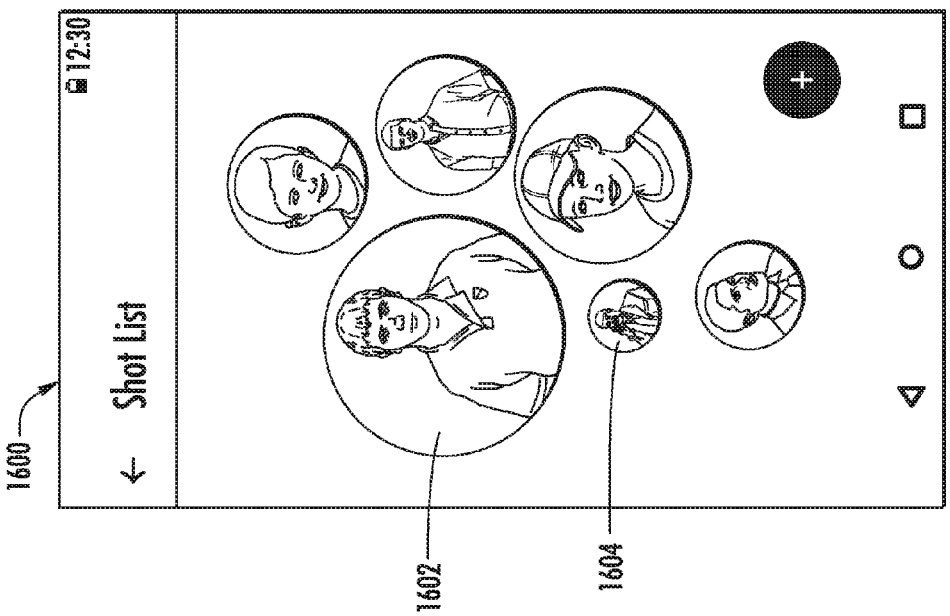
FIG. 16 depicts an example user interface to enable selection of entities that have a heightened importance according to an example embodiment of the present disclosure.

FIG. 16 depicts an alternative user interface 1600 to enable selection and management of entities that have a heightened importance according to an example embodiment of the present disclosure. In particular, user interface 1600 provides representative images of entities included in the shot list, where the relative size of the representative image is indicative of a frequency at which the corresponding entity is depicted in captured imagery. For example, the representative image 1602 is relatively larger than the representative image 1604. Therefore, the entity depicted in representative image 1602 is more frequently depicted in captured images than is the entity depicted in representative image 1604.

Figure 17:
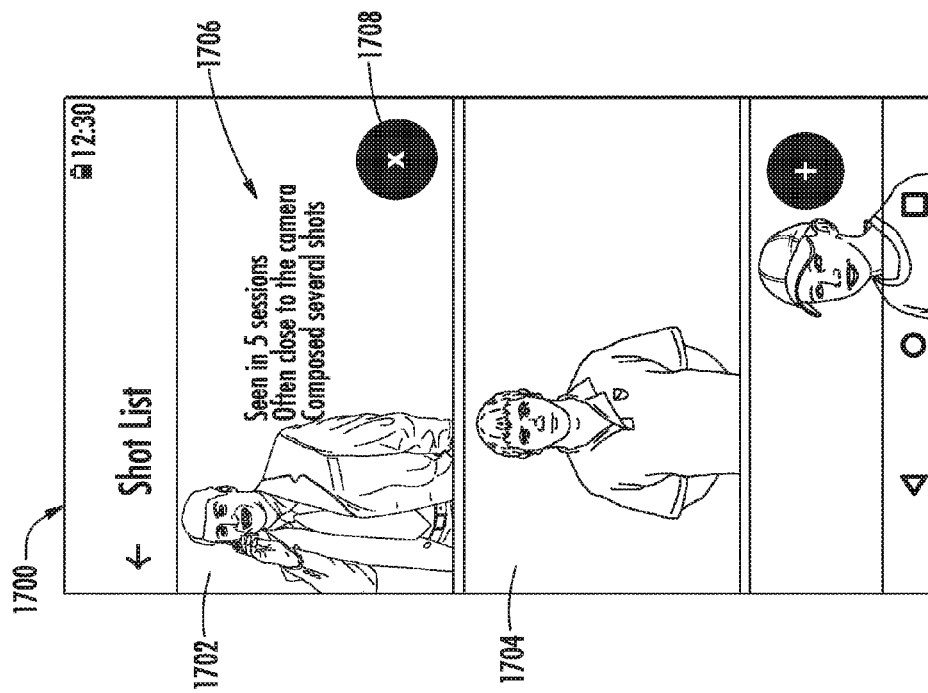
FIG. 17 depicts an example user interface to enable selection of entities that have a heightened importance according to an example embodiment of the present disclosure.

FIG. 17 depicts another alternative user interface 1700 to enable selection and management of entities that have a heightened importance according to an example embodiment of the present disclosure. In particular, the user interface 1700 provides horizontal titles (e.g., horizontal titles 1702 and 1704) respectively for the entities included in the shot list. The horizontal titles can be scrollable.

In some implementations, if a user swipes on one of the tiles, the user interface 1700 can provide information or statistics 1706 regarding images of such entity over time (e.g., "seen in 5 sessions"). Alternatively or additionally, the information or statistics 1706 can provide a justification or explanation as to why such entity was automatically added to the shot list (e.g., "often close to the camera" or "composed several shots of this entity in editing interface"). Swiping on the horizontal tile may also reveal a button 1708 that enables deletion of the corresponding entity from the shot list.

The user interfaces 1500, 1600, and 1700 are provided as examples only. Many different representations of entities and controls for management thereof can be used according to the present disclosure.

Figure 18:
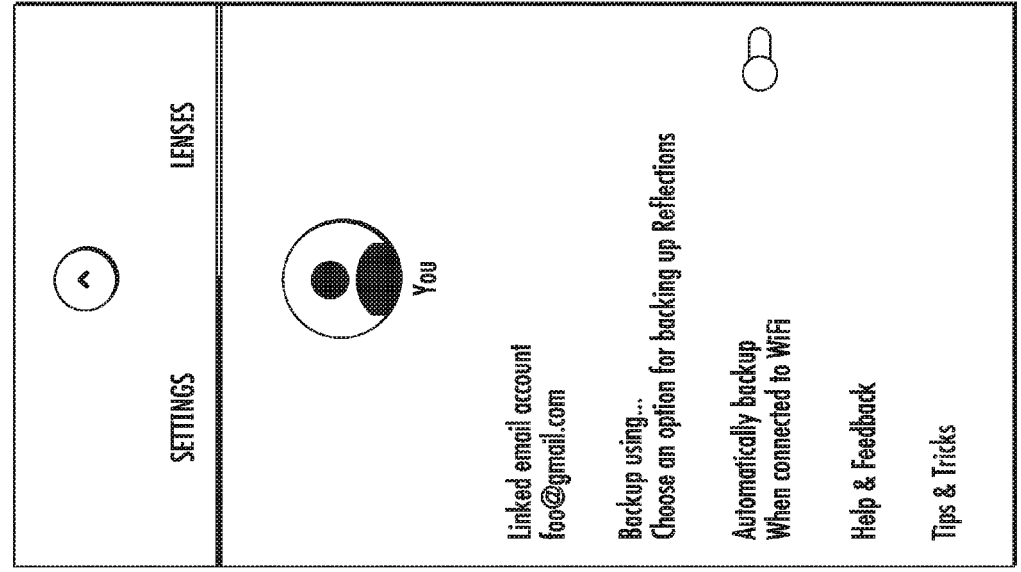
FIG. 18 depicts an example user interface to display settings information according to an example embodiment of the present disclosure.

Referring again to FIG. 14, if the user selects the settings button 1408, the application can transition to user interface 1800 of FIG. 18.

FIG. 18 depicts an example user interface 1800 to display settings information according to an example embodiment of the present disclosure. The user interface 1800 can provide control over settings such as a linked email account; backup and/or storage preferences; automatic backup on/off toggle; help and feedback; and/or tips and tricks.

The user may be able to toggle between menus for controlling settings associated with the user computing device or associated account and settings associated with the mobile image capture device. For example, if the user selects the "lenses" button, the application can transition to user interface 1900 of FIG. 19. More particularly, as used with reference to FIGS. 18, 19, and 30, the term "lens" or "lenses" is used as a nickname or shorthand for the mobile image capture device(s).

Figure 19:
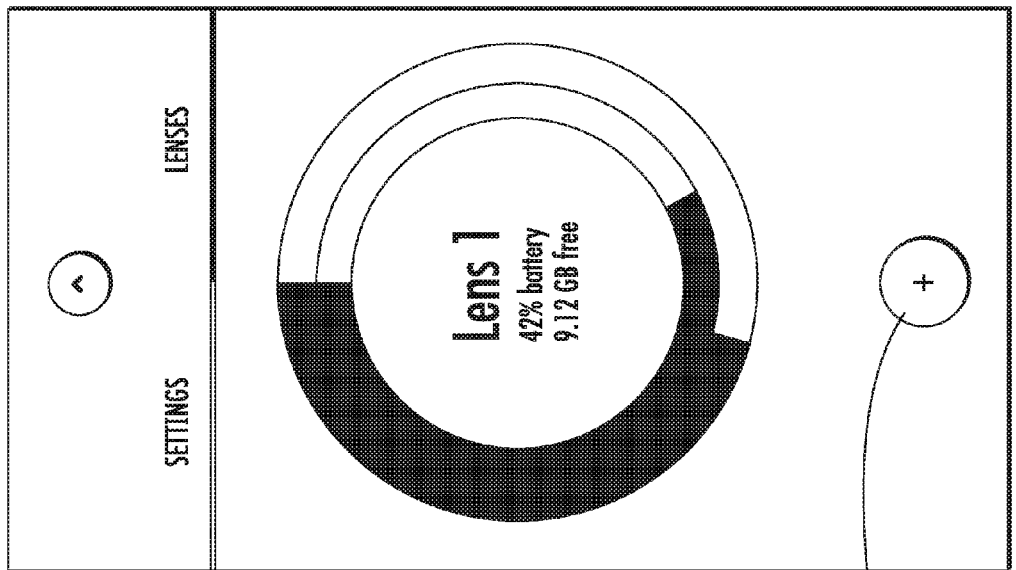
FIG. 19 depicts an example user interface to display operational data for mobile image capture devices according to an example embodiment of the present disclosure.

FIG. 19 depicts an example user interface 1900 to display operational data for mobile image capture devices according to an example embodiment of the present disclosure. In particular, the user interface 1900 can provide information such as state of charge and/or remaining memory availability for a mobile image capture device paired to the user computing device.

The user interface 1900 can also include a button 1902 that enables a new or additional mobile image capture device to be paired with the user computing device. As one example, if the user selects button 1902, the application can cause the user computing device to display screen 2000 of FIG. 20.

Figure 20:
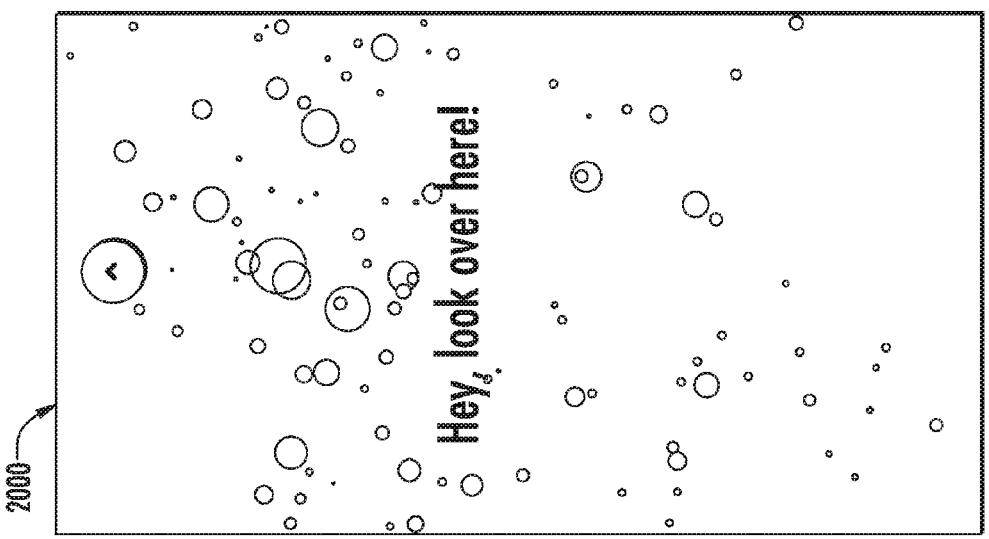
FIG. 20 depicts an example display screen used in a visual pairing procedure according to an example embodiment of the present disclosure.

FIG. 20 depicts an example display screen 2000 used in a visual pairing procedure according to an example embodiment of the present disclosure. More particularly, in some implementations, the user computing device and the mobile image capture device are operable to perform visual pairing. In one example, the user computing device displays the screen 2000 which includes a pattern of lines or shapes (illustrated here as a pattern of bubbles).

The mobile image capture device is operable to capture imagery of the pattern and, in response to capturing the imagery of the pattern, communicatively connect to the user computing device (e.g., using Bluetooth Low Energy advertisements and discovery). For example, the pattern can be a visual encoding of a key or other information sufficient to enable communicative connection. In other implementations, the pattern can include a pattern of colors in addition to or alternatively to a pattern of shapes. In other implementations, the user computing device and the mobile image capture device may have other pairing techniques.

Figure 21:
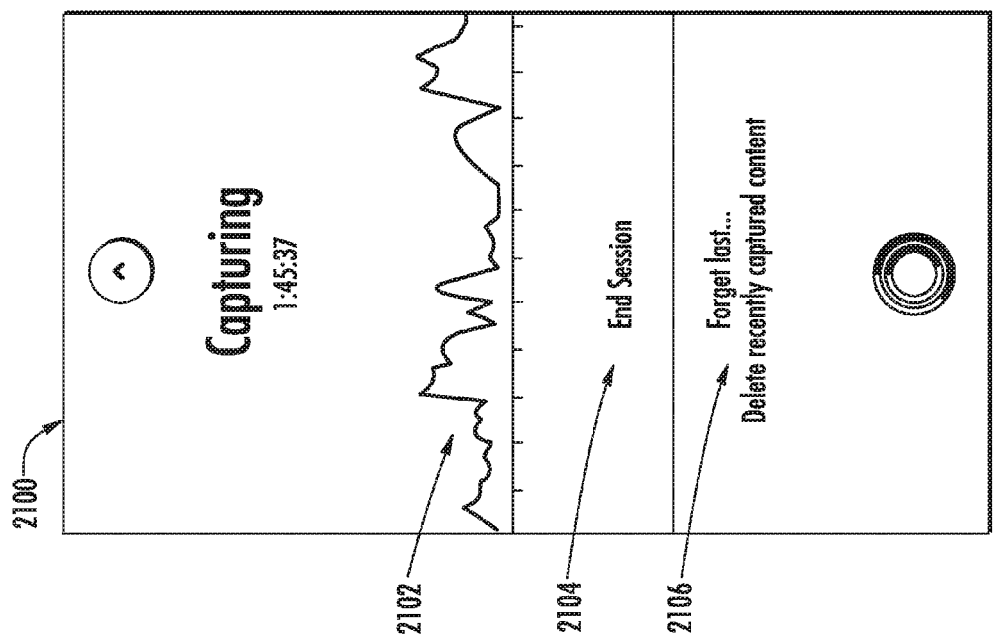
FIG. 21 depicts an example user interface to display control options for a mobile image capture device according to an example embodiment of the present disclosure.

FIG. 21 depicts an example user interface 2100 to display control options for a mobile image capture device according to an example embodiment of the present disclosure. In particular, the user interface 2100 can serve as an activity hub for the mobile image capture device during use. As an example, the user interface application on the user computing device may automatically launch the user interface 2100 when the user uncovers the mobile image capture device.

In some implementations, the user interface 2100 displays a capture visualization 2102 received from the mobile image capture device. In particular, display of the capture visualization 2102 in the user interface 2100 is indicative of present operation of the mobile image capture device. Typically, the capture visualization 2100 will be some abstracted representation of recently captured imagery (e.g., a histogram or other visualization of color, lighting, or other parameters, a cartoon of the scene, a pin-hole view of the scene, etc.) without being the captured imagery itself. As one example, the capture visualization 2102 can be a representation of an "interestingness" signal of the captured imagery versus time. As another example, the capture visualization 2102 can be a relatively meaningless metric (e.g., number of beards seen during capture session) that simply represents a silly or fun way to indicate that the mobile image capture device is presently operating.

Thus, the capture visualization 2102 may be based at least in part on one or more recently captured images of the plurality of images. Use of capture visualizations in such fashion enables the user to understand that the mobile image capture device is operating and capturing imagery, but prevents distracting the user from actually enjoying the captured moment by showing detailed imagery for review.

User interface 2100 can also include a control 2104 for ending the current capture session. In some implementations, the end session control 2104 is available only when the mobile image capture device is covered (e.g., a lens cover is placed over the image sensor) and the current capture session is paused.

The user interface 2100 can also include a control 2106 to delete recently captured imagery. The amount of time's worth of imagery that is deleted can be varied based on user input.

Referring again to FIG. 14, if the user selects one of the reflections (e.g., by tapping representative image 1402) the application can transition to a user interface that enables editing of images included in the selected reflection. In particular, the user interface can enable both temporal and spatial gesture control in service of photographic "re-composition." FIGS. 22 and 23 provide two examples of such an editing user interface.

FIG. 22 depicts an example user interface 2200 to enable editing of captured imagery according to an example embodiment of the present disclosure. In some implementations, the user interface 2200 represents a core of the image editing user experience.

The user interface 2200 enables the user to explore the reflection via a sequence of moments. In particular, example gesture controls to navigate between or within a moment will be discussed below and with further reference to FIGS. 24 and 25. Generally, the user interface 2200 will display at least a portion 2202 of a captured image to fill an available display space. A record button 2204, a gallery button 2206, and a progress bar 2208 can be overlaid on the portion 2202 of the captured image within the display space. The progress bar 2208 can provide an indication of the presently displayed image's position with a timeline of the moment or a timeline of the reflection as a whole.

In some implementations, the images received from the mobile image capture device are wide angle images. Therefore, the user computing device can display a dewarped portion 2202 of the wide angle image within the user interface 2200. For example, the displayed portion 2202 can correspond to a recommended composition, as will be discussed further below. The user interface 2200 can enable various gesture controls for temporally navigating between images. In addition, the user interface 2200 can permit the user to spatially explore a particular image to view other portions of the image or to cause new imagery to be synthesized (e.g., through control of a virtual camera).

Discussing first the gesture controls for temporally exploring images in a reflection, as one example, the user can navigate frame-by-frame within a moment by performing a slow swipe or drag gesture. Thus, if the user performs a slow drag gesture, the portion 2202 of the image can be replaced by a portion of the previous or next image in the moment (depending on the direction of the drag). Such frame-by-frame display of images in a moment can be referred to as visually scrolling the images.

In some implementations, images within a moment can be cinematically scrolled by sequentially displaying the plurality of images included in the presently displayed moment without translating the plurality of images included in the presently displayed moment relative to the display. Thus, in response to a slow drag gesture, the series of images included in a moment can be displayed in the style of a "flip book" such that at least a portion of the moment is presented cinematically.

As another example temporal control gesture, a user can navigate between moments by performing a fast swipe or drag gesture. For example, in response to a user swipe, the user interface can transition to display of an image from the previous or next moment (depending on the direction of the swipe).

As an example, the displayed image from the previous or next moment can be the last image within the previous moment or first image within the next moment. As another example, the displayed image from the previous or next moment can be the highlight image selected for such moment. As yet another example, the user interface 2200 can transition to the next moment by cinematically scrolling from the first image included in such moment to the highlight image for such moment. Likewise, the user interface 2200 can transition to the previous moment by cinematically scrolling backwards from the last image included in such moment to the highlight image for such moment.

The user interface 2200 also includes controls for spatially exploring the images included in a reflection. More particularly, the user interface 2200 can enable the user to manipulate or control a virtual camera to spatially explore a particular image (e.g., the currently displayed image).

In particular, the virtual camera controls, in combination with advanced computational photography techniques, enable the user to spatially explore a captured scene and compose "new" photographs from a different perspective than the perspective from which the mobile image capture device captured the original image. Example techniques for enabling such spatial exploration and control will be discussed with further reference to FIG. 26 below. In some implementations, spatial exploration (e.g., virtual camera controls) are performed through multi-touch or multiple contact point gestures.

The user interface 2200 also enables the user to "re-take" one or more photographs and/or videos from the images included in a moment. In particular, if the user presses and quickly releases (e.g., taps) the record button 2204, the currently displayed portion 2202 of the image will be captured as a "new" photograph. As noted, the user can manipulate the virtual camera to view other portions of the image and capture a "new" photograph of such other portions, as well.

However, if the user presses and holds the record button 2204, a new video will be created. The new video will include a series of images from the moment (e.g., from the currently displayed image forward) as viewed from the perspective that corresponds to the currently displayed portion 2202 of the image. Stated differently, the video includes a series of images from the moment, as viewed from the current perspective of the virtual camera. Each image in the video can have edited or otherwise adjusted camera parameters (e.g., focus, lens distortions, lighting, etc.) that would result from the current perspective of the virtual camera.

In further implementations, the user interface can enable the user to search through multiple reflections' worth of images based on semantic labels or other data. In particular, with sufficient imagery data (such as a reflection library), a user could select a single item in a picture and the user computing device could search out images that include the same or other similar items. As an example, a user can select a person and see other images of that person in place by spinning a time based dial, for instance. If ordered in time like this, for example, the user could see their child grow up based on the photos the user has captured of the child over time.

FIG. 23 depicts an example user interface 2300 to enable editing of captured imagery according to an example embodiment of the present disclosure. In particular, user interface 2300 illustrates the use of a portion of an image to fill an available display space, while a record button 2304 and a gallery button 2306 are overlaid upon the display space.

Figure 24:
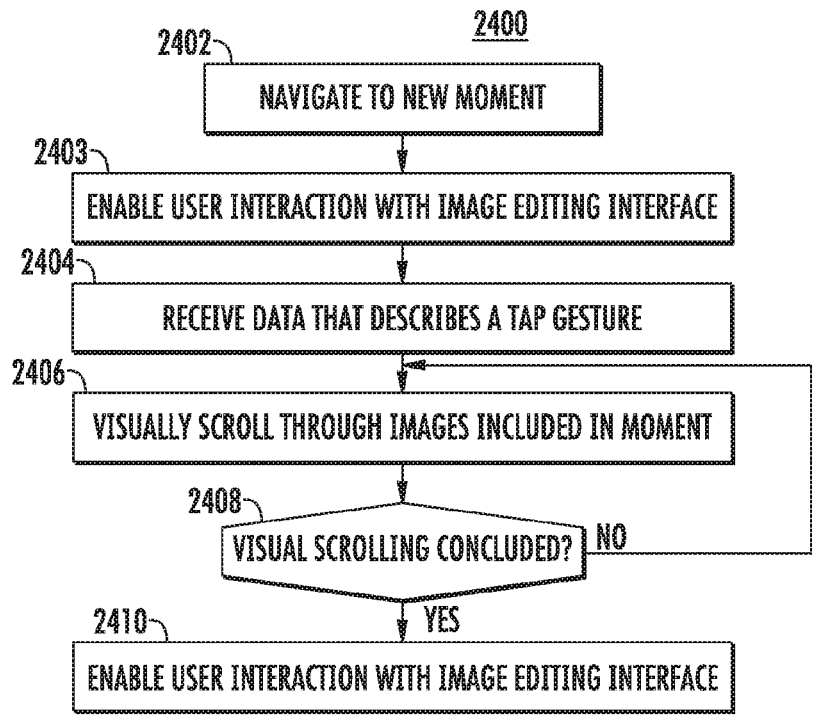
FIG. 24 depicts a flow chart of an example method to visually scroll images according to an example embodiment of the present disclosure.

FIG. 24 depicts a flow chart of an example method 2400 to visually scroll images according to an example embodiment of the present disclosure.

At 2402, the user computing device navigates to a new moment. For example, the user computing device can navigate to a new moment as a result of a reflection being selected from user interface 1400 of FIG. 14. As another example, the user computing device can navigate to a new moment from a previously displayed moment.

At 2403, the user computing device enables user interaction with image editing interface. For example, the user can scrub or scroll between images contained within the moment or can adjust a perspective of a virtual camera to view a different portion of an image. Various other image editing controls can be provided as well.

At 2404, the user computing device receives data that describes a tap gesture. In particular, the user computing device can receive data that describes a tap gesture performed on a portion of the image and not on a record button or a gallery button. In some implementations, the tap of the portion of the image can serve as an indication that the user would like to view the moment cinematically. In some implementations, a medium speed drag gesture can be used instead of the tap gesture. For example, the medium speed drag gesture can be faster than a frame-by-frame drag gesture but slower than a moment-to-moment swipe.

At 2406, the user computing device visually scrolls through the images included in the presently viewed moment. In some implementations, a velocity at which the plurality of images are visually scrolled is reduced when the at least one highlight image selected for the moment is provided on the display.

As one example, in some implementations, visually scrolling the images in the moment at 2406 can include visually scrolling the plurality of images such that the velocity at which the plurality of images are visually scrolled is incrementally reduced as the at least one highlight image is approaching display. As another example, in some implementations, visually scrolling the images in the moment at 2406 can include visually scrolling the plurality of images on the display such that the scrolling slows and then stops upon the highlight image.

More particularly, in some implementations of the present disclosure, the user computing device (e.g., the best shot selector or transfer controller) can determine a plurality of tension values respectively for the plurality of images based at least in part on the plurality of annotations respectively associated with the plurality of images. Thereafter, the user computing device can visually scroll the plurality of images at a velocity which is non-constant and which is inversely proportional to the tension value of a currently displayed image. Thus, images with relatively larger tension values will be displayed for a greater duration than images with relatively smaller tension values, where the magnitude of an image's tension value is indicative of the desirability of the scene depicted by such image.

As another example, in some implementations, visually scrolling the images in the moment at 2406 can include cinematically scrolling the images in the moment in a flip book fashion.

In addition, in some implementations, the user computing device determines a recommended composition for each of the plurality of images based at least in part on the at least one annotation associated with such image. In particular, the recommended composition for each image may include only a recommended portion of such image. As an example, in some implementations, the plurality of images in each moment comprise a plurality of wide angle images and the recommended composition for each image includes only an unwarped or dewarped portion of such image. In such implementations, visually scrolling the plurality of images at 2406 can include visually scrolling the respective recommended portions of the plurality of images on the display (e.g., the respective unwarped portions).

Referring again to FIG. 24, at 2408, the user computing device determines whether visual scrolling is concluded. If visual scrolling is not concluded, then the device returns to 2406 and continues visually scrolling the images. However, if visual scrolling is concluded, then the device proceeds to 2410.

At 2410, the user computing device enables user interaction with the image editing interface. Thus, an additional gesture control of the present disclosure can include a tap or a medium speed drag on the displayed image to cause visual scrolling of images of the presently viewed moment.

In further implementations, the user computing device can perform visual scrolling of images within a moment (e.g., in the different fashions described above) immediately upon navigating to a new moment. For example, visual scrolling can be performed as an intermediate step between 2402 and 2403.

Figure 25:
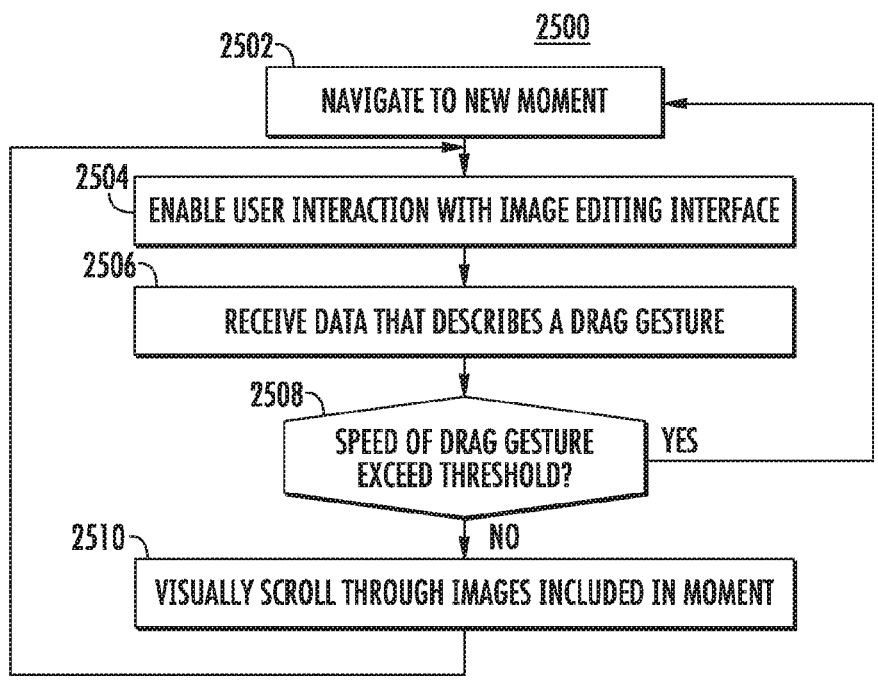
FIG. 25 depicts a flow chart of an example method to enable navigation in an image editing application according to an example embodiment of the present disclosure.

FIG. 25 depicts a flow chart of an example method 2500 to enable navigation in an image editing application according to an example embodiment of the present disclosure.

At 2502, the user computing device navigates to a new moment. For example, the user computing device can navigate to a new moment as a result of a reflection being selected from user interface 1400 of FIG. 14. As another example, the user computing device can navigate to a new moment from a previously displayed moment.

At 2504, the user computing device enables user interaction with the image editing interface. For example, the user can adjust a perspective of a virtual camera to view a different portion of a currently displayed image. Various other image editing controls can be provided as well.

At 2506, the user computing device receives data that describes a drag gesture. For example, the drag gesture can be a single contact point moved in a linear (e.g., horizontal) direction.

At 2508, the user computing device determines whether the speed of the drag gesture exceeds a threshold speed. If the speed of the drag gesture does exceed the threshold speed, then the user device computing device returns to 2502 and navigates to a new moment.

In some implementations, navigating to a new moment at 2502 can include translating one of the images included in the presently displayed moment off of the display while translating one of the images included in the other moment onto the display. This has the effect of visually announcing the transition between moments, similar to the frame by frame presentation of a comic book, and provides a distinct visual contrast to cinematic scrolling of images within a moment.

In some implementations, navigating to a new moment at 2502 can include transitioning from a currently displayed image to an image from the previous or next moment (depending on the direction of the drag gesture). For example, the image from the previous or next moment can be the last image within the previous moment or first image within the next moment. As another example, the displayed image from the previous or next moment can be the highlight image selected for such moment.

As yet another example, navigating to the next moment at 2502 can include cinematically scrolling from the first image included in such moment to the highlight image for such moment. Likewise, the navigating to the previous moment at 2502 can include cinematically scrolling backwards from the last image included in such moment to the highlight image for such moment.

Referring again to FIG. 25, if it is determined at 2508 that the speed of the drag gesture does not exceed the threshold speed, then the user computing device proceeds to 2510 and the visually scrolls through the images included in the moment. For example, visual scrolling can be performed according to any of the techniques discussed above with respect to method 2400. In other implementations, at 2510, the visual scrolling can include simply advancing frame-by-frame within the moment until the user discontinues the drag gesture.

After the user computing device has visually scrolled through the images included in the moment, the user computing device returns to 2504 and enables user interaction with the image editing interface.

Figure 26:
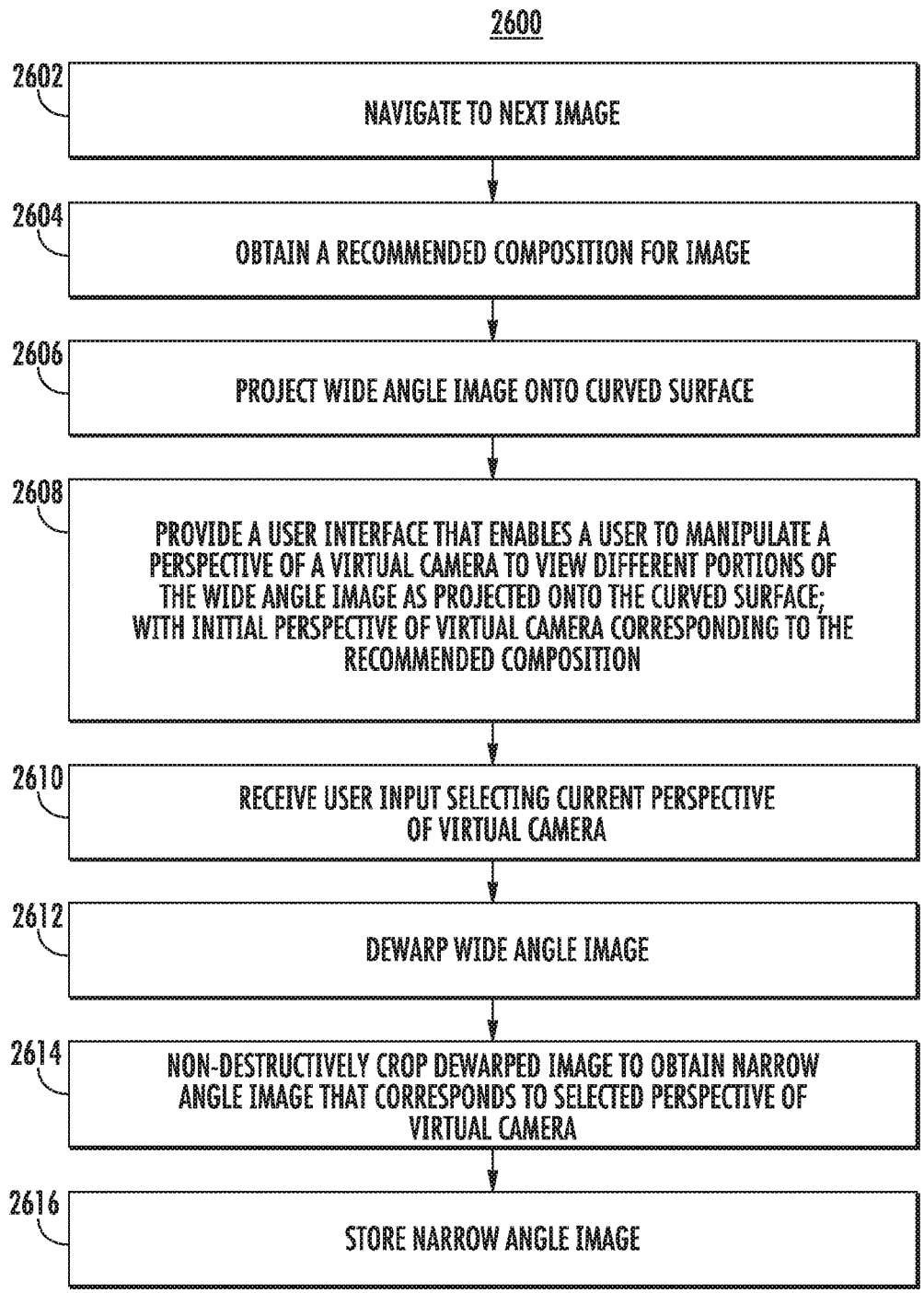
FIG. 26 depicts a flow chart of an example method to enable editing of captured imagery according to an example embodiment of the present disclosure.

FIG. 26 depicts a flow chart of an example method 2600 to enable editing of captured imagery according to an example embodiment of the present disclosure.

At 2602, the user computing device navigates to the next image. For example, the user computing device may navigate to the next image as a result of visually scrolling or scrubbing images within a moment. In some implementations, the image is a wide angle image.

At 2604, the user computing device obtains a recommended composition for the image. For example, the user computing may have previously determined the recommended composition for such image based on one or more annotations associated with such image. In some implementations, the recommended composition includes a dewarped portion of the wide angle image.

At 2606, the user computing device projects the wide angle image onto a curved surface. For example, the curved surface can be a hemisphere.

At 2608, the user computing device provides a user interface that enables a user to manipulate a perspective of a virtual camera to view different portions of the wide angle image as projected onto the curved surface. In particular, at 2608, the user interface is provided with an initial perspective of the virtual camera corresponding to the recommended composition obtained at 2604.

Thus, at 2608 the user computing device can provide an interactive user interface that permits the user to reposition and/or reorient the virtual camera to gain a different perspective of the wide angle image projected onto a curved surface. In particular, controls can be provided for camera orientation, camera position (and movement thereof); and camera orbit. The virtual camera can be controlled according to any suitable control scheme, including, for example, according to various multi-touch gestures.

After the perspective of the camera has been adjusted, a new image that corresponds to the selected perspective can be determined by recalculating one or more camera parameters (e.g., focus, lens distortions, lighting, etc.) that would result from the new perspective. In addition, in some implementations of the present disclosure, advanced image processing techniques such as superresolution, hyper-lapse, texture mapping, depth mapping, view synthesis, etc. can also be applied to output synthetic or computed images that are generated from a combination of the transferred images. Likewise, controls may be provided for ISO, depth of field, stabilization, blur/focus, and other image parameters or characteristics. In further implementations, the user can be provided with the ability to selectively blur certain faces included in the image.

As one example, providing the interactive user interface at 2608 can include adjusting the position of the virtual camera to a new position in response to a user input, where the new position is different than a capture position at which the mobile image capture device captured the wide angle image. In such example, providing the interactive user interface at 2608 can further include performing view synthesis with respect to the wide angle image and at least one other image that is temporally adjacent to the wide angle image to generate a synthesized view of a scene depicted by the wide angle image from the new position. For example, the user computing device can implement a computational photographer to perform view synthesis with respect to a series of temporally adjacent images to generate synthesized views of the scene. The synthesized views can be displayed within the user interface at 2608.

At 2610, the user computing device receives user input selecting the current perspective of the virtual camera. For example, the user input can include a tap of a record button included in the user interface.

At 2612, the user computing device dewarps the wide angle image. At 2614, the user computing device non-destructively crops the dewarped image to obtain a narrow angle image that corresponds to the selected perspective of the virtual camera.

At 2616, the user computing device stores the "new" narrow angle image. For example, the narrow angle image can be added to a gallery for the presently viewed reflection. In further implementations, the narrow angle image can be added directly to a camera roll.

Thus, the user interface and associated editing tools described above empower the user to compose the photograph the user would have taken, had she been able to freeze time, explore the nuances of a moment, take out her camera or phone without forcing persons around her to alter their behavior, open a camera application, figure out the best way to hold the camera, and then capture the image. Ultimately, the systems and methods of the present disclosure provide superior results while saving time, effort, and management anxiety.

Figure 27:
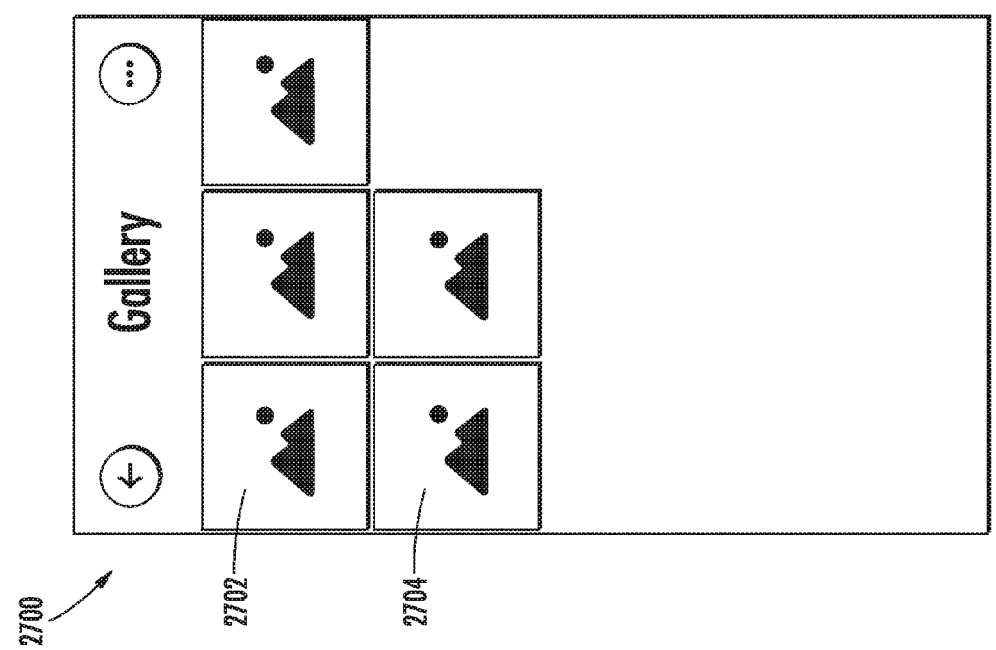
FIG. 27 depicts an example user interface to display captured images according to an example embodiment of the present disclosure.

Referring again to FIG. 22, if the user selects the gallery button, the application can transition to a gallery user interface 2700 as illustrated in FIG. 27. More particularly, FIG. 27 depicts an example user interface 2700 to display captured images according to an example embodiment of the present disclosure.

The user interface 2700 can enable the user to review the photos and/or videos the user has "re-taken" from the current reflection or from all reflections (e.g., photos 2702 and 2704). Thus, the user can access photos and videos, scroll through photos and videos, and select a particular photo or video to share or delete. Selecting a particular photograph or video may bring up a full resolution version of the photo or video, with additional editing and share controls.

In some implementations, the gallery acts as a "scratch-disk" to the user computing device's default camera roll. The camera roll can also include photographs captured by a camera of the user computing device. Thus, by outputting images generated according to the present disclosure directly to the camera roll, the generated images can be treated as if they were captured by the user computing device. Further, the user is given the sensation that they have "captured" new images through the editing process.

Referring again to FIG. 22, the user interface 2200 can also include a control 2210 to access an action sheet. If the user selects the control 2210, the application can transition to an action sheet user interface 2800 as illustrated in FIG. 28.

Figure 28:
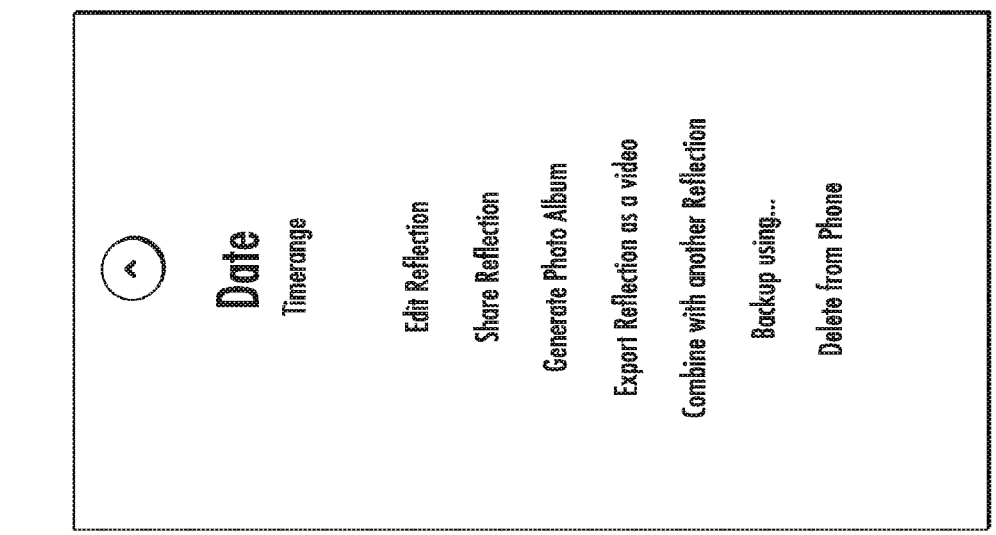
FIG. 28 depicts an example user interface to enable selection of features within an image editing application according to an example embodiment of the present disclosure.

More particularly, FIG. 28 depicts an example user interface 2800 to enable selection of features within an image editing application according to an example embodiment of the present disclosure. In particular, the user interface 2800 can serve as a hub for management of a presently viewed reflection.

As examples, the user interface 2800 can provide controls for editing reflections; sharing reflection; generating a photo album; exporting reflections as a video; combining a particular reflection with another reflection; accessing a backup control screen; or deleting a reflection from the user computing device. If the user selects the control to edit the reflection, then the application can transition to a user interface 2900 of FIG. 29.

More particularly, FIG. 29 depicts an example user interface 2900 to edit a reflection at the moment-level according to an example embodiment of the present disclosure. In particular, the user interface 2900 can enable the user to delete undesirable moments from a reflection.

As one example, in the user interface 2900, the user can navigate between moments by swiping or by selecting a representative icon of such moment from a timeline at a bottom of the interface 2900, such as icons 2904 and 2906. The user can delete a presently displayed moment 2902 by swiping away or by selecting the delete button 2908. The user can confirm desirability of the moment 2902 by selecting the keep button 2910.

The user can also bring up additional options for the presently displayed moment 2902 by selecting the menu control 2912. In some implementations, the user can re-arrange moments, for example, by long pressing and then dragging the moment to drop between other moments.

Referring again to FIG. 28, if the user selects the share reflection control, the application can transition to user interface 3000 of FIG. 30. In particular, FIG. 30 depicts an example user interface 3000 to enable sharing of images according to an example embodiment of the present disclosure.

The user interface 3000 can provide controls for sharing via SMS messaging, email, social media applications, or other sharing channels. The user interface 3000 can also provide the ability for the user to prompt the user computing device to search for nearby computing devices associated with other users. For example, the user computing device (or the mobile image capture device under instruction of the user computing device) can search for nearby devices with which to share images (e.g., a whole reflection). For example, the mobile image capture device can use short-range radio broadcasts to locate nearby devices. In addition, the user interface 3000 can provide a secure URL that the user can copy and provide to other users to enable access to a reflection.

Some or all of the sharing functionality described above may be accomplished through communication by the user computing device or the mobile image capture device with a server computing device. In particular, the server computing device can retain a data store of captured images and can facilitate sharing with other persons and/or devices. In some implementations, sharing of data can include sharing the raw images that form a reflection, so that additional users can optionally "re-take" "new" images for themselves from the same data, according to the editing interfaces discussed above.

In some implementations of the present disclosure, to ensure privacy of the user and those persons depicted in images captured by the mobile image capture device, the user computing device uploads to the server computing device only images that are requested for upload to the server computing device during or as a result of a user-controlled editing session. Thus, no images are uploaded to the server computing device absent uploading instructions from the user. Therefore, all personal data is maintained under control of the user at his or her personal device.

According to another aspect of the present disclosure, the user computing device can infer person-based sharing intents from recognition within a reflection. As one example, in some implementations, the mobile image capture device is operable to perform face recognition with respect to each of a plurality of images included in a reflection to recognize one or more faces depicted in the plurality of images. Further, the user computing device can be operable to: enable the user to share the one or more images received from the mobile image capture device with one or more contacts; determine one or more relationships between the one or more contacts with whom the one or more images are shared and the one or more faces depicted in the shared images; and suggest, with respect to subsequent images received from the mobile image capture device in which the one or more faces are recognized, that the user share such subsequent images with particular ones of the one or more contacts based at least in part on the one or more relationships.

Figure 31:
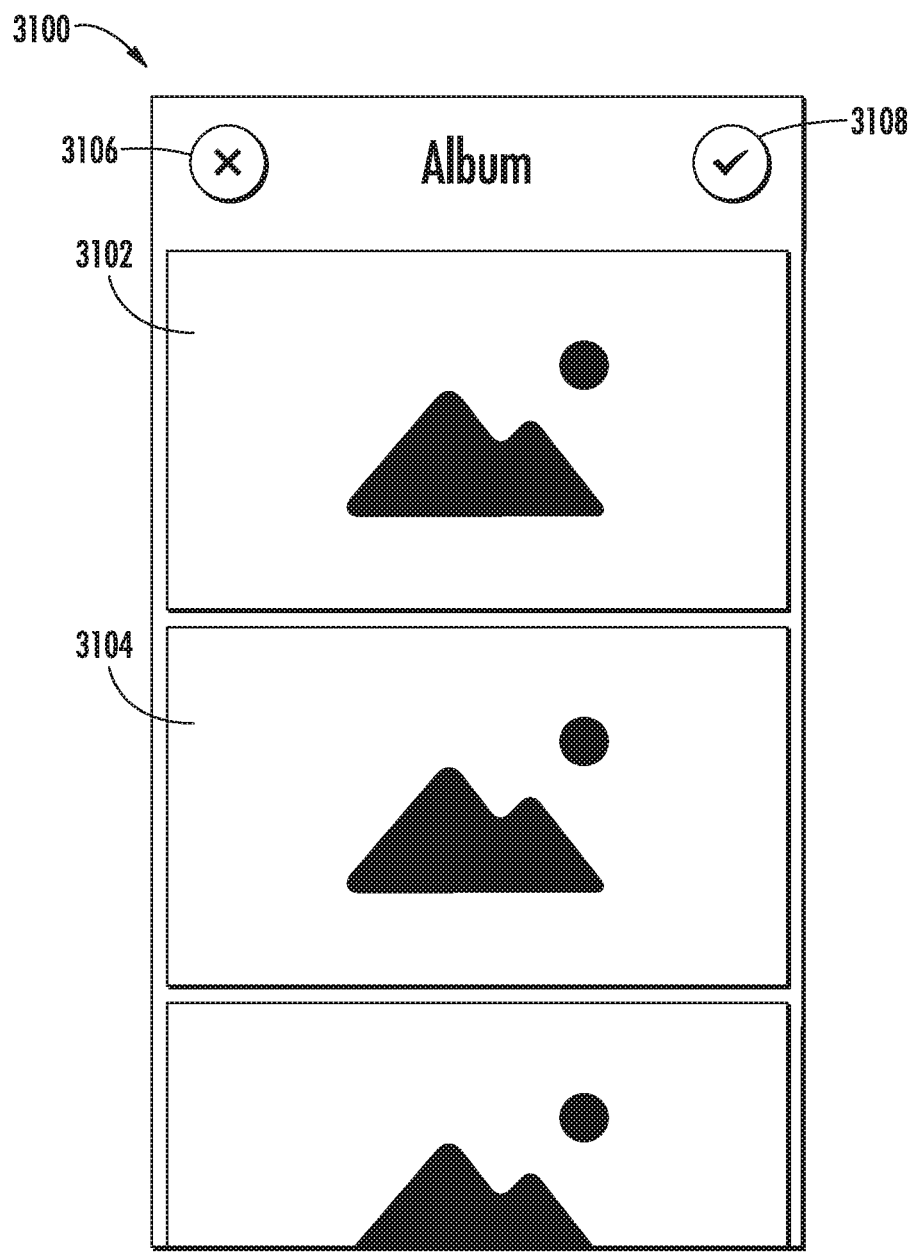
FIG. 31 depicts an example user interface to display an album of images according to an example embodiment of the present disclosure.

FIG. 31 depicts an example user interface 3100 to display an album of images according to an example embodiment of the present disclosure. More particularly, in another feature, the user computing device can automatically generate an album for a reflection without requiring user-guided editing. For example, the automatically generated album can include at least one highlight image selected from each moment of the reflection (e.g., images 3102 and 3104), for example, according to the techniques discussed above. The highlight images can also be non-destructively cropped according to the recommended compositions determined for such images.

The user interface 3100 can provide controls for accepting or deleting an automatically generated album or for accepting or deleting particular images within an automatically generated album. For example, a delete button 3106 can be selected to delete the automatically generated album, while a keep button 3108 can be selected to keep the automatically generated album (e.g., add to camera roll).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

In addition, although FIGS. 13, 24, 25, and 26 respectively depict steps performed in a particular order for purposes of illustration and discussion, the methods of the present disclosure are not limited to the particularly illustrated order or arrangement. The various steps of the methods 1300, 2400, 2500, and 2600 can be omitted, rearranged, combined, and/or adapted in various ways without deviating from the scope of the present disclosure.

Further, although the present disclosure is generally discussed with reference to mobile image capture devices, the present disclosure is also applicable to other forms of image capture devices, as well, including, for example, surveillance cameras, security systems, dashboard cameras, robotic control system cameras, or other image capture devices. Further, aspects of the present disclosure, such as the curation and editing portions, can be applied to imagery captured from any other camera at any time.

What is claimed is:

1. A system for selective retention and editing of images, the system comprising:
  a continuous capture mobile image capture device designed for resource efficiency, the mobile image capture device comprising a network interface, a power source, an image sensor, at least one processor, and a memory that stores at least one neural network usable to determine a desirability of a scene depicted by an image, the memory comprising at least a temporary image buffer and a non-volatile memory, the mobile image capture device operable to:
  capture a first image that depicts a scene;
  maintain a first copy of the first image in the temporary image buffer;
  input the first image into the at least one neural network;
  receive at least one descriptor of the desirability of the scene depicted by the first image as an output of the at least one neural network;
  determine, based at least in part on the at least one descriptor of the desirability of the scene of the first image, whether to store a second copy of the first image in the non-volatile memory of the mobile image capture device or to discard the first copy of the first image from the temporary image buffer without storing a second copy of the first image in the non-volatile memory; and
  transmit at least one of a plurality of images stored in the non-volatile memory to a user computing device.

2. The system of claim 1, further comprising the user computing device, the user computing device operable to:
  selectively communicatively connect to the mobile image capture device;
  select one or more of the plurality of images stored in the non-volatile memory of the user computing device for transfer;
  receive from the mobile image capture device the selected one or more images; and
  provide a user interface that enables a user to edit the one or more images received from the mobile image capture device.

3. The system of claim 1, wherein the at least one neural network comprises at least one convolutional neural network.

4. The system of claim 1, wherein:
  the at least one neural network comprises a plurality of deep neural networks that respectively analyze a plurality of different characteristics of each input image;
  the mobile image capture device is operable to input the first image into at least one of the plurality of deep neural networks; and
  each of the plurality of deep neural networks outputs at least one annotation for each image input into such deep neural network, the at least one annotation for each input image indicative of the desirability of the scene depicted by such image.

5. The system of claim 4, wherein the mobile image capture device periodically receives one or more updated versions of one or more of the plurality of deep neural networks from one or more of the user computing device and a server computing device, the one or more updated versions of the one or more of the plurality of deep neural networks trained on additional data.

6. The system of claim 1, wherein the mobile image capture device is operable to:
  maintain data sufficient to generate a high resolution copy of the first image in a temporary raw data buffer;
  input a low resolution copy of the first image into the at least one neural network; and
  determine, based at least in part on the at least one descriptor of the desirability of the scene of the first image, whether to store a high resolution copy of the first image in the non-volatile memory of the mobile image capture device or to discard the first copy of the first image from the temporary image buffer without storing a high resolution copy of the first image in the non-volatile memory.

7. The system of claim 1, further comprising the user computing device, wherein the mobile image capture device further comprises a wide angle lens; and wherein the user computing device is operable to dewarp the one or more images received from the mobile image capture device to obtain one or more narrow angle images.

8. The system of claim 1, wherein:
  the mobile image capture device is operable to transmit an excitement signal that is wirelessly receivable by one or more other mobile image capture devices that are located proximate to the mobile image capture device; and
  the excitement signal indicates that the scene depicted by the first image has a large desirability.

9. The system of claim 8, wherein, in response to receipt of the excitement signal, the one or more other mobile image capture devices perform at least one of the following:
  increase a probability that the other mobile image capture device will store a copy of a recently captured image in the non-volatile memory;
  attempt to identify a match for one or more embeddings included in the excitement signal within the recently captured image; and
  increase one or more of a frame rate or a resolution of an image sensor of the other mobile image capture device.

10. The system of claim 1, wherein to communicatively connect:
  the user computing device is operable to visually display a pattern; and
  the mobile image capture device is operable to:
    capture imagery of the pattern; and
    in response to capturing the imagery of the pattern, communicatively connect to the user computing device.

11. The system of claim 1, further comprising the user computing device, the user computing device operable to:
  analyze at least one descriptor of the desirability of the scene depicted by each of the plurality of images stored in the non-volatile memory of the mobile image capture device; and
  determine, based at least in part on the at least one descriptor of the desirability of the scene depicted by each of the plurality of images stored in the non-volatile memory of the mobile image capture device, whether to request transfer of such image.

12. The system of claim 1, wherein:
  the mobile image capture device is operable to periodically provide a capture visualization to the user computing device for display by the user computing device;

display of the capture visualization by the user computing device is indicative of present operation of the mobile image capture device; and the capture visualization is based at least in part on one or more images recently captured by the mobile image capture device.

13. The system of claim 1, further comprising the user computing device, wherein:

the mobile image capture device is operable to perform face recognition with respect to captured images to recognize one or more faces depicted in the captured images; and the user computing device is operable to:

enable the user to select one or more of the recognized faces as having a heightened importance to the user; and communicate information to the mobile image capture device that enables the mobile image capture device to increase a probability of storing subsequently captured images which depict the one or more selected faces.

14. The system of claim 1, further comprising:

the user computing device; and a server computing device for image synchronization, storage, and sharing, the user computing device selectively communicatively coupleable to the server computing device;

wherein the user computing device uploads to the server computing device only images that are requested for upload to the server computing device during or as a result of a user-controlled editing session.

15. The system of claim 1, further comprising the user computing device, and wherein:

the mobile image capture device is operable to perform face recognition with respect to captured images to recognize one or more faces depicted in the captured images; and the user computing device is operable to:

enable the user to share the one or more images received from the mobile image capture device with one or more contacts;

determine one or more relationships between the one or more contacts with whom the one or more images are shared and the one or more faces depicted in the shared images; and suggest, with respect to subsequent images received from the mobile image capture device in which the one or more faces are recognized, that the user share such subsequent images with particular ones of the one or more contacts based at least in part on the one or more relationships.

16. A system for selective retention and editing of images, the system comprising:

a continuous capture mobile image capture device designed for resource efficiency, the mobile image capture device comprising a network interface, a power source, an image sensor, at least one processor, a memory that includes at least a temporary image buffer and a non-volatile memory, and a scene analyzer, the mobile image capture device operable to:

capture a plurality of images that respectively depict a plurality of scenes;

maintain a first copy of each of the plurality of images in the temporary image buffer;

determine, by the scene analyzer, at least one descriptor of the desirability of the scene depicted by each image;

determine, based at least in part on the at least one descriptor of the desirability of the scene of each image, whether to store a second copy of such image in the non-volatile memory of the mobile image capture device or to discard the first copy of such image from the temporary image buffer without storing a second copy of such image in the non-volatile memory; and a user computing device, the user computing device comprising at least one processor, a memory, and a transfer controller, the user computing device operable to:

selectively communicatively connect to the mobile image capture device;

determine, by the transfer controller based at least in part on the at least one descriptor of the desirability of the scene depicted by each image stored in the non-volatile memory of the mobile image capture device, whether to request transfer of such image from the mobile image capture device; and receive one or more images requested for transfer from the mobile image capture device.

17. The system of claim 16, wherein:

the scene analyzer comprises a plurality of deep neural networks that respectively analyze a plurality of different characteristics of an input image;

the mobile image capture device is operable to input each image into at least one of the plurality of deep neural networks;

each of the plurality of deep neural networks outputs at least one annotation for each input image, the at least one annotation for each input image indicative of the desirability of the scene depicted by such image; and the transfer controller determines whether to request transfer of each image stored in the non-volatile memory of the mobile image capture device based at least in part on the one or more annotations provided for such image by the at least one of the plurality of deep neural networks into which such image was input.

18. The system of claim 17, wherein the user computing device determines a recommended composition for at least one of the transferred images based at least in part on the at least one annotation associated with such image, the recommended composition including only a portion of the at least one of the transferred images.

19. The system of claim 16, wherein the transfer controller performs an optimization algorithm to select which of the images stored in the non-volatile memory of the mobile image capture device to request for transfer, the optimization algorithm having a plurality of associated objectives, the plurality of associated objectives including at least a diversity of settings and a diversity of depicted persons.

20. A method to selectively retain and transfer images, the method comprising:

capturing, by a mobile image capture device, a first image that depicts a scene;

maintaining, by the mobile image capture device, a first copy of the first image in a temporary image buffer of the mobile image capture device;

inputting, by the mobile image capture device, the first image into at least one neural network to determine a desirability of the scene depicted by the first image, the at least one neural network stored in a memory of the mobile image capture device;

receiving, by the mobile image capture device, at least one descriptor of the desirability of the scene depicted by the first image as an output of the neural network;

determining, by the mobile image capture device based at least in part on the at least one descriptor of the desirability of the scene, whether to store a second copy of the first image in the non-volatile memory of the mobile image capture device or to discard the first copy of the first image from the temporary image buffer without storing a second copy of the first image in the non-volatile memory; and transferring, by the mobile image capture device, one or more of a plurality of images stored in the non-volatile memory of the mobile image capture device to a user computing device.

\* \* \* \* \*